(12) United States Patent
Gaspar Marques et al.

(10) Patent No.: US 11,976,004 B2
(45) Date of Patent: May 7, 2024

(54) SILICOBORATE AND BOROSILICATE GLASSES HAVING HIGH REFRACTIVE INDEX AND HIGH TRANSMITTANCE TO BLUE LIGHT

(71) Applicant: CORNING INCORPORATED, Corning, NY (US)

(72) Inventors: Paulo Jorge Gaspar Marques, Herblay sur Seine (FR); Antoine Marie Joseph Lepicard, Melun (FR); Jian Luo, Painted Post, NY (US); Lina Ma, Corning, NY (US); Alexander I Priven, Chungchongnam-do (KR)

(73) Assignee: Corning Incorporated, Corning, NY (US)

( * ) Notice: Subject to any disclaimer, the term of this patent is extended or adjusted under 35 U.S.C. 154(b) by 239 days.

(21) Appl. No.: 17/400,444

(22) Filed: Aug. 12, 2021

(65) Prior Publication Data

US 2022/0073410 A1 Mar. 10, 2022

Related U.S. Application Data

(60) Provisional application No. 63/076,551, filed on Sep. 10, 2020.

(51) Int. Cl.
C03C 3/068 (2006.01)

(52) U.S. Cl.
CPC ...... *C03C 3/068* (2013.01); *C03C 2201/3417* (2013.01); *C03C 2201/42* (2013.01)

(58) Field of Classification Search
CPC .......... C03C 3/064; C03C 3/066; C03C 3/068
See application file for complete search history.

(56) References Cited

U.S. PATENT DOCUMENTS

| | | |
|---|---|---|
| 3,460,954 A | 8/1969 | Young |
| 3,563,773 A | 2/1971 | Heinz et al. |
| 3,999,997 A | 12/1976 | Faulstich et al. |
| 4,390,638 A | 6/1983 | Mennemann et al. |
| 4,584,279 A | 4/1986 | Glaswerke |
| 4,732,876 A | 3/1988 | Nagamine et al. |
| 4,742,028 A | 5/1988 | Boudot et al. |
| 4,996,173 A | 2/1991 | Tachiwana |
| 5,288,669 A | 2/1994 | Grateau et al. |
| 5,693,580 A | 12/1997 | Brow et al. |
| 5,747,397 A | 5/1998 | McPherson et al. |
| 6,121,176 A | 9/2000 | Comte |
| 6,187,702 B1 | 2/2001 | Morishita |
| 6,333,288 B1 | 12/2001 | Clement et al. |
| 6,413,894 B1 | 7/2002 | Sato |
| 7,091,145 B2 | 8/2006 | Wolff et al. |
| 7,232,779 B2 | 6/2007 | Kasuga et al. |
| 7,490,485 B2 | 2/2009 | Endo |
| 7,538,051 B2 | 5/2009 | Fujiwara et al. |
| 7,563,738 B2 | 7/2009 | Uehara |
| 7,598,193 B2 | 10/2009 | Endo |
| 7,605,099 B2 | 10/2009 | Wolff et al. |
| 7,615,507 B2 | 11/2009 | Endo |
| 7,655,585 B2 | 2/2010 | Hayashi |
| 7,737,064 B2 | 6/2010 | Fu |
| 7,827,823 B2 | 11/2010 | Kasuga et al. |
| 7,897,532 B2 | 3/2011 | Onoda et al. |
| 8,012,896 B2 | 9/2011 | Fujiwara |
| 8,034,733 B2 | 10/2011 | Kobayashi et al. |
| 8,077,406 B2 | 12/2011 | Hachitani et al. |
| 8,399,371 B2 | 3/2013 | Saito |
| 8,404,606 B2 | 3/2013 | Wolff et al. |
| 8,486,850 B2 | 7/2013 | Li et al. |
| 8,507,394 B2 | 8/2013 | Shimizu |
| 8,575,048 B2 | 11/2013 | Negishi et al. |
| 8,647,996 B2 | 2/2014 | Takazawa |
| 8,661,853 B2 | 3/2014 | Negishi et al. |
| 8,728,963 B2 | 5/2014 | Negishi et al. |
| 8,741,795 B2 | 6/2014 | Zou et al. |
| 8,741,796 B2 | 6/2014 | Negishi et al. |
| 8,835,336 B2 | 9/2014 | Taguchi |
| 8,835,337 B2 | 9/2014 | Negishi |
| 8,846,555 B2 | 9/2014 | George et al. |

(Continued)

FOREIGN PATENT DOCUMENTS

| | | |
|---|---|---|
| CN | 101215082 A | 7/2008 |
| CN | 102219374 A | 10/2011 |

(Continued)

OTHER PUBLICATIONS

International Search Report and Written Opinion of the International Searching Authority; PCT/US2021/046897; dated Apr. 7, 2022, 20 pages; European Patent Office.
Bengisu et al., Glasses and glass-ceramics in the SrO—TiO2—Al2O3—SiO2—B2O3 system and the effect of P2O5 additions, J.Mater.Sci., 2008, vol. 43, No. 10, p. 3531-3538.
Burger et al., "Phase equilibrium, glass-forming, properties and structure of glasses in the TeO2—B2O3 system", Journal of Materials Science, 1984, vol. 19, No. 2, pp. 403-412.
Burger et al., R transmission and properties of glasses in the TeO2—RnOm, RnXm, Rn(SO4)m, Rn(PO3)mandB2O3] systems, Infrared Physics, 1985, vol. 25, No. 1-2, pp. 395-409.
Fargin et al., "Optical non-linearity in oxide glasses", Journal of Non-Crystalline Solids, 1996, vol. 203, p. 96-101.

(Continued)

*Primary Examiner* — Elizabeth A. Bolden
(74) *Attorney, Agent, or Firm* — Kevin L. Bray

(57) ABSTRACT

Glasses containing silicon dioxide ($SiO_2$) and/or boron oxide ($B_2O_3$) as glass formers and having a refractive index $n_d$ of greater than or equal to 1.80, as measured at 587.56 nm, a density of less than or equal to 5.5 g/cm$^3$, as measured at 25° C., and a high transmittance to, particularly to blue light, are provided. Optionally, the glasses may be characterized by a high transmittance in the visible and near-ultraviolet (near-UV) range of the electromagnetic spectrum and/or good glass forming ability.

7 Claims, 12 Drawing Sheets

(56) References Cited

U.S. PATENT DOCUMENTS

| | | | |
|---|---|---|---|
| 8,852,745 | B2 | 10/2014 | Yamaguchi et al. |
| 8,859,444 | B2 | 10/2014 | Yamaguchi et al. |
| 8,883,664 | B2 | 11/2014 | Negishi |
| 9,018,116 | B2 | 4/2015 | Schreder et al. |
| 9,169,152 | B2 | 10/2015 | Kuang |
| 9,302,930 | B2 | 4/2016 | Negishi et al. |
| 9,394,194 | B2 | 7/2016 | Negishi |
| 9,416,047 | B2 | 8/2016 | Yamaguchi |
| 9,487,432 | B2 | 11/2016 | Kuang |
| 9,643,880 | B2 | 5/2017 | Negishi |
| 10,259,738 | B2 | 4/2019 | Sun |
| 10,287,205 | B2 | 5/2019 | Sun |
| 2006/0105900 | A1 | 5/2006 | Kasuga et al. |
| 2006/0189473 | A1 | 8/2006 | Endo |
| 2009/0288450 | A1 | 11/2009 | Kasuga et al. |
| 2015/0225282 | A1 | 8/2015 | Kuang |
| 2016/0090320 | A1 | 3/2016 | Negishi |
| 2018/0016182 | A1 | 1/2018 | Sun |
| 2018/0057394 | A1 | 3/2018 | Kikkawa et al. |
| 2018/0244559 | A1 | 8/2018 | Akiba et al. |
| 2018/0251395 | A1 | 9/2018 | Akiba et al. |

FOREIGN PATENT DOCUMENTS

| | | | |
|---|---|---|---|
| CN | 102372430 A | | 3/2012 |
| CN | 102910816 A | | 2/2013 |
| CN | 103626394 A | | 3/2014 |
| CN | 103708724 A | | 4/2014 |
| CN | 108290771 A | | 7/2018 |
| CN | 110510869 A | | 11/2019 |
| CN | 110950531 A | | 4/2020 |
| DE | 2653581 A1 | | 6/1977 |
| DE | 3201344 A1 | | 7/1983 |
| DE | 3201346 A1 | | 7/1983 |
| DE | 4242859 A1 | | 2/1994 |
| DE | 102006024805 A1 | | 11/2007 |
| EP | 0570687 A1 | | 11/1993 |
| EP | 0992461 A1 | | 4/2000 |
| FR | 1214486 A | | 4/1960 |
| GB | 2342918 B | | 4/2001 |
| JP | 50-018509 A | | 2/1975 |
| JP | 59-050048 A | | 3/1984 |
| JP | 61-168551 A | | 7/1986 |
| JP | 61-232243 A | | 10/1986 |
| JP | 07-041334 A | | 2/1995 |
| JP | 2000-128570 A | | 5/2000 |
| JP | 2000-159537 A | | 6/2000 |
| JP | 3060914 B2 | | 7/2000 |
| JP | 2001-072432 A | | 3/2001 |
| JP | 2001-342035 A | | 12/2001 |
| JP | 2002-173334 A | | 6/2002 |
| JP | 2002-362939 A | | 12/2002 |
| JP | 2003-252646 A | | 9/2003 |
| JP | 2004-175632 A | | 6/2004 |
| JP | 2005-008518 A | | 1/2005 |
| JP | 2005-047732 A | | 2/2005 |
| JP | 2005-239506 A | | 9/2005 |
| JP | 2006-111499 A | | 4/2006 |
| JP | 2006-248897 A | | 9/2006 |
| JP | 2007-112697 A | | 5/2007 |
| JP | 2007-153734 A | | 6/2007 |
| JP | 2008-105863 A | | 5/2008 |
| JP | 2008-214135 A | | 9/2008 |
| JP | 2009-263141 A | | 11/2009 |
| JP | 2012236754 A | * | 12/2012 |
| KR | 10-2009-0026249 A | | 3/2009 |
| SU | 986886 A1 | | 1/1983 |
| TW | 201711973 A | | 4/2017 |
| TW | 201713602 A | | 4/2017 |
| TW | 201900572 A | | 1/2019 |
| WO | 98/32706 A1 | | 7/1998 |
| WO | 2006/106781 A1 | | 10/2006 |
| WO | 2011/086855 A1 | | 7/2011 |
| WO | 2012/099168 A1 | | 7/2012 |
| WO | 2012/133420 A1 | | 10/2012 |
| WO | 2013/049988 A1 | | 4/2013 |
| WO | 2014/048362 A1 | | 4/2014 |
| WO | 2014/187132 A1 | | 11/2014 |
| WO | 2017/110304 A1 | | 6/2017 |
| WO | 2019/017205 A1 | | 1/2019 |
| WO | 2019/021689 A1 | | 1/2019 |
| WO | 2019/031095 A1 | | 2/2019 |
| WO | 2019/131123 A1 | | 7/2019 |
| WO | 2020/045417 A1 | | 3/2020 |
| WO | 2020/063208 A1 | | 4/2020 |

OTHER PUBLICATIONS

Gupta et al., "Mid-IR transparent TeO2—TiO2—La2O3 glass and its crystallization behaviour for photonic applications", J.Am.Ceram. Soc., 2018, vol. 101, No. 9, p. 3900-3916.

Hakamatsuka et al., "Electrical properties of vanadium borophosphate glasses", J.Ceram.Soc. Jpn, 1981, vol. 89, No. 9, p. 461-470.

Madheshiya et al., "Synthesis, structural and X-ray absorption spectroscopy of (PbxBi1-x). TiO3 borosilicate glass and glass ceramics" Journal of Asian Ceramic Societies, 2017, vol. 5, No. 3, p. 276-283.

Saddeek et al., "Optical study of lead borosilicate glasses", Physica B: Condensed Matter, 2010, vol. 405, No. 10, p. 2407-2412.

Singh et al., "Effect of La2O3 concentration on structural, optical and cytotoxicity behaviours of strontium titanate borosilicate glasses", In Journal of Non-Crystalline Solids, vol. 481, 2018, pp. 176-183.

Strimple J.H., Giess E.A., Glass formation and properties of glasses in the system Na2O—B2O3—SiO2—TiO2., J.American Ceramic Society, 1958, vol. 41, No. 7, p. 231-237.

International Search Report and Written Opinion of the International Searching Authority; PCT/US2021/047544; dated Dec. 10, 2021; 12 pages; European Patent Office.

* cited by examiner

SILICOBORATE AND BOROSILICATE GLASSES HAVING HIGH REFRACTIVE INDEX AND HIGH TRANSMITTANCE TO BLUE LIGHT

This application claims priority under 35 USC § 119(e) from U.S. Provisional Patent Application Ser. No. 63/076,551 filed on Sep. 10, 2020 which is incorporated by reference herein in its entirety.

FIELD

The present disclosure generally relates to silicoborate and borosilicate glasses having a high refractive index, a low density, and a high transmittance to blue light.

BACKGROUND

Glass is used in a variety of optical devices, examples of which include augmented reality devices, virtual reality devices, mixed reality devices, eye wear, etc. Desirable properties for this type of glass often include a high refractive index and a low density. Additional desirable properties may include high transmission in the visible and near-ultraviolet (near-UV) range of the electromagnetic spectrum and/or low optical dispersion. It can be challenging to find glasses having the desired combination of these properties and which can be formed from compositions having good glass-forming ability. For example, generally speaking, as the refractive index of a glass increases, the density also tends to increase. Species such as $TiO_2$ and $Nb_2O_5$ are often added to increase the refractive index of a glass without increasing the density of the glass. However, these materials often absorb blue and UV light, which can undesirably decrease the transmittance of light in this region of the spectrum by the glass. Often, attempts to increase the refractive index of a glass while maintaining a low density, and without decreasing transmittance in the blue and UV region of the spectrum, can result in a decrease in the glassforming ability of the material. For example, crystallization and/or liquid-liquid phase separation can occur during cooling of the glass melt at cooling rates that are generally acceptable in the industry. Typically, the decrease in glass-forming ability appears as the amount of certain species, such as $ZrO_2$, $Y_2O_3$, $Sc_2O_3$, BeO, etc. increases.

Low density, high refractive index glasses often belong to one of two types of chemical systems, based on the glass formers used: (a) silicoborate or borosilicate glasses in which $SiO_2$ and/or $B_2O_3$ are used as the main glass formers and (b) phosphate glasses in which $P_2O_5$ is used as a main glass former. Glasses which rely on other oxides as main glass formers, such as $GeO_2$, $TeO_2$, $Bi_2O_3$, and $V_2O_5$, can be challenging to use due to cost, glass-forming ability, optical properties, and/or production requirements.

Phosphate glasses can be characterized by a high refractive index and low density, however, phosphate glasses can be challenging to produce due to volatilization of $P_2O_5$ from the melts and/or risks of platinum incompatibility. In addition, phosphate glasses are often highly colored and may require an extra bleaching step to provide a glass having the desired transmittance characteristic. Furthermore, phosphate glasses exhibiting a high refractive index also tend to have an increase in optical dispersion.

Silicoborate and borosilicate glasses are typically easier to produce and can exhibit a high transmittance without a bleaching step. However, silicoborate and borosilicate glasses typically exhibit an increase in density at increasing refractive indices, compared to phosphate glasses.

In view of these considerations, there is a need for silicoborate and borosilicate glasses having a high refractive index, a low density, and a high transmittance to blue light.

SUMMARY

According to an embodiment of the present disclosure, a glass comprises $B_2O_3$ from 9.0 mol % to 33.0 mol %, $La_2O_3$ from 15.0 mol % to 50.0 mol %, $SiO_2$ at greater than 0.0 mol %, wherein a ratio of $SiO_2$ (expressed in mol %) to a sum (expressed in mol %) of $SiO_2$ and $B_2O_3$ ($SiO_2/(SiO_2+B_2O_3)$) is from 0.05 to 0.95, and at least one oxide selected from $Nb_2O_5$, $TiO_2$, $ZrO_2$, $Y_2O_3$, $Li_2O$, $Ta_2O_5$, $Al_2O_3$, BaO, $Bi_2O_3$, CaO, $Er_2O_3$, $Gd_2O_3$, $K_2O$, $Na_2O$, $Nd_2O_3$, $P_2O_5$, PbO, $TeO_2$, $WO_3$, $Y_2O_3$, $Yb_2O_3$, and ZnO, subject to the proviso that: $Nb_2O_5$ is from 0.0 mol % to 12.0 mol %, $TiO_2$ is from 0.0 mol % to 40.0 mol %, $ZrO_2$ is from 0.0 mol % to 13.5 mol %, $Y_2O_3$ is from 0.0 mol % to 3.0 mol %, ZnO is from 0.0 mol % to 0.8 mol %, $Li_2O$ is from 0.0 mol % to 0.5 mol %, and $Ta_2O_5$ is from 0.0 mol % to 1.5 mol %. The glass also has a refractive index parameter $P_n$ and a density parameter $P_d$ that satisfy formula (IX):

$$P_n - (1.000 + 0.19 * P_d) > 0.000 \quad \text{(IX)}$$

where the refractive index parameter $P_n$ is calculated according to formula (VI):

$$P_n = 1.81706 - 0.0035654*Al_2O_3 - 0.0038101*B_2O_3 +$$

$$0.00081216*BaO + 0.010373*Bi_2O_3 + 0.00013728*CaO +$$

$$0.0073116*Er_2O_3 + 0.0055226*Gd_2O_3 - 0.003343*K_2O +$$

$$0.0060806*La_2O_3 - 0.0009011*Li_2O - 0.001967*Na_2O +$$

$$0.0093799*Nb_2O_5 + 0.0060396*Nd_2O_3 - 0.0061024*P_2O_5 +$$

$$0.0040356*PbO - 0.0032812*SiO_2 + 0.0030562*TeO_2 +$$

$$0.0034148*TiO_2 + 0.004267*WO_3 + 0.0034424*Y_2O_3 +$$

$$0.0071109*Yb_2O_3 + 0.00096907*ZnO + 0.0026412*ZrO_2 \quad \text{(VI)}$$

and
where the density parameter $P_d$ is calculated according to formula (VII):

$$P_d = -0.018843*Al_2O_3 - 0.020477*B_2O_3 + 0.021988*BaO +$$

$$0.074733*Bi_2O_3 - 0.00243*CaO + 0.100258*Er_2O_3 + 0.07427*Gd_2O_3 - 0.018568*K_2O + 0.06037*La_2O_3 - 0.0089*Li_2O -$$

$$0.00909*Na_2O + 0.00625*Nb_2O_5 + 0.068993*Nd_2O_3 - 0.038868*P_2O_5 + 0.04853*PbO - 0.018196*SiO_2 + 0.013124*TeO_2 -$$

$$0.00529*TiO_2 + 0.044564*WO_3 + 0.022887*Y_2O_3 + 0.097857*Yb_2O_3 + 0.0077*ZnO + 0.012501*ZrO_2 + 4.16819 \quad \text{(VII)}$$

and
further wherein the glass has a transmittance index $T_i$ of 0.532 or greater, where the transmittance index $T_i$ is calculated according to formula (III):

$$T_i = \frac{(La_2O_3 + Gd_2O_3 + ZrO_2)}{(La_2O_3 + Gd_2O_3 + ZrO_2 + TiO_2 + Nb_2O_5)} \quad (III)$$

where each oxide listed in formula (VI), formula (VII), and formula (III) refers to the amount of the oxide, expressed in mol %, in the glass.

According to another embodiment of the present disclosure, a glass comprises $SiO_2$ from 3.0 mol % or greater, $B_2O_3$ from 1.0 mol % or greater, wherein a sum of ($SiO_2$+$B_2O_3$) is 48.0 mol % or less, a total content of divalent metal oxides (RO) of 8.5 mol % or greater, and at least one oxide selected from $Nb_2O_5$, $TiO_2$, $ZrO_2$, $Y_2O_3$, $Li_2O$, $Ta_2O_5$, $Al_2O_3$, $BaO$, $Bi_2O_3$, $CaO$, $Er_2O_3$, $Gd_2O_3$, $K_2O$, $Na_2O$, $Nd_2O_3$, $P_2O_5$, $PbO$, $TeO_2$, $WO_3$, $Y_2O_3$, $Yb_2O_3$, and $ZnO$, subject to the proviso that: $Gd_2O_3$ is from 0.0 mol % to 27.0 mol %, $CaO$ is from 0.0 mol % to 32.0 mol %, $Li_2O$ is from 0.0 mol % to 7.0 mol %, $MgO$ is from 0.0 mol % to 5.0 mol %, $Y_2O_3$ is from 0.0 mol % to 1.5 mol %, $Ta_2O_5$ is from 0.0 mol % to 0.5 mol %, $BaO$ is from 0.0 mol % to 14.0 mol %, $CdO$ is from 0.0 mol % to 10.0 mol %, $Bi_2O_3$ is from 0.0 mol % to 20.0 mol %, $PbO$ is from 0.0 mol % to 1.0 mol %, $HfO_2$ is from 0.0 mol % to 1.0 mol %, $TeO_2$ is from 0.0 mol % to 5.0 mol %, $Nb_2O_5$ is from 0.0 mol % to 25.0 mol %, $TiO_2$ is from 0.0 mol % to 18.0 mol %, $ZnO$ is from 0.0 mol % to 2.0 mol %, fluorine is from 0.0 atomic % to 1.0 atomic %, a sum of ($SiO_2$+$B_2O_3$+ $Alk_2O$+ $MgO$+ $CaO$+ $SrO$+ $BaO$+ $ZnO$) is 69.0 mol % or less, where $Alk_2O$ is a total content of alkali metal oxides, and a sum of ($RE_mO_n$+ $TiO_2$+$Nb_2O_5$+ $ZrO_2$+$Bi_2O_3$+$WO_3$) is 25.0 mol % or greater, where $RE_mO_n$ is a total content of rare earth metal oxides. The glass also has a refractive index parameter $P_n$ and a transmittance index $T_i$ that satisfy formula (XI)(a):

$$P_n - (2.055 - 0.36 * T_i) > 0.000 \quad (XI)(a)$$

where the refractive index parameter $P_n$ is calculated according to formula (VI):

$P_n$=1.81706−0.0035654*$Al_2O_3$−0.0038101*$B_2O_3$+

0.00081216*$BaO$+0.010373*$Bi_2O_3$+
0.00013728*$CaO$+

0.0073116*$Er_2O_3$+0.0055226*$Gd_2O_3$−
0.003343*$K_2O$+

0.0060806*$La_2O_3$−0.0009011*$Li_2O$−
0.001967*$Na_2O$+

0.0093799*$Nb_2O_5$+0.0060396*$Nd_2O_3$−
0.0061024*$P_2O_5$+

0.0040356*$PbO$−0.0032812*$SiO_2$+0.0030562*$TeO_2$+

0.0034148*$TiO_2$+0.004267*$WO_3$+0.0034424*$Y_2O_3$+

0.0071109*$Yb_2O_3$+0.00096907*$ZnO$+
0.0026412*$ZrO_2$(VI)

and
where the transmittance index $T_i$ is calculated according to formula (III):

$$T_i = \frac{(La_2O_3 + Gd_2O_3 + ZrO_2)}{(La_2O_3 + Gd_2O_3 + ZrO_2 + TiO_2 + Nb_2O_5)} \quad (III)$$

and each oxide listed in formula (VI) and formula (III) refers to the amount of the oxide, expressed in mol %, in the glass.

According to another embodiment, a glass comprises $TiO_2$ from 1.0 mol % to 40.0 mol %, $B_2O_3$ from 1.0 mol % to 29.0 mol %, $SiO_2$ from 0.0 mol % to 32.0 mol %, wherein a sum of ($SiO_2$+$B_2O_3$) is 45.0 mol % or less, and at least one oxide selected from $Nb_2O_5$, $ZrO_2$, $La_2O_3$, $Y_2O_3$, $Li_2O$, $Al_2O_3$, $BaO$, $Bi_2O_3$, $CaO$, $Er_2O_3$, $Gd_2O_3$, $Na_2O$, $Nd_2O_3$, $P_2O_5$, $PbO$, $WO_3$, $Y_2O_3$, $Yb_2O_3$, and $ZnO$, subject to the proviso that: $La_2O_3$ is from 0.0 mol % to 30.0 mol %, $ZrO_2$ is from 0.0 mol % to 7.8 mol %, $Nb_2O_5$ is from 0.0 mol % to 7.0 mol %, $CaO$ is from 0.0 mol % to 15.0 mol %, $BaO$ is from 0.0 mol % to 15.0 mol %, $Li_2O$ is from 0.0 mol % to 3.5 mol %, $GeO_2$ is from 0.0 mol % to 10.0 mol %, $Al_2O_3$ is from 0.0 mol % to 10.0 mol %, fluorine is from 0.0 atomic % to 1.0 atomic %, a sum of ($Y_2O_3$+ $ZnO$) is from 0.0 mol % to 2.0 mol %, a total content of divalent metal oxides (RO) is from 0.0 mol % to 40.0 mol %, and a total content of monovalent metal oxides ($R_2O$) is from 0.0 mol % to 15.0 mol %. The glass also has a transmittance index $T_i$ of from 0.25 to 0.75 and further has a refraction parameter $P_{ref}$ and a transmittance index $T_i$ that satisfy formula (XII):

$$P_{ref} - (0.262 - 0.115 * T_i) > 0.000 \quad (XII)$$

where the refraction parameter $P_{ref}$ is calculated according to formula (VIII):

$P_{ref}$=0.201656+0.00018225*$B_2O_3$−0.0010873*$BaO$−

0.0024853*$Bi_2O_3$−0.0030326*$Er_2O_3$−
0.0018856*$Gd_2O_3$−

0.0017563*$La_2O_3$−0.0002505*$Na_2O$+
0.0017526*$Nb_2O_5$−

0.0025472*$Nd_2O_3$−0.0016439*$PbO$+
0.000050096*$SiO_2$+

0.0011794*$TiO_2$−0.00072112*$WO_3$−
0.00079167*$Y_2O_3$−

0.0031015*$Yb_2O_3$−0.00034209*$ZnO$ (VIII)

and
where the transmittance index $T_i$ is calculated according to formula (III):

$$T_i = \frac{(La_2O_3 + Gd_2O_3 + ZrO_2)}{(La_2O_3 + Gd_2O_3 + ZrO_2 + TiO_2 + Nb_2O_5)} \quad (III)$$

and each oxide listed in formula (VIII) and formula (III) refers to the amount of the oxide, expressed in mol %, in the glass.

These and other aspects, objects, and features of the present disclosure will be understood and appreciated by those skilled in the art upon studying the following specification, claims, and appended drawings.

DETAILED DESCRIPTION

Figure 1:
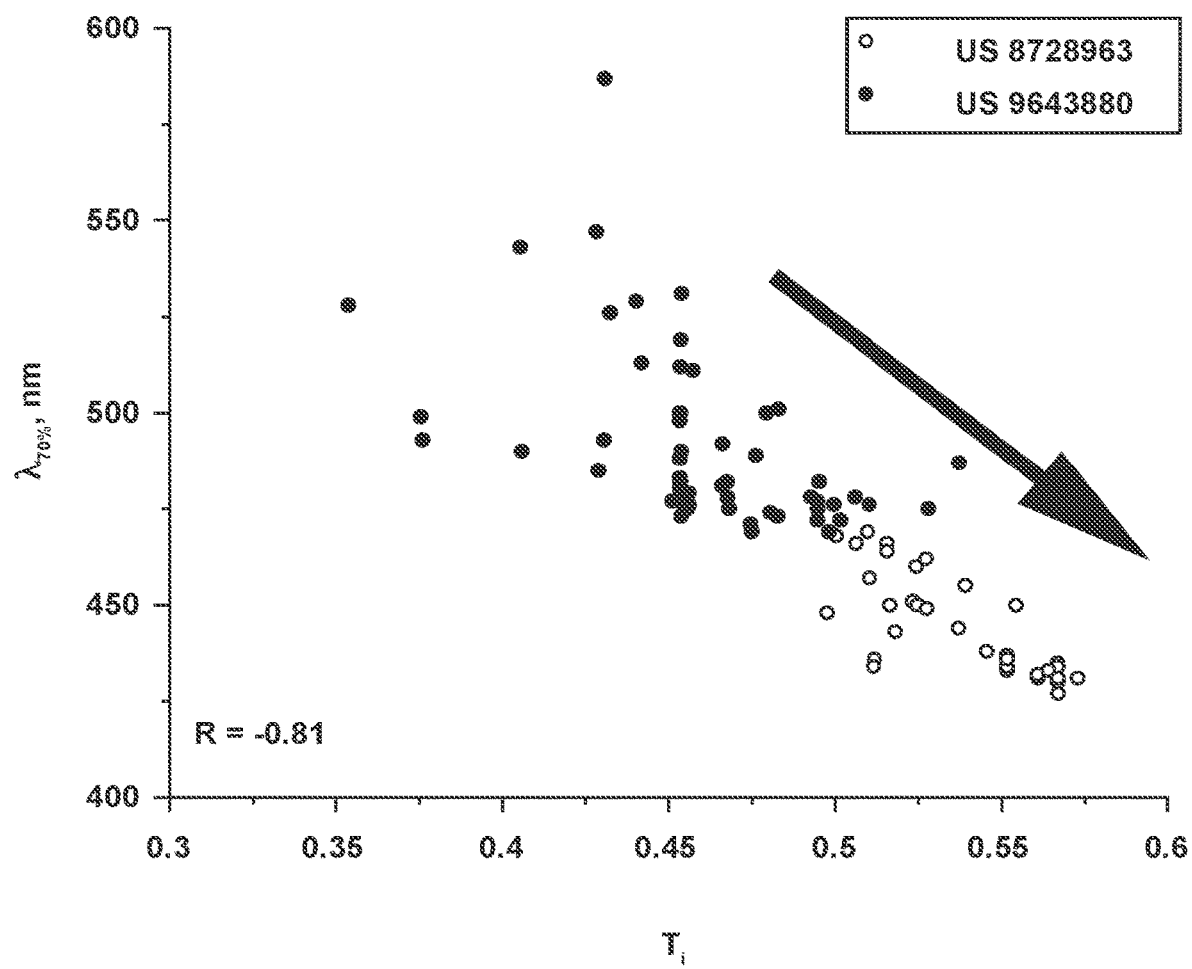
FIG. 1 is a plot illustrating the relationship between the transmittance index $T_i$ calculated according to formula (III) and the minimum wavelength corresponding to a total transmittance of at least 70% for a glass sample having a thickness of 10 mm ($\lambda_{70}$) for some comparative glasses.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those skilled in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The term "formed from" can mean one or more of comprises, consists essentially of, or consists of. For example, a component that is formed from a particular material can comprise the particular material, consist essentially of the particular material, or consist of the particular material.

Unless otherwise specified, all compositions are expressed in terms of as-batched mole percent (mol %). As will be understood by those having ordinary skill in the art, various melt constituents (e.g., fluorine, alkali metals, boron, etc.) may be subject to different levels of volatilization (e.g., as a function of vapor pressure, melt time and/or melt temperature) during melting of the constituents. As such, the term "about," in relation to such constituents, is intended to encompass values within about 0.2 mol % when measuring final articles as compared to the as-batched compositions provided herein. With the forgoing in mind, substantial compositional equivalence between final articles and as-batched compositions is expected. In some embodiments, where indicated, the compositions may be expressed in terms of as-batched percent by weight of oxides (wt %).

In the case when fluorine is added to or is present in an oxide glass, the molecular representation of the resulting glass composition may be expressed in different ways. In the present disclosure, the content of fluorine as a single term, when present, is expressed in terms of atomic percent (at.

%), which is determined based on the fraction of fluorine in a total sum of all atoms in a glass composition multiplied by a factor of 100.

In the present disclosure, the following method of representation of fluorine-containing compositions and concentration ranges is used. The concentration limits for all oxides (e.g. $SiO_2$, $B_2O_3$, $Na_2O$, etc.) are presented under the assumption that the respective cations (such as, for example, silicon [$Si^{4+}$], boron [$B^{3+}$], sodium [$Na^+$], etc.) are initially presented in the form of the corresponding oxides. When fluorine is present, for the purposes of calculating the concentration of components of the composition, some part of the oxygen in the oxide is equivalently replaced with fluorine (i.e. one atom of oxygen is replaced with two atoms of fluorine). The said fluorine is assumed to be present in the form of silicon fluoride ($SiF_4$); accordingly, the total sum of all oxides plus $SiF_4$ is assumed to be 100 mole percent or 100 weight percent in all compositions.

The terms "free" and "substantially free" are used interchangeably herein to refer to an amount and/or an absence of a particular component in a glass composition that is not intentionally added to the glass composition. It is understood that the glass composition may contain traces of a particular constituent component as a contaminant or a tramp in an amount of less than 0.10 mol %.

As used herein, the term "tramp," when used to describe a particular constituent component in a glass composition, refers to a constituent component that is not intentionally added to the glass composition and is present in an amount of less than 0.05 mol %. Tramp components may be unintentionally added to the glass composition as an impurity in another constituent component and/or through migration of the tramp component into the composition during processing of the glass composition.

The term "glass former" is used herein to refer to a component that, being solely present in the glass composition (i.e., without other components, except for tramps), is able to form a glass when cooling the melt at a rate of not greater than about 200° C./min to about 300° C./min.

The term "modifier", as used herein, refers to the oxides of monovalent or divalent metals, i.e., $M_2O$ or MO, where "M" stands for a metal. Modifiers can be added to a glass composition to change the atomic structure of the melt and the resulting glass. In some embodiments, the modifier may change the coordination numbers of cations present in the glass formers (e.g., boron in $B_2O_3$), which may result in forming a more polymerized atomic network and, as a result, may provide better glass formation.

As used herein, the term "RO" refers to a total content of divalent metal oxides, the term "$R_2O$" refers to a total content of monovalent metal oxides, and the term "$Alk_2O$" refers to a total content of alkali metal oxides. The term $R_2O$ encompasses alkali metal oxides ($Alk_2O$), in addition to other monovalent metal oxides, such as $Ag_2O$, $Tl_2O$, and $Hg_2O$, for example. As discussed below, in the present disclosure, a rare earth metal oxide is referred to herein by its normalized formula ($RE_2O_3$) in which the rare earth metal has the redox state "+3," and thus rare earth metal oxides are not encompassed by the term RO.

As used herein, the term "rare earth metals" refers to the metals listed in the Lanthanide Series of the IUPAC Periodic Table, plus yttrium and scandium. As used herein, the term "rare earth metal oxides," is used to refer to the oxides of rare earth metals in different redox states, such as "+3" for lanthanum in $La_2O_3$, "+4" for cerium in $CeO_2$, "+2" for europium in EuO, etc. In general, the redox states of rare earth metals in oxide glasses may vary and, in particular, the redox state may change during melting, based on the batch composition and/or the redox conditions in the furnace where the glass is melted and/or heat-treated (e.g., annealed). Unless otherwise specified, a rare earth metal oxide is referred to herein by its normalized formula in which the rare earth metal has the redox state "+3." Accordingly, in the case in which a rare earth metal having a redox state other than "+3" is added to the glass composition batch, the glass compositions are recalculated by adding or removing some oxygen to maintain the stoichiometry. For example, when $CeO_2$ (with cerium in redox state "+4") is used as a batch component, the resulting glass composition is recalculated assuming that two moles of $CeO_2$ is equivalent to one mole of $Ce_2O_3$, and the resulting glass composition is presented in terms of $Ce_2O_3$. As used herein, the term "$RE_mO_n$" is used to refer to the total content of rare earth metal oxides in all redox states present, and the term "$RE_2O_3$" is used to refer to the total content of rare earth metal oxides in the "+3" redox state.

The measured density values for the glasses reported herein were measured at room temperature in units of g/cm³ using a Helium pycnometer having an error of 0.001 g/cm³. As used herein, density measurements at room temperature (specified as $d_{RT}$) are indicated as being measured at 20° C. or 25° C., and encompass measurements obtained at temperatures that may range from 20° C. to 25° C. It is understood that room temperature may vary between about 20° C. to about 25° C., however, for the purposes of the present disclosure, the variation in density within the temperature range of 20° C. to 25° C. is expected to be less than the error of 0.001 g/cm³, and thus is not expected to impact the room temperature density measurements reported herein.

As used herein, unless otherwise specified, the term "low density" means a density less than or equal to 5.5 g/cm³ and the term "low density parameter" means a value of the density parameter $P_d$ less than or equal to 5.5 g/cm³.

As used herein, the term "refraction" refers to the relationship of the refractive index to the density according to the ratio: $(n_d-1)/d_{RT}$, where the refractive index $n_d$ is measured at 587.56 nm and the density is measured in g/cm³ at 25° C.

As used herein, good glass forming ability refers to a resistance of the melt to devitrification as the material cools. Glass forming ability can be measured by determining the critical cooling rate of the melt. The terms "critical cooling rate" or "$v_{cr}$" are used herein to refer to the minimum cooling rate at which a melt of a given composition forms a glass free of crystals visible under an optical microscope under magnification from 100× to 500×. The critical cooling rate can be used to measure the glass-forming ability of a composition, i.e., the ability of the melt of a given glass composition to form glass when cooling. Generally speaking, the lower the critical cooling rate, the better the glass-forming ability.

The term "liquidus temperature" is used herein to refer to a temperature above which the glass composition is completely liquid with no crystallization of constituent components of the glass. The liquidus temperature values reported herein were obtained by measuring samples using either DSC or by isothermal hold of samples wrapped in platinum foil. For samples measured using DSC, powdered samples were heated at 10 K/min to 1250° C. The end of the endothermic event corresponding to the melting of crystals was taken as the liquidus temperature. For the second technique (isothermal hold), a glass block (about 1 cm³) was wrapped in platinum foil, to avoid volatilization, and placed in a furnace at a given temperature for 17 hours. The glass block was then observed under an optical microscope to check for crystals.

The refractive index values reported herein were measured at room temperature (about 25° C.), unless otherwise specified. The refractive index values for a glass sample were measured using a Metricon Model 2010 prism coupler refractometer with an error of about ±0.0002. Using the Metricon, the refractive index of a glass sample was measured at two or more wavelengths of about 406 nm, 473 nm, 532 nm, 633 nm, 828 nm, and 1064 nm. The measured dependence characterizes the dispersion and was then fitted with a Cauchy's law equation or Sellmeier equation to allow for calculation of the refractive index of the sample at a given wavelength of interest between the measured wavelengths. The term "refractive index $n_d$" is used herein to refer to a refractive index calculated as described above at a wavelength of 587.56 nm, which corresponds to the helium d-line wavelength. The term "refractive index $n_C$" is used herein to refer to a refractive index calculated as described above at a wavelength of 656.3 nm. The term "refractive index $n_F$" is used herein to refer to a refractive index calculated as described above at a wavelength of 486.1 nm. The term "refractive index $n_g$" is used herein to refer to a refractive index calculated as described above at a wavelength of 435.8 nm.

As used herein, the terms "high refractive index" or "high index" refers to a refractive index value of a glass that is greater than or equal to at least 1.80, as measured at a wavelength of 587.56 nm, unless otherwise indicated. Where indicated, terms "high refractive index" or "high index" refers to a refractive index value of a glass that is greater than or equal to 1.80, greater than or equal to at least 1.85, greater than or equal to 1.90, greater than or equal to 1.95, or greater than or equal to 2.00, as measured at a wavelength of 587.56 nm. As used herein, the term "high refractive index parameter" refers to a value of the refractive index parameter $P_n$ that is greater than or equal to 1.80, greater than or equal to 1.85, greater than or equal to at least 1.90, greater than or equal to 1.95, or greater than or equal to 2.00.

As used herein, unless otherwise specified, the term "internal transmittance" is used to refer to the transmittance through a glass sample that is corrected for Fresnel losses. The term "transmittance" is used to refer to transmittance values for which Fresnel losses are not accounted for. Transmittance of the glass samples were measured on 2 mm thick samples with a Carry 5000 Spectrometer at wavelengths of from 250 nm to 2500 nm, at a resolution of 1 nm, and using an integrating sphere. The internal transmittance values for 10 mm thick samples was calculated between 375 nm and 1175 nm using the measured refractive index and the measured raw transmittance.

The term "blue light" is used herein to refer to blue and ultraviolet light corresponding to wavelengths of from about 330 nm to about 480 nm. As used herein, the term "internal transmittance for blue light" refers to the transmittance corrected for Fresnel losses as measured at a given wavelength for a glass sample having a thickness of 10 mm. The term "transmittance for blue light" refers to transmittance to blue light in which Fresnel losses are not taken into account. As used herein, internal transmittance (Fresnel losses accounted for) in the blue light region can be considered as acceptable when the internal transmittance is equal to or greater than 90%, good when equal to or greater than 95%, and excellent when equal to or greater than 97%, as measured at a wavelength of 460 nm for a sample having a thickness of 10 mm.

Embodiments of the present disclosure generally relate to silicoborate and borosilicate glasses which have a high refractive index and a high transmittance to blue light. In some embodiments, the glasses may also be characterized by a low density and/or good glass forming ability. In some embodiments, the glasses are characterized by good transmittance to light in the visible ranges of the spectrum.

According to an embodiment of the present disclosure, the glasses described herein include silicon dioxide ($SiO_2$) and/or boron oxide ($B_2O_3$) as glass formers. Increasing amounts of glass-forming oxides, such as $SiO_2$ and $B_2O_3$, can result in a corresponding increase in viscosity values at a given temperature, which may protect the melts from crystallization during cooling and thus provide a glass having a lower critical cooling rate. In some embodiments, the glass of the present disclosure may include both $SiO_2$ and $B_2O_3$ to provide a glass having a desirable critical cooling rate, i.e., a desired degree of glass forming ability.

According to some embodiments, the glass composition may comprise silica ($SiO_2$) in an amount of from greater than or equal to 0.0 mol % to less than or equal to 45.0 mol % and all ranges and sub-ranges between the foregoing values. In some embodiments, the glass composition may comprise $SiO_2$ in an amount greater than or equal to 0.0 mol %, greater than or equal to 0.3 mol %, greater than or equal to 1.0 mol %, greater than or equal to 2.0 mol %, greater than or equal to 3.0 mol %, greater than or equal to 5.0 mol %, greater than or equal to 9.6 mol %, greater than or equal to 10.0 mol %, greater than or equal to 15.0 mol %, greater than or equal to 20.0 mol %, greater than or equal to 25.0 mol %, greater than or equal to 30.0 mol %, greater than or equal to 31.0 mol %, or greater than or equal to 40.0 mol %. In some other embodiments, the glass composition may comprise $SiO_2$ in an amount of less than or equal to 45.0 mol %, less than or equal to 40.0 mol %, less than or equal to 32.0 mol %, less than or equal to 31.0 mol %, less than or equal to 30.0 mol %, less than or equal to 25.0 mol %, less than or equal to 20.0 mol %, less than or equal to 15.0 mol %, less than or equal to 10.0 mol %, less than or equal to 5.0 mol %, less than or equal to 3.0 mol %, less than or equal to 2.0 mol %, or less than or equal to 1.0 mol %. In some more embodiments, the glass composition may comprise $SiO_2$ in an amount of from 0.0 mol % to 45.0 mol %, 0.0 mol % to 40.0 mol %, from 0.0 mol % to 32.0 mol %, from 0.0 mol % to 10.0 mol %, from 0.3 mol % to 45.0 mol %, 0.3 mol % to 40.0 mol %, from 0.3 mol % to 30.0 mol %, 0.3 mol % to 10.0 mol %, from 1.0 mol % to 25.0 mol %, from 1.0 mol % to 10.0 mol %, from 2.0 mol % to 25.0 mol %, from 3.0 mol 5 to 45.0 mol %, from 40.0 mol % to 3.0 mol %, from 3.0 mol % to 30.0 mol %, from 3.0 mol % to 20.0 mol %, from 3.0 mol % to 10.0 mol %, from 10.0 mol % to 45.0 mol %, from 10.0 mol % to 40.0 mol %, from 10.0 mol % to 30.0 mol %, from 10.0 mol % to 20.0 mol %, from 15.0 mol % to 31.0 mol %, from 15.0 mol % to 30.0 mol %, from 17 mol % to 26 mol %, from 4 mol % to 20 mol %, or from 15 mol % to 30 mol %.

According to some embodiments, the glass composition may comprise boron oxide ($B_2O_3$) in an amount of from greater than or equal to 1.0 mol % to less than or equal to 45.0 mol % and all ranges and sub-ranges between the foregoing values. In some embodiments, the glass composition may comprise $B_2O_3$ in an amount greater than or equal to 1.0 mol %, greater than or equal to 2.0 mol %, greater than or equal to 3.0 mol %, greater than or equal to 4.0 mol %, greater than or equal to 5.0 mol %, greater than or equal to 9.0 mol %, greater than or equal to 10.0 mol %, greater than or equal to 15.0 mol %, greater than or equal to 16.9 mol %, greater than or equal to 20.0 mol %, greater than or equal to 25.0 mol %, greater than or equal to 30.0 mol %, greater than or equal to 35.0 mol %, greater than or equal to 37.0 mol %, greater than or equal to 38.0 mol %, or greater than or equal to 39.0 mol %. In some other embodiments, the glass composition may comprise $B_2O_3$ in an amount of less than or equal to 45.0 mol %, less than or equal to 40.0 mol %, less than or equal to 39.0 mol %, less than or equal to 38.0 mol %, less than or equal to 37.0 mol %, less than or equal to 35.0 mol %, less than or equal to 30.0 mol %, less than or equal to 29.0 mol %, less than or equal to 25.0 mol %, less than or equal to 20.0 mol %, less than or equal to 15.0 mol %, less than or equal to 10.0 mol %, less than or equal to 5.0 mol %, less than or equal to 4.0 mol %, less than or equal to 3.0 mol %, less than or equal to 2.0 mol %, or less than or equal to 1.0 mol %. In some more embodiments, the glass composition may comprise $B_2O_3$ in an amount of from 0.0 mol % to 45.0 mol %, from 0.0 mol % to 40.0 mol %, from 0.0 mol % to 30.0 mol %, from 1.0 mol % to 45.0 mol %, from 1.0 mol % to 40.0 mol %, from 1.0 mol % to 35.0 mol %, from 1.0 mol % to 29.0 mol %, from 1.0 mol % to 15.0 mol %, from 2.0 mol % to 35.0 mol %, from 3.0 mol % to 35.0 mol %, from 3.0 mol % to 29.0 mol %, from 3.0 mol % to 15.0 mol %, from 4.0 mol % to 40.0 mol %, from 4.0 mol % to 25.0 mol %, from 5.0 mol % to 40.0 mol %, from 5.0 mol % to 37.0 mol %, from 5.0 mol % to 29.0 mol %, from 5.0 mol % to 25.0 mol %, from 9.0 mol % to 33.0 mol %, from 10.0 mol % to 25.0 mol %, from 1.0 mol % to 29.0 mol %, from 10.0 mol % to 33.0 mol %, from 15.0 mol % to 38.0 mol %, from 15.0 mol % to 35.0 mol %, from 15.0 mol % to 33.0 mol %, from 15.0 mol % to 29.0 mol %, from 15.0 mol % to 25.0 mol %, from 20.0 mol % to 38.0 mol %, from 20.0 mol % to 35.0 mol %, from 20.0 mol % to 33.0 mol %, from 7.0 mol % to 33.0 mol %, from 6.0 mol % to 30.0 mol %, or from 12.0 mol % to 27.0 mol %.

However, the combination of $SiO_2$ and $B_2O_3$ may result in a decrease of the refractive index, which may make it more challenging to provide a glass having the desired high refractive index. Therefore, in some embodiments, total amount of $SiO_2$ and $B_2O_3$ ($SiO_2+B_2O_3$) in the glasses may be limited. In some embodiments, the glass composition may comprise a sum of ($SiO_2+B_2O_3$) in an amount of from greater than or equal to 0.0 mol % to less than or equal to 50.0 mol % and all ranges and sub-ranges between the foregoing values. In some embodiments, the glass composition may comprise ($SiO_2+B_2O_3$) in an amount of greater than or equal to 0.0 mol %, greater than or equal to 2.0 mol %, greater than or equal to 4.0 mol %, greater than or equal to 6.0 mol %, greater than or equal to 10.0 mol %, greater than or equal to 20.0 mol %, greater than or equal to 30.0 mol %, greater than or equal to 40.0 mol %, greater than or equal to 44.0 mol %, greater than or equal to 46.0 mol %, or greater than or equal to 48.0 mol %. In some other embodiments, the glass composition may comprise ($SiO_2+B_2O_3$) in an amount of less than or equal to 50.0 mol %, less than or equal to 48.0 mol %, less than or equal to 46.0 mol %, less than or equal to 44.0 mol %, less than or equal to 40.0 mol %, less than or equal to 30.0 mol %, less than or equal to 20.0 mol %, less than or equal to 10.0 mol %, less than or equal to 6.0 mol %, less than or equal to 4.0 mol %, or less than or equal to 2.0 mol %. In some more embodiments, the glass composition may comprise ($SiO_2+B_2O_3$) in an amount of from 0.0 mol % to 50.0 mol %, from 0.0 mol % to 48.0 mol %, from 0.0 mol % to 46.0 mol %, from 0.0 mol % to 44.0 mol %, from 0.0 mol % to 20.0 mol %, from 2.0 mol % to 50.0 mol %, from 2.0 mol % to 48.0 mol %, from 2.0 mol % to 46.0 mol %, from 2.0 mol % to 44.0 mol %, from 2.0 mol % to 20.0 mol %, from 6.0 mol % to 46.0 mol %, from 6.0 mol % to 20.0 mol %, from 10.0 mol % to 48.0 mol %, from 10.0 mol % to 46.0 mol %, from 10.0 mol % to 40.0 mol %, from 20.0 mol % to 50.0 mol %, from 20.0 mol % to 48.0 mol %, from 20.0 mol % to 46.0 mol %, from 20.0 mol % to 40.0 mol %, from 24.0 mol % to 48.0 mol %, from 30.0 mol % to 48.0 mol %, from 30.0 mol % to 44.0 mol %, from 30.0 mol % to 40.0 mol %, from 7.0 mol % to 40.0 mol %, from 23.0 mol % to 48.0 mol %, from 23.0 mol % to 40.0 mol %, or from 8.0 mol % to 30.0 mol %.

In some embodiments, the glass composition may have a ratio $SiO_2/(SiO_2+B_2O_3)$ [mol %] of from greater than or equal to 0.05 to less than or equal to 1.0 and all ranges and sub-ranges between the foregoing values. In some embodiments, the glass composition may have a ratio $SiO_2/(SiO_2+B_2O_3)$ [mol %] of greater than or equal to 0.05, greater than or equal to 0.1, greater than or equal to 0.1, greater than or equal to 0.2, greater than or equal to 0.25, greater than or equal to 0.3, greater than or equal to 0.5, greater than or equal to 0.8, greater than or equal to 0.85, or greater than or equal to 0.9. In some other embodiments, the glass composition may have a ratio $SiO_2/(SiO_2+B_2O_3)$ [mol %] of less than or equal to 1.0, less than or equal to 0.9, less than or equal to 0.95, less than or equal to 0.8, less than or equal to 0.85, less than or equal to 0.5, less than or equal to 0.3, less than or equal to 0.25, less than or equal to 0.2, or less than or equal to 0.1. In some more embodiments, the glass composition may have ratio $SiO_2/(SiO_2+B_2O_3)$ [mol %] of from 0.05 to 1.0, from 0.05 to 0.95, from 0.05 to 0.9, from 0.05 to 0.8, from 0.05 to 0.6, from 0.05 to 0.5, from 0.05 to 0.3, from 0.1 to 1.0, from 0.1 to 0.8, from 0.2 to 0.9, from 0.2 to 0.8, from 0.2 to 0.8, from 0.3 to 1.0, from 0.3 to 0.9, from 0.3 to 0.8, from 0.5 to 1.0, from 0.5 to 0.9, from 0.5 to 0.9, from 0.5 to 0.8, from 0.5 to 0.8, from 0.8 to 0.9, from 0.4 to 0.7, from 0.3 to 0.6, or from 0.4 to 0.7.

According to an embodiment of the present disclosure, the glass can include one or more index raisers that have been added to increase a refractive index of the glass. Examples of index raisers that can be used with the glasses of the present disclosure include titania ($TiO_2$), niobia ($Nb_2O_5$), zirconia ($ZrO_2$), and other rare earth metal oxides.

Titania ($TiO_2$) is generally expected to increase the refractive index of the glass, in combination with achieving a low density and/or acceptably low dispersion. In some examples, titania may produce a glass that is yellow or brown coloring, which can be addressed by bleaching, such as by melting and/or annealing in oxidation conditions and/or through the addition of one or more oxidizers, examples of which include $CeO_2$, $As_2O_5$, and $Mn_2O_3$, etc., to the glass batch. In some cases, titania at too high amount may cause crystallization of refractory species, e.g. rutile ($TiO_2$), sphene ($CaTiSiO_5$), and titanium niobates (e.g. $Ti_2Nb_{10}O_{29}$), etc., which may result in increasing the liquidus temperature of the glass and thus may decrease the glass-forming ability of the melt. In addition, at high concentrations, titania may cause liquid-liquid phase separation of the melt, which may result in a loss of transmittance of the glass.

In some embodiments, the glass composition may comprise titania ($TiO_2$) in an amount of from greater than or equal to 0.0 mol % to less than or equal to 59.0 mol % and all ranges and sub-ranges between the foregoing values. In some embodiments, the glass composition may comprise $TiO_2$ in an amount greater than or equal to 0.0 mol %, greater than or equal to 0.3 mol %, greater than or equal to 1.0 mol %, greater than or equal to 2.0 mol %, greater than or equal to 4.0 mol %, greater than or equal to 6.0 mol %, greater than or equal to 7.0 mol %, greater than or equal to 9.0 mol %, greater than or equal to 10.0 mol %, greater than or equal to 20.0 mol %, greater than or equal to 30.0 mol %, greater than or equal to 40.0 mol %, greater than or equal to 50.0 mol %, greater than or equal to 53.0 mol %, greater than or equal to 55.0 mol %, or greater than or equal to 57.0 mol %. In some other embodiments, the glass composition may comprise $TiO_2$ in an amount less than or equal to 59.0 mol %, less than or equal to 57.0 mol %, less than or equal to 55.0 mol %, less than or equal to 53.0 mol %, less than or equal to 50.0 mol %, less than or equal to 40.0 mol %, less than or equal to 30.0 mol %, less than or equal to 20.0 mol %, less than or equal to 10.0 mol %, less than or equal to 6.0 mol %, less than or equal to 4.0 mol %, or less than or equal to 2.0 mol %. In some more embodiments, the glass composition may comprise $TiO_2$ in an amount of from 0.0 mol % to 59.0 mol %, from 0.0 mol % to 50.0 mol %, from 0.0 mol % to 40.0 mol %, from 0.0 mol % to 18.0 mol %, from 0.3 mol % to 40.0 mol %, from 0.3 mol % to 18.0 mol %, from 1.0 mol % to 40.0 mol %, from 1.0 mol % to 18.0 mol %, from 2.0 mol % to 53.0 mol %, from 2.0 mol % to 30.0 mol %, from 4.0 mol % to 30.0 mol %, from 6.0 mol % to 59.0 mol %, from 6.0 mol % to 53.0 mol %, from 10.0 mol % to 55.0 mol %, from 10.0 mol % to 50.0 mol %, from 10.0 mol % to 30.0 mol %, from 20.0 mol % to 55.0 mol %, from 20.0 mol % to 50.0 mol %, from 20.0 mol % to 30.0 mol %, from 30.0 mol % to 55.0 mol %, from 30.0 mol % to 50.0 mol %, from 40.0 mol % to 59.0 mol %, from 40.0 mol % to 57.0 mol %, from 40.0 mol % to 50.0 mol %, from 7.0 mol % to 24.0 mol %, from 21.0 mol % to 38.0 mol %, or from 30.0 mol % to 54.0 mol %.

Niobia ($Nb_2O_5$), like titania, can be used in some aspects of the present disclosure to increase the refractive index of glass while also maintaining a low density. However, niobia can introduce a yellow coloring to the glass that cannot be bleached in the same manner as titania, which can result in a loss of transmittance, particularly in the blue and UV range. Niobia, like titania, may cause crystallization and/or phase separation of the melt. In some cases, niobia may provide the glass with a high optical dispersion, which can be significantly higher than that induced by titania and some other index raisers, when added in similar concentrations. The effects of niobia can be affected by the other components of the glass, and thus it can be challenging to determine an exact limit for niobia. In some embodiments the glass may be free or substantially free of niobia.

In some embodiments, the glass composition may comprise niobia ($Nb_2O_5$) in an amount of from greater than or equal to 0.0 mol % to less than or equal to 25.0 mol % and all ranges and sub-ranges between the foregoing values. In some embodiments, the glass composition may comprise $Nb_2O_5$ in an amount of greater than or equal to 0.0 mol %, greater than or equal to 1.0 mol %, greater than or equal to 2.0 mol %, greater than or equal to 3.0 mol %, greater than or equal to 5.0 mol %, greater than or equal to 10.0 mol %, greater than or equal to 15.0 mol %, greater than or equal to 20.0 mol %, greater than or equal to 22.0 mol %, greater than or equal to 23.0 mol %, or greater than or equal to 24.0 mol %. In some other embodiments, the glass composition may comprise $Nb_2O_5$ in an amount of less than or equal to 25.0 mol %, less than or equal to 24.0 mol %, less than or equal to 23.0 mol %, less than or equal to 22.0 mol %, less than or equal to 20.0 mol %, less than or equal to 15.0 mol %, less than or equal to 10.0 mol %, less than or equal to 5.0 mol %, less than or equal to 3.0 mol %, less than or equal to 2.0 mol %, or less than or equal to 1.0 mol %. In some more embodiments, the glass composition may comprise $Nb_2O_5$ in an amount of from 0.0 mol % to 25.0 mol %, from 0.0 mol % to 22.0 mol %, from 0.0 mol % to 12.0 mol %, from 0.0 mol % to 10.0 mol %, from 0.0 mol % to 7.0 mol %, from 0.3 mol % to 15.0 mol %, from 0.3 mol % to 12.0 mol %, from 0.3 mol % to 7.0 mol %, from 1.0 mol % to 10.0 mol %, from 2.0 mol % to 25.0 mol %, from 2.0 mol % to 22.0 mol %, from 3.0 mol % to 23.0 mol %, from 3.0 mol % to 20.0 mol %, from 3.0 mol % to 10.0 mol %, from 5.0 mol % to 23.0 mol %, from 10.0 mol % to 25.0 mol %, from 10.0 mol % to 23.0 mol %, from 15.0 mol % to 25.0 mol %, from 15.0 mol % to 22.0 mol %, from 15.0 mol % to 20.0 mol %, from 11.0 mol % to 22.0 mol %, from 8.0 mol % to 20.0 mol %, or from 10.0 mol % to 21.0 mol %.

Zirconia ($ZrO_2$) is another example of an oxide that can increase the refractive index of glasses of the present disclosure while maintaining an acceptably low density. In some examples, $ZrO_2$ may provide the glass with a higher density compared to that of $TiO_2$ and $Nb_2O_5$ at similar refractive index values. $ZrO_2$ can also increase the viscosity of the melt, which may help to protect the melt from crystallization. In contrast to other index raisers that can provide the glass with a low density, such as $TiO_2$ and $Nb_2O_5$, $ZrO_2$ does not introduce coloring in the glass in the visible and near-UV ranges, which may help to maintain a high transmittance of the glass. However, high concentrations of zirconia may cause crystallization of refractory minerals, such as zirconia ($ZrO_2$), zircon ($ZrSiO_4$), calcium zirconate ($CaZrO_3$) and others, which can increase the liquidus temperature. As a result, crystallization may happen at a lower viscosity, which may decrease the glass forming ability of the melt (i.e., may increase the critical cooling rate). To address these challenges, according to one aspect of the present disclosure, the content of zirconia in the glasses is less than or equal to 13.5 mol % and in some examples the glasses are free or substantially free of zirconia. In some cases, such as when the requirements for glass forming ability are low, the glasses may include higher amounts of zirconia.

In some embodiments, the glass composition may comprise zirconia ($ZrO_2$) in an amount of from greater than or equal to 0.0 mol % to less than or equal to 13.5 mol % and all ranges and sub-ranges between the foregoing values. In some embodiments, the glass composition may comprise $ZrO_2$ in an amount greater than or equal to 0.0 mol %, greater than or equal to 1.0 mol %, greater than or equal to 2.0 mol %, greater than or equal to 2.5 mol %, greater than or equal to 3.0 mol %, greater than or equal to 5.0 mol %, greater than or equal to 6.1 mol %, greater than or equal to 10.0 mol %, greater than or equal to 10.5 mol %, greater than or equal to 11.5 mol %, or greater than or equal to 12.5 mol %. In some other embodiments, the glass composition may comprise $ZrO_2$ in an amount less than or equal to 13.5 mol %, less than or equal to 12.5 mol %, less than or equal to 11.5 mol %, less than or equal to 10.5 mol %, less than or equal to 10.0 mol %, less than or equal to 5.0 mol %, less than or equal to 3.0 mol %, less than or equal to 2.0 mol %, or less than or equal to 1.0 mol %. In some more embodiments, the glass composition may comprise $ZrO_2$ in an amount of from 0.0 mol % to 13.5 mol %, from 0.0 mol % to 10.5 mol %, from 0.0 mol % to 7.8 mol %, from 0.3 mol % to 13.5 mol %, from 0.3 mol % to 10.0 mol %, from 0.3 mol % to 7.8 mol %, from 1.0 mol % to 11.5 mol %, from 1.0 mol % to 10.0 mol %, from 2.0 mol % to 11.5 mol %, from 2.0 mol % to 10.0 mol %, from 3.0 mol % to 13.5 mol %, from 5.0 mol % to 13.5 mol %, from 10.0 mol % to 12.5 mol %, from 6.5 mol % to 12.4 mol %, from 3.6 mol % to 13.2 mol %, or from 6.8 mol % to 12.4 mol %.

In some embodiments, rare earth metal oxides may be added to the glass composition to increase the refractive index of the glasses of the present disclosure. Examples of rare earth metal oxides that can be added to glasses of the present disclosure include $La_2O_3$, $Gd_2O_3$, $Yb_2O_3$, $Y_2O_3$, and $Sc_2O_3$. In some embodiments, the glass composition includes at least one rare earth metal oxide selected from $La_2O_3$, $Gd_2O_3$, $Yb_2O_3$, and combinations thereof. The oxides of the two last elements, $Y_2O_3$ and $Sc_2O_3$, can also provide the glass with a comparably low density, less than that for titania and niobia at similar refractive indices. However, scandium oxide ($Sc_2O_3$) can be expensive and thus may not be desirable in mass-production. In some cases, $Sc_2O_3$ may be acceptable where the cost of the glass batch is of lower priority. Yttrium oxide ($Y_2O_3$) is of lower cost than scandium oxide. However, in some cases, $Y_2O_3$ may decrease the glass forming ability of the glass (i.e., increase the critical cooling rate), even at lower concentrations. Thus, according to some embodiments of the present disclosure, the glass may be free or substantially free of $Y_2O_3$.

In some embodiments, the glass composition may comprise yttria ($Y_2O_3$) in an amount of from greater than or equal to 0.0 mol % to less than or equal to 10.0 mol % and all ranges and sub-ranges between the foregoing values. In some embodiments, the glass composition may comprise $Y_2O_3$ in an amount of greater than or equal to 0.0 mol %, greater than or equal to 0.5 mol %, greater than or equal to 1.0 mol %, greater than or equal to 1.5 mol %, greater than or equal to 2.5 mol %, greater than or equal to 5.0 mol %, greater than or equal to 7.5 mol %, greater than or equal to 8.5 mol %, greater than or equal to 9.0 mol %, or greater than or equal to 9.5 mol %. In some other embodiments, the glass composition may comprise $Y_2O_3$ in an amount less than or equal to 10.0 mol %, less than or equal to 9.5 mol %, less than or equal to 9.0 mol %, less than or equal to 8.5 mol %, less than or equal to 7.5 mol %, less than or equal to 5.0 mol %, less than or equal to 3.0 mol %, less than or equal to 2.5 mol %, less than or equal to 1.5 mol %, less than or equal to 1.0 mol %, or less than or equal to 0.5 mol %. In some more embodiments, the glass composition may comprise $Y_2O_3$ in an amount from 0.0 mol % to 10.0 mol %, from 0.0 mol % to 8.5 mol %, from 0.0 mol % to 3.0 mol %, from 0.0 mol % to 2.5 mol %, from 0.0 mol % to 1.5 mol %, from 1.0 mol % to 9.0 mol %, from 1.5 mol % to 10.0 mol %, from 2.5 mol % to 7.5 mol %, from 5.0 mol % to 8.5 mol %, 1.5 mol % to 5.5 mol %, from 4.7 mol % to 7.3 mol %, or from 7.3 mol % to 9.9 mol %.

Among the rare earth metal oxides, with the exception of $Y_2O_3$ and $Sc_2O_3$, in some aspects, lanthanum oxide ($La_2O_3$) may be a preferred index raiser. $La_2O_3$ can provide the glasses of the present disclosure with a lower density at similar refractive indices compared to several other rare earth metal oxides. $La_2O_3$ can also provide the glass composition with acceptably good glass formation and is among the most cost efficient of rare earth metal oxides. Thus, in some aspects of the present disclosure, the glass composition can comprise at least some amount of $La_2O_3$. However, in some cases, when the concentration of $La_2O_3$ becomes too high, lanthanum oxide can cause precipitation of refractory species, such as lanthanum silicates ($La_4Si_3O_{12}$, $La_2SiO_5$, $La_2Si_2O_7$), lanthanum borates ($LaBO_3$, $LaB_3O_6$), lanthanum niobate ($LaNbO_4$), lanthanum zirconates ($La_2ZrO_5$, $La_2Zr_2O_7$), lanthanum titanates ($La_2TiO_5$, $La_2Ti_2O_7$) and others, which can increase the liquidus temperature of the glass and may reduce the glass forming ability of the composition. In addition, high concentrations of $La_2O_3$ may stimulate phase separation in the melt that results in a loss of transmittance of the resulting glass. Similar adverse effects can also occur upon the addition of other rare earth metal oxides in high concentrations.

In some embodiments, the glass composition may comprise lanthanum oxide ($La_2O_3$) in an amount of from greater than or equal to 0.0 mol % to less than or equal to 50.0 mol % and all ranges and sub-ranges between the foregoing values. In some embodiments, the glass composition may comprise $La_2O_3$ in an amount of greater than or equal to 0.0 mol %, greater than or equal to 0.3 mol %, greater than or equal to 2.0 mol %, greater than or equal to 4.0 mol %, greater than or equal to 5.0 mol %, greater than or equal to 6.0 mol %, greater than or equal to 10.0 mol %, greater than or equal to 15.0 mol %, greater than or equal to 20.0 mol %, greater than or equal to 30.0 mol %, greater than or equal to 40.0 mol %, greater than or equal to 44.0 mol %, greater than or equal to 46.0 mol %, or greater than or equal to 48.0 mol %. In some other embodiments, the glass composition may comprise $La_2O_3$ in an amount of less than or equal to 50.0 mol %, less than or equal to 48.0 mol %, less than or equal to 46.0 mol %, less than or equal to 44.0 mol %, less than or equal to 40.0 mol %, less than or equal to 30.0 mol %, less than or equal to 20.0 mol %, less than or equal to 10.0 mol %, less than or equal to 6.0 mol %, less than or equal to 4.0 mol %, or less than or equal to 2.0 mol %. In some more embodiments, the glass composition may comprise $La_2O_3$ in an amount of from 0.0 mol % to 50.0 mol %, from 0.0 mol % to 44.0 mol %, from 0.0 mol % to 30.0 mol %, from 0.0 mol % to 20.0 mol %, from 0.3 mol % to 30.0 mol %, 0.3 mol % to 20.0 mol %, from 2.0 mol % to 20.0 mol %, from 4.0 mol % to 44.0 mol %, from 6.0 mol % to 50.0 mol %, from 6.0 mol % to 46.0 mol %, from 6.0 mol % to 40.0 mol %, from 6.0 mol % to 20.0 mol %, from 10.0 mol % to 46.0 mol %, from 10.0 mol % to 40.0 mol %, from 10.0 mol % to 20.0 mol %, from 15.0 mol % to 50.0 mol %, from 15.0 mol % to 40.0 mol %, from 15.0 mol % to 30.0 mol %, from 20.0 mol % to 40.0 mol %, from 30.0 mol % to 48.0 mol %, from 30.0 mol % to 46.0 mol %, from 30.0 mol % to 44.0 mol %, from 30.0 mol % to 40.0 mol %, from 7.0 mol % to 25.0 mol %, from 25.0 mol % to 42.0 mol %, or from 25.0 mol % to 46.0 mol %.

In some embodiments, the glasses of the present disclosure may optionally include additional and/or alternative index raisers, such as tungsten oxide ($WO_3$), tantalum oxide ($Ta_2O_5$), thorium oxide ($ThO_2$), bismuth oxide ($Bi_2O_3$), which may be used in small amounts, if present. In some embodiments, the glasses of the present disclosure are free or substantially free of tungsten oxide ($WO_3$), tantalum oxide ($Ta_2O_5$), thorium oxide ($ThO_2$), bismuth oxide ($Bi_2O_3$). In some embodiments, the glasses may optionally include additional and/or alternative index raisers selected from vanadia ($V_2O_5$), molybdenum oxide ($MoO_3$), germania ($GeO_2$), tellurium oxide ($TeO_2$), fluorides (e.g. $ZrF_4$, $LaF_3$, etc.), and thallium oxide ($Tl_2O$). Index raisers such as $V_2O_5$, $MoO_3$, $GeO_2$, $TeO_2$, fluorides, and $Tl_2O$ may be generally less preferred in some cases due to low transmittance, cost, and/or environmental concerns, however, these index raisers may be used in some cases.

In some embodiments, the glass composition may comprise tantalum oxide ($Ta_2O_5$) in an amount of from greater than or equal to 0.0 mol % to less than or equal to 5.0 mol % and all ranges and sub-ranges between the foregoing values. In some embodiments, the glass composition may comprise $Ta_2O_5$ in an amount of greater than or equal to 0.0 mol %, greater than or equal to 0.2 mol %, greater than or equal to 0.4 mol %, greater than or equal to 0.6 mol %, greater than or equal to 1.0 mol %, greater than or equal to 2.0 mol %, greater than or equal to 3.0 mol %, greater than or equal to 4.0 mol %, greater than or equal to 4.4 mol %, greater than or equal to 4.6 mol %, or greater than or equal to 4.8 mol %. In some other embodiments, the glass composition may comprise $Ta_2O_5$ in an amount of less than or equal to 5.0 mol %, less than or equal to 4.8 mol %, less than or equal to 4.6 mol %, less than or equal to 4.4 mol %, less than or equal to 4.0 mol %, less than or equal to 3.0 mol %, less than or equal to 2.0 mol %, less than or equal to 1.5 mol %, less than or equal to 1.0 mol %, less than or equal to 0.6 mol %, less than or equal to 0.5 mol %, less than or equal to 0.4 mol %, or less than or equal to 0.2 mol %. In some more embodiments, the glass composition may comprise $Ta_2O_5$ in an amount of from 0.0 mol % to 5.0 mol %, from 0.0 mol % to 4.4 mol %, from 0.0 mol % to 2.0 mol %, from 0.0 mol % to 1.5 mol %, from 0.0 mol % to 0.5 mol %, from 0.2 mol % to 4.4 mol %, from 0.2 mol % to 2.0 mol %, from 0.4 mol % to 4.4 mol %, from 0.6 mol % to 4.6 mol %, from 0.6 mol % to 4.0 mol %, from 0.6 mol % to 2.0 mol %, from 1.0 mol % to 5.0 mol %, from 1.0 mol % to 4.6 mol %, from 1.0 mol % to 4.0 mol %, from 2.0 mol % to 4.0 mol %, from 3.0 mol % to 5.0 mol %, from 3.0 mol % to 4.6 mol %, from 3.0 mol % to 4.4 mol %, from 3.0 mol % to 4.0 mol %, from 1.0 mol % to 3.0 mol %, from 2.0 mol % to 4.0 mol %, or from 1.0 mol % to 4.0 mol %.

In some embodiments, the glass composition may comprise bismuth oxide ($Bi_2O_3$) in an amount of from greater than or equal to 0.0 mol % to less than or equal to 20.0 mol % and all ranges and sub-ranges between the foregoing values. In some embodiments, the glass composition may comprise $Bi_2O_3$ in an amount of greater than or equal to 0.0 mol %, greater than or equal to 1.0 mol %, greater than or equal to 2.0 mol %, greater than or equal to 3.0 mol %, greater than or equal to 5.0 mol %, greater than or equal to 10.0 mol %, greater than or equal to 15.0 mol %, greater than or equal to 17.0 mol %, greater than or equal to 18.0 mol %, or greater than or equal to 19.0 mol %. In some other embodiments, the glass composition may comprise $Bi_2O_3$ in an amount of less than or equal to 20.0 mol %, less than or equal to 19.0 mol %, less than or equal to 18.0 mol %, less than or equal to 17.0 mol %, less than or equal to 15.0 mol %, less than or equal to 10.0 mol %, less than or equal to 5.0 mol %, less than or equal to 3.0 mol %, less than or equal to 2.0 mol %, or less than or equal to 1.0 mol %. In some more embodiments, the glass composition may comprise $Bi_2O_3$ in an amount of from 0.0 mol % to 20.0 mol %, from 0.0 mol % to 10.0 mol %, from 1.0 mol % to 5.0 mol %, from 2.0 mol % to 15.0 mol %, from 3.0 mol % to 20.0 mol %, from 3.0 mol % to 18.0 mol %, from 5.0 mol % to 18.0 mol %, from 5.0 mol % to 15.0 mol %, from 10.0 mol % to 20.0 mol %, from 10.0 mol % to 18.0 mol %, from 10.0 mol % to 17.0 mol %, from 5.0 mol % to 10.0 mol %, from 6.0 mol % to 14.0 mol %, or from 3.0 mol % to 10.0 mol %.

In some embodiments, the glass composition may comprise tungsten oxide ($WO_3$) in an amount of from greater than or equal to 0.0 mol % to less than or equal to 10.0 mol % and all ranges and sub-ranges between the foregoing values. In some embodiments, the glass composition may comprise $WO_3$ in an amount of greater than or equal to 0.0 mol %, greater than or equal to 2.5 mol %, greater than or equal to 5.0 mol %, or greater than or equal to 7.5 mol %. In some other embodiments, the glass composition may comprise $WO_3$ in an amount of less than or equal to 10.0 mol %, less than or equal to 7.5 mol %, less than or equal to 5.0 mol %, or less than or equal to 2.5 mol %. In some more embodiments, the glass composition may comprise $WO_3$ in an amount of from 0.0 mol % to 10.0 mol %, from 0.0 mol % to 7.5 mol %, from 0.0 mol % to 5.0 mol %, from 0.0 mol % to 2.5 mol %, from 2.5 mol % to 10.0 mol %, from 2.5 mol % to 7.5 mol %, from 2.5 mol % to 5.0 mol %, from 5.0 mol % to 10.0 mol %, from 5.0 mol % to 7.5 mol %, from 4.5 mol % to 7.9 mol %, from 5.9 mol % to 9.6 mol %, or from 3.0 mol % to 8.0 mol %.

In some embodiments, the glass composition may comprise germania ($GeO_2$) in an amount of from greater than or equal to 0.0 mol % to less than or equal to 10.0 mol % and all ranges and sub-ranges between the foregoing values. In some embodiments, the glass composition may comprise $GeO_2$ in an amount of greater than or equal to 0.0 mol %, greater than or equal to 0.5 mol %, greater than or equal to 1.0 mol %, greater than or equal to 1.5 mol %, greater than or equal to 2.5 mol %, greater than or equal to 5.0 mol %, greater than or equal to 7.5 mol %, greater than or equal to 8.5 mol %, greater than or equal to 9.0 mol %, or greater than or equal to 9.5 mol %. In some other embodiments, the glass composition may comprise $GeO_2$ in an amount of less than or equal to 10.0 mol %, less than or equal to 9.5 mol %, less than or equal to 9.0 mol %, less than or equal to 8.5 mol %, less than or equal to 7.5 mol %, less than or equal to 5.0 mol %, less than or equal to 2.5 mol %, less than or equal to 1.5 mol %, less than or equal to 1.0 mol %, or less than or equal to 0.5 mol %. In some more embodiments, the glass composition may comprise $GeO_2$ in an amount of from 0.0 mol % to 10.0 mol %, from 0.0 mol % to 2.5 mol %, from 0.5 mol % to 2.5 mol %, from 1.0 mol % to 10.0 mol %, from 1.0 mol % to 9.0 mol %, from 1.0 mol % to 7.5 mol %, from 1.5 mol % to 9.0 mol %, from 1.5 mol % to 7.5 mol %, from 2.5 mol % to 10.0 mol %, from 2.5 mol % to 9.0 mol %, from 2.5 mol % to 7.5 mol %, from 5.0 mol % to 8.5 mol %, from 5.0 mol % to 7.5 mol %, from 7.5 mol % to 9.5 mol %, from 7.0 mol % to 9.9 mol %, from 3.4 mol % to 8.3 mol %, or from 5.0 mol % to 9.0 mol %.

In some embodiments, the glass composition may comprise tellurium oxide ($TeO_2$) in an amount of from greater than or equal to 0.0 mol % to less than or equal to 10.0 mol % and all ranges and sub-ranges between the foregoing values. In some embodiments, the glass composition may comprise $TeO_2$ in an amount of greater than or equal to 0.0 mol %, greater than or equal to 0.5 mol %, greater than or equal to 1.0 mol %, greater than or equal to 1.5 mol %, greater than or equal to 2.5 mol %, greater than or equal to 5.0 mol %, greater than or equal to 7.5 mol %, greater than or equal to 8.5 mol %, greater than or equal to 9.0 mol %, or greater than or equal to 9.5 mol %. In some other embodiments, the glass composition may comprise $TeO_2$ in an amount of less than or equal to 10.0 mol %, less than or equal to 9.5 mol %, less than or equal to 9.0 mol %, less than or equal to 8.5 mol %, less than or equal to 7.5 mol %, less than or equal to 5.0 mol %, less than or equal to 2.5 mol %, less than or equal to 1.5 mol %, less than or equal to 1.0 mol %, or less than or equal to 0.5 mol %. In some more embodiments, the glass composition may comprise $TeO_2$ in an amount of from 0.0 mol % to 10.0 mol %, from 0.0 mol % to 5.0 mol %, from 0.0 mol % to 2.5 mol %, from 0.5 mol % to 10.0 mol %, from 0.5 mol % to 2.5 mol %, from 1.0 mol % to 9.0 mol %, from 1.0 mol % to 7.5 mol %, from 1.5 mol % to 9.0 mol %, from 1.5 mol % to 7.5 mol %, from 2.5 mol % to 9.5 mol %, from 2.5 mol % to 7.5 mol %, from 5.0 mol % to 9.5 mol %, from 5.0 mol % to 8.5 mol %, from 5.0 mol % to 7.5 mol %, from 1.9 mol % to 6.0 mol %, from 5.0 mol % to 9.2 mol %, or from 3.5 mol % to 9.2 mol %.

In some embodiments, the glass composition may comprise hafnium oxide ($HfO_2$) in an amount of from greater than or equal to 0.0 mol % to less than or equal to 5.0 mol % and all ranges and sub-ranges between the foregoing values. In some embodiments, the glass composition may comprise $HfO_2$ in an amount of greater than or equal to 0.0 mol %, greater than or equal to 0.2 mol %, greater than or equal to 0.4 mol %, greater than or equal to 0.6 mol %, greater than or equal to 1.0 mol %, greater than or equal to 2.0 mol %, greater than or equal to 3.0 mol %, greater than or equal to 4.0 mol %, greater than or equal to 4.4 mol %, greater than or equal to 4.6 mol %, or greater than or equal to 4.8 mol %. In some other embodiments, the glass composition may comprise $HfO_2$ in an amount of less than or equal to 5.0 mol %, less than or equal to 4.8 mol %, less than or equal to 4.6 mol %, less than or equal to 4.4 mol %, less than or equal to 4.0 mol %, less than or equal to 3.0 mol %, less than or equal to 2.0 mol %, less than or equal to 1.0 mol %, less than or equal to 0.6 mol %, less than or equal to 0.4 mol %, or less than or equal to 0.2 mol %. In some more embodiments, the glass composition may comprise $HfO_2$ in an amount of from 0.0 mol % to 5.0 mol %, from 0.0 mol % to 4.4 mol %, from 0.0 mol % to 2.0 mol %, from 0.0 mol % to 1.0 mol %, from 0.2 mol % to 5.0 mol %, from 0.2 mol % to 4.4 mol %, from 0.2 mol % to 2.0 mol %, from 0.2 mol % to 1.0 mol %, from 0.4 mol % to 2.0 mol %, from 0.6 mol % to 4.0 mol %, from 0.6 mol % to 2.0 mol %, from 1.0 mol % to 4.6 mol %, from 1.0 mol % to 4.0 mol %, from 2.0 mol % to 4.6 mol %, from 2.0 mol % to 4.0 mol %, from 3.0 mol % to 4.8 mol %, from 3.0 mol % to 4.6 mol %, from 3.0 mol % to 4.4 mol %, from 3.0 mol % to 4.0 mol %, from 1.0 mol % to 3.0 mol %, from 3.0 mol % to 5.0 mol %, or from 2.0 mol % to 3.0 mol %.

In some embodiments, the glass composition may comprise gadolinium oxide ($Gd_2O_3$) in an amount of from greater than or equal to 0.0 mol % to less than or equal to 27.0 mol % and all ranges and sub-ranges between the foregoing values. In some embodiments, the glass composition may comprise $Gd_2O_3$ in an amount of greater than or equal to 0.0 mol %, greater than or equal to 1.0 mol %, greater than or equal to 2.0 mol %, greater than or equal to 3.0 mol %, greater than or equal to 5.0 mol %, greater than or equal to 10.0 mol %, greater than or equal to 15.0 mol %, greater than or equal to 20.0 mol %, greater than or equal to 25.0 mol %, or greater than or equal to 26.0 mol %. In some other embodiments, the glass composition may comprise $Gd_2O_3$ in an amount of less than or equal to 27.0 mol %, less than or equal to 26.0 mol %, less than or equal to 25.0 mol %, less than or equal to 20.0 mol %, less than or equal to 15.0 mol %, less than or equal to 10.0 mol %, less than or equal to 5.0 mol %, less than or equal to 3.0 mol %, less than or equal to 2.0 mol %, or less than or equal to 1.0 mol %. In some more embodiments, the glass composition may comprise $Gd_2O_3$ in an amount of from 0.0 mol % to 27.0 mol %, from 0.0 mol % to 15.0 mol %, from 2.0 mol % to 27.0 mol %, from 2.0 mol % to 25.0 mol %, from 2.0 mol % to 15.0 mol %, from 3.0 mol % to 25.0 mol %, from 5.0 mol % to 25.0 mol %, from 5.0 mol % to 15.0 mol %, from 10.0 mol % to 27.0 mol %, from 10.0 mol % to 25.0 mol %, from 10.0 mol % to 20.0 mol %, from 10.0 mol % to 15.0 mol %, from 15.0 mol % to 26.0 mol %, from 15.0 mol % to 25.0 mol %, from 15.0 mol % to 20.0 mol %, from 13.0 mol % to 25.0 mol %, from 4.0 mol % to 24.0 mol %, or from 10.0 mol % to 26.0 mol %.

In some embodiments, the glass composition may comprise alumina ($Al_2O_3$) in an amount of from greater than or equal to 0.0 mol % to less than or equal to 10.0 mol % and all ranges and sub-ranges between the foregoing values. In some embodiments, the glass composition may comprise $Al_2O_3$ in an amount of greater than or equal to 0.0 mol %, greater than or equal to 0.5 mol %, greater than or equal to 1.0 mol %, greater than or equal to 1.5 mol %, greater than or equal to 2.5 mol %, greater than or equal to 5.0 mol %, greater than or equal to 7.5 mol %, greater than or equal to 8.5 mol %, greater than or equal to 9.0 mol %, or greater than or equal to 9.5 mol %. In some other embodiments, the glass composition may comprise $Al_2O_3$ in an amount less than or equal to 10.0 mol %, less than or equal to 9.5 mol %, less than or equal to 9.0 mol %, less than or equal to 8.5 mol %, less than or equal to 7.5 mol %, less than or equal to 5.0 mol %, less than or equal to 2.5 mol %, less than or equal to 1.5 mol %, less than or equal to 1.0 mol %, or less than or equal to 0.5 mol %. In some more embodiments, the glass composition may comprise $Al_2O_3$ in an amount of from 0.0 mol % to 10.0 mol %, from 0.0 mol % to 2.5 mol %, from 0.5 mol % to 8.5 mol %, from 0.5 mol % to 2.5 mol %, from 1.0 mol % to 9.0 mol %, from 1.5 mol % to 7.5 mol %, from 2.5 mol % to 9.0 mol %, from 2.5 mol % to 7.5 mol %, from 5.0 mol % to 10.0 mol %, from 5.0 mol % to 9.5 mol %, from 5.0 mol % to 8.5 mol %, from 5.0 mol % to 7.5 mol %, from 4.2 mol % to 9.3 mol %, from 4.4 mol % to 9.3 mol %, or from 3.2 mol % to 8.0 mol %.

In some embodiments, the glasses of the present disclosure may be free or substantially free of fluorine. In some embodiments, the glass composition may comprise fluorine (F) in an amount from greater than or equal to 0.0 at. % to less than or equal to 1.0 at. % and all ranges and sub-ranges between the foregoing values. In some embodiments, the glass composition may comprise F in an amount greater than or equal to 0.0 at. %, greater than or equal to 0.05 at. %, greater than or equal to 0.10 at. %, greater than or equal to 0.15 at. %, greater than or equal to 0.25 at. %, greater than or equal to 0.5 at. %, greater than or equal to 0.75 at. %, greater than or equal to 0.85 at. %, greater than or equal to 0.9 at. %, or greater than or equal to 0.95 at. %. In some other embodiments, the glass composition may comprise F in an amount less than or equal to 1.0 at. %, less than or equal to 0.95 at. %, less than or equal to 0.9 at. %, less than or equal to 0.85 at. %, less than or equal to 0.75 at. %, less than or equal to 0.5 at. %, less than or equal to 0.25 at. %, less than or equal to 0.15 at. %, less than or equal to 0.10 at. %, or less than or equal to 0.05 at. %. In some more embodiments, the glass composition may comprise F in an amount from 0.0 at. % to 1.0 at. %, from 0.0 at. % to 0.85 at. %, from 0.0 at. % to 0.25 at. %, from 0.05 at. % to 0.85 at. %, from 0.05 at. % to 0.25 at. %, from 0.15 at. % to 1.0 at. %, from 0.15 at. % to 0.9 at. %, from 0.15 at. % to 0.75 at. %, from 0.5 at. % to 0.9 at. %, from 0.5 at. % to 0.85 at. %, from 0.5 at. % to 0.75 at. %, from 0.75 at. % to 0.95 at. %, from 0.24 at. % to 0.68 at. %, from 0.36 at. % to 0.83 at. %, or from 0.25 at. % to 0.70 at. %.

According to an embodiment of the present disclosure, the glasses can include one or more modifiers. As described above, the term "modifier" refers to the oxides of monovalent or divalent metals, i.e., $M_2O$ or MO, where "M" stands for a metal. Modifiers can be added to the glass compositions of the present disclosure to facilitate improving the glassforming ability of the melt, i.e. to decrease the critical cooling rate. Examples of modifiers that can be used in the glasses of the present disclosure include alkali and alkaline earth modifiers, such as CaO, MgO, BaO, $Li_2O$, $Na_2O$, and $K_2O$, as well as other modifiers, such as ZnO and $Ag_2O$. According to one embodiment, the glass composition can include CaO and/or $Li_2O$, which were found to provide a ratio between the desired refractive index and density of the glass. In some embodiments, other alkali and alkaline earth metal oxides (such as $Na_2O$, $K_2O$, MgO, SrO, BaO, etc.), as well as other modifiers that do not provide any coloring (e.g., ZnO, $Ag_2O$, etc.), may be included in the glass composition. While these other modifiers may not facilitate providing the desired refractive index and/or density as CaO and $Li_2O$, these modifiers may be added to the glass composition to provide other characteristics. For example, barium oxide (BaO), potassium oxide ($K_2O$), sodium oxide ($Na_2O$) etc., may be added to increase the solubility of index raisers (such as $TiO_2$, $Nb_2O_5$, $ZrO_2$, etc.) in the glass melts, which could result in an overall increase in the refractive index of the glass and/or an increase in the ratio of refractive index to density. According to one embodiment of the present disclosure, the glasses may include at least CaO as a modifier, as CaO was found to provide a good balance in the desired attributes of density, refractive index, and glass forming ability. Thus, in many examples of the present disclosure, all or at least a part of the modifier(s) present in the glass composition are in the form of CaO. In some embodiments, the glass may be free or substantially free of modifiers.

In some embodiments, the glass composition may comprise calcium oxide (CaO) in an amount of from greater than or equal to 0.0 mol % to less than or equal to 40.0 mol % and all ranges and sub-ranges between the foregoing values. In some embodiments, the glass composition may comprise CaO in an amount of greater than or equal to 0.0 mol %, greater than or equal to 1.0 mol %, greater than or equal to 2.0 mol %, greater than or equal to 3.0 mol %, greater than or equal to 5.0 mol %, greater than or equal to 10.0 mol %, greater than or equal to 15.0 mol %, greater than or equal to 20.0 mol %, greater than or equal to 25.0 mol %, greater than or equal to 30.0 mol %, greater than or equal to 35.0 mol %, greater than or equal to 37.0 mol %, greater than or equal to 38.0 mol %, or greater than or equal to 39.0 mol %. In some other embodiments, the glass composition may comprise CaO in an amount of less than or equal to 40.0 mol %, less than or equal to 39.0 mol %, less than or equal to 38.0 mol %, less than or equal to 37.0 mol %, less than or equal to 35.0 mol %, less than or equal to 30.0 mol %, less than or equal to 25.0 mol %, less than or equal to 20.0 mol %, less than or equal to 15.0 mol %, less than or equal to 10.0 mol %, less than or equal to 5.0 mol %, less than or equal to 3.0 mol %, less than or equal to 2.0 mol %, or less than or equal to 1.0 mol %. In some more embodiments, the glass composition may comprise CaO in an amount of from 0.0 mol % to 40.0 mol %, from 0.0 mol % to 35.0 mol %, from 0.0 mol % to 32.0 mol %, from 0.0 mol % to 30.0 mol %, from 0.0 mol % to 15.0 mol %, from 1.0 mol % to 35.0 mol %, from 1.0 mol % to 32.0 mol %, from 1.0 mol % to 32.0 mol %, from 1.0 mol % to 15.0 mol %, from 2.0 mol % to 40.0 mol %, from 2.0 mol % to 35.0 mol %, from 3.0 mol % to 37.0 mol %, from 3.0 mol % to 25.0 mol %, from 3.0 mol % to 10.0 mol %, from 5.0 mol % to 37.0 mol %, from 5.0 mol % to 32.0 mol %, from 5.0 mol % to 32.0 mol %, from 10.0 mol % to 40.0 mol %, from 10.0 mol % to 32.0 mol %, from 10.0 mol % to 32.0 mol %, from 10.0 mol % to 25.0 mol %, from 15.0 mol % to 35.0 mol %, from 15.0 mol % to 25.0 mol %, from 20.0 mol % to 35.0 mol %, from 25.0 mol % to 38.0 mol %, from 25.0 mol % to 35.0 mol %, from 6 mol % to 20 mol %, from 24 mol % to 35 mol %, or from 11 mol % to 25 mol %.

In some embodiments, the glass composition may comprise zinc oxide (ZnO) in an amount of from greater than or equal to 0.0 mol % to less than or equal to 5.0 mol % and all ranges and sub-ranges between the foregoing values. In some embodiments, the glass composition may comprise ZnO in an amount of greater than or equal to 0.0 mol %, greater than or equal to 0.2 mol %, greater than or equal to 0.4 mol %, greater than or equal to 0.6 mol %, greater than or equal to 1.0 mol %, greater than or equal to 2.0 mol %, greater than or equal to 3.0 mol %, greater than or equal to 4.0 mol %, greater than or equal to 4.4 mol %, greater than or equal to 4.6 mol %, or greater than or equal to 4.8 mol %. In some other embodiments, the glass composition may comprise ZnO in an amount of less than or equal to 5.0 mol %, less than or equal to 4.8 mol %, less than or equal to 4.6 mol %, less than or equal to 4.4 mol %, less than or equal to 4.0 mol %, less than or equal to 3.0 mol %, less than or equal to 2.0 mol %, less than or equal to 1.0 mol %, less than or equal to 0.8 mol %, less than or equal to 0.6 mol %, less than or equal to 0.4 mol %, or less than or equal to 0.2 mol %. In some more embodiments, the glass composition may comprise ZnO in an amount of from 0.0 mol % to 5.0 mol %, from 0.0 mol % to 4.4 mol %, from 0.0 mol % to 2.0 mol %, from 0.0 mol % to 0.8 mol %, from 0.2 mol % to 2.0 mol %, from 0.4 mol % to 5.0 mol %, from 0.4 mol % to 4.4 mol %, from 0.6 mol % to 2.0 mol %, from 1.0 mol % to 4.6 mol %, from 1.0 mol % to 4.0 mol %, from 2.0 mol % to 4.0 mol %, from 3.0 mol % to 4.8 mol %, from 3.0 mol % to 4.4 mol %, from 1.0 mol % to 5.0 mol %, from 2.0 mol % to 4.0 mol %, or from 3.0 mol % to 4.0 mol %.

In some embodiments, the glass composition may comprise cadmia (CdO) in an amount of from greater than or equal to 0.0 mol % to less than or equal to 10.0 mol % and all ranges and sub-ranges between the foregoing values. In some embodiments, the glass composition may comprise CdO in an amount of greater than or equal to 0.0 mol %, greater than or equal to 0.5 mol %, greater than or equal to 1.0 mol %, greater than or equal to 1.5 mol %, greater than or equal to 2.5 mol %, greater than or equal to 5.0 mol %, greater than or equal to 7.5 mol %, greater than or equal to 8.5 mol %, greater than or equal to 9.0 mol %, or greater than or equal to 9.5 mol %. In some other embodiments, the glass composition may comprise CdO in an amount of less than or equal to 10.0 mol %, less than or equal to 9.5 mol %, less than or equal to 9.0 mol %, less than or equal to 8.5 mol %, less than or equal to 7.5 mol %, less than or equal to 5.0 mol %, less than or equal to 2.5 mol %, less than or equal to 1.5 mol %, less than or equal to 1.0 mol %, or less than or equal to 0.5 mol %. In some more embodiments, the glass composition may comprise CdO in an amount of from 0.0 mol % to 10.0 mol %, from 0.0 mol % to 8.5 mol %, from 0.0 mol % to 2.5 mol %, from 0.5 mol % to 8.5 mol %, from 0.5 mol % to 2.5 mol %, from 1.0 mol % to 10.0 mol %, from 1.0 mol % to 9.0 mol %, from 1.0 mol % to 7.5 mol %, from 1.5 mol % to 10.0 mol %, from 1.5 mol % to 7.5 mol %, from 2.5 mol % to 9.0 mol %, from 2.5 mol % to 7.5 mol %, from 5.0 mol % to 9.0 mol %, from 5.0 mol % to 7.5 mol %, from 2.0 mol % to 6.5 mol %, from 2.1 mol % to 9.3 mol %, or from 4.5 mol % to 8.5 mol %.

In some embodiments, the glass composition may comprise lead oxide (PbO) in an amount of from greater than or equal to 0.0 mol % to less than or equal to 5.0 mol % and all ranges and sub-ranges between the foregoing values. In some embodiments, the glass composition may comprise PbO in an amount of greater than or equal to 0.0 mol %, greater than or equal to 0.2 mol %, greater than or equal to 0.4 mol %, greater than or equal to 0.6 mol %, greater than or equal to 1.0 mol %, greater than or equal to 2.0 mol %, greater than or equal to 3.0 mol %, greater than or equal to 4.0 mol %, greater than or equal to 4.4 mol %, greater than or equal to 4.6 mol %, or greater than or equal to 4.8 mol %. In some other embodiments, the glass composition may comprise PbO in an amount of less than or equal to 5.0 mol %, less than or equal to 4.8 mol %, less than or equal to 4.6 mol %, less than or equal to 4.4 mol %, less than or equal to 4.0 mol %, less than or equal to 3.0 mol %, less than or equal to 2.0 mol %, less than or equal to 1.0 mol %, less than or equal to 0.6 mol %, less than or equal to 0.4 mol %, or less than or equal to 0.2 mol %. In some more embodiments, the glass composition may comprise PbO in an amount of from 0.0 mol % to 5.0 mol %, from 0.0 mol % to 4.4 mol %, from 0.0 mol % to 2.0 mol %, from 0.0 mol % to 1.0 mol %, from 0.4 mol % to 5.0 mol %, from 0.4 mol % to 2.0 mol %, from 0.4 mol % to 1.0 mol %, from 0.6 mol % to 2.0 mol %, from 1.0 mol % to 5.0 mol %, from 1.0 mol % to 4.0 mol %, from 1.0 mol % to 2.0 mol %, from 2.0 mol % to 5.0 mol %, from 2.0 mol % to 4.6 mol %, from 2.0 mol % to 4.0 mol %, from 3.0 mol % to 4.8 mol %, from 3.0 mol % to 4.0 mol %, from 2 mol % to 4 mol %, from 1 mol % to 4 mol %, or from 1 mol % to 3 mol %.

In some embodiments, the glass composition may comprise lithium oxide ($Li_2O$) in an amount of from greater than or equal to 0.0 mol % to less than or equal to 7.0 mol % and all ranges and sub-ranges between the foregoing values. In some embodiments, the glass composition may comprise $Li_2O$ in an amount of greater than or equal to 0.0 mol %, greater than or equal to 0.5 mol %, greater than or equal to 1.0 mol %, greater than or equal to 1.5 mol %, greater than or equal to 2.0 mol %, greater than or equal to 3.0 mol %, greater than or equal to 4.0 mol %, greater than or equal to 5.5 mol %, greater than or equal to 6.0 mol %, or greater than or equal to 6.5 mol %. In some other embodiments, the glass composition may comprise $Li_2O$ in an amount of less than or equal to 7.0 mol %, less than or equal to 6.5 mol %, less than or equal to 6.0 mol %, less than or equal to 5.5 mol %, less than or equal to 4.0 mol %, less than or equal to 2.0 mol %, less than or equal to 1.5 mol %, less than or equal to 1.0 mol %, or less than or equal to 0.5 mol %. In some more embodiments, the glass composition may comprise $Li_2O$ in an amount of from 0.0 mol % to 7.0 mol %, from 0.0 mol % to 5.5 mol %, from 0.0 mol % to 4.0 mol %, from 0.0 mol % to 3.5 mol %, from 0.0 mol % to 0.5 mol %, from 0.5 mol % to 7.0 mol %, from 0.5 mol % to 6.0 mol %, from 0.5 mol % to 4.0 mol %, from 0.5 mol % to 3.5 mol %, from 1.0 mol % to 6.0 mol %, from 1.0 mol % to 4.0 mol %, from 1.5 mol % to 7.0 mol %, from 1.5 mol % to 4.0 mol %, from 2.0 mol % to 7.0 mol %, from 2.0 mol % to 5.5 mol %, from 2.0 mol % to 4.0 mol %, from 4.0 mol % to 6.5 mol %, from 4.0 mol % to 5.5 mol %, from 0.0 mol % to 6.0 mol %, from 1.0 mol % to 3.0 mol %, or from 1.0 mol % to 4.0 mol %.

In some embodiments, the glass composition may comprise sodium oxide ($Na_2O$) in an amount of from greater than or equal to 0.0 mol % to less than or equal to 10.0 mol % and all ranges and sub-ranges between the foregoing values. In some embodiments, the glass composition may comprise $Na_2O$ in an amount of greater than or equal to 0.0 mol %, greater than or equal to 2.5 mol %, greater than or equal to 5.0 mol %, or greater than or equal to 7.5 mol %. In some other embodiments, the glass composition may comprise $Na_2O$ in an amount of less than or equal to 10.0 mol %, less than or equal to 7.5 mol %, less than or equal to 5.0 mol %, or less than or equal to 2.5 mol %. In some more embodiments, the glass composition may comprise $Na_2O$ in an amount of from 0.0 mol % to 10.0 mol %, from 0.0 mol % to 7.5 mol %, from 0.0 mol % to 5.0 mol %, from 0.0 mol % to 2.5 mol %, from 2.5 mol % to 10.0 mol %, from 2.5 mol % to 7.5 mol %, from 2.5 mol % to 5.0 mol %, from 5.0 mol % to 10.0 mol %, from 5.0 mol % to 7.5 mol %, from 3.7 mol % to 6.3 mol %, from 2.5 mol % to 7.5 mol %, or from 2.7 mol % to 6.6 mol %.

In some embodiments, the glass composition may comprise potassium oxide ($K_2O$) in an amount of from greater than or equal to 0.0 mol % to less than or equal to 10.0 mol % and all ranges and sub-ranges between the foregoing values. In some embodiments, the glass composition may comprise $K_2O$ in an amount of greater than or equal to 0.0 mol %, greater than or equal to 2.0 mol %, greater than or equal to 2.5 mol %, greater than or equal to 5.0 mol %, or greater than or equal to 7.5 mol %. In some other embodiments, the glass composition may comprise $K_2O$ in an amount of less than or equal to 10.0 mol %, less than or equal to 7.5 mol %, less than or equal to 5.0 mol %, or less than or equal to 2.5 mol %. In some more embodiments, the glass composition may comprise $K_2O$ in an amount of from 0.0 mol % to 10.0 mol %, from 0.0 mol % to 7.5 mol %, from 0.0 mol % to 5.0 mol %, from 0.0 mol % to 2.5 mol %, from 2.5 mol % to 10.0 mol %, from 2.5 mol % to 7.5 mol %, from 2.5 mol % to 5.0 mol %, from 5.0 mol % to 10.0 mol %, from 5.0 mol % to 7.5 mol %, from 1.4 mol % to 6.5 mol %, from 3.8 mol % to 6.8 mol %, or from 2.0 mol % to 6.0 mol %.

In some embodiments, the glass composition may comprise a sum of ($Na_2O+K_2O$) in an amount of from greater than or equal to 0.0 mol % to less than or equal to 10.0 mol % and all ranges and sub-ranges between the foregoing values. In some embodiments, the glass composition may comprise ($Na_2O+K_2O$) in an amount of greater than or equal to 0.0 mol %, greater than or equal to 2.0 mol %, greater than or equal to 2.5 mol %, greater than or equal to 5.0 mol %, or greater than or equal to 7.5 mol %. In some other embodiments, the glass composition may comprise ($Na_2O+K_2O$) in an amount of less than or equal to 10.0 mol %, less than or equal to 7.5 mol %, less than or equal to 5.0 mol %, or less than or equal to 2.5 mol %. In some more embodiments, the glass composition may comprise ($Na_2O+K_2O$) in an amount of from 0.0 mol % to 10.0 mol %, from 0.0 mol % to 7.5 mol %, from 0.0 mol % to 5.0 mol %, from 0.0 mol % to 2.5 mol %, from 2.5 mol % to 10.0 mol %, from 2.5 mol % to 7.5 mol %, from 2.5 mol % to 5.0 mol %, from 5.0 mol % to 10.0 mol %, from 5.0 mol % to 7.5 mol %, from 1.4 mol % to 6.5 mol %, from 3.8 mol % to 6.8 mol %, or from 2.0 mol % to 6.0 mol %.

In some embodiments, the glass composition may comprise barium oxide (BaO) in an amount of from greater than or equal to 0.0 mol % to less than or equal to 15.0 mol % and all ranges and sub-ranges between the foregoing values. In some embodiments, the glass composition may comprise BaO in an amount of greater than or equal to 0.0 mol %, greater than or equal to 1.0 mol %, greater than or equal to 2.0 mol %, greater than or equal to 3.0 mol %, greater than or equal to 4.0 mol %, greater than or equal to 5.0 mol %, greater than or equal to 10.0 mol %, greater than or equal to 12.0 mol %, greater than or equal to 13.0 mol %, or greater than or equal to 14.0 mol %. In some other embodiments, the glass composition may comprise BaO in an amount of less than or equal to 15.0 mol %, less than or equal to 14.0 mol %, less than or equal to 13.0 mol %, less than or equal to 12.0 mol %, less than or equal to 10.0 mol %, less than or equal to 5.0 mol %, less than or equal to 3.0 mol %, less than or equal to 2.0 mol %, or less than or equal to 1.0 mol %. In some more embodiments, the glass composition may comprise BaO in an amount of from 0.0 mol % to 15.0 mol %, from 0.0 mol % to 14.0 mol %, from 0.0 mol % to 12.0 mol %, from 0.0 mol % to 10.0 mol %, from 2.0 mol % to 14.0 mol %, from 2.0 mol % to 13.0 mol %, from 2.0 mol % to 10.0 mol %, from 3.0 mol % to 13.0 mol %, from 5.0 mol % to 13.0 mol %, from 5.0 mol % to 12.0 mol %, from 5.0 mol % to 10.0 mol %, from 10.0 mol % to 14.0 mol %, from 6.0 mol % to 12.0 mol %, from 2.6 mol % to 14.0 mol %, or from 1.0 mol % to 7.2 mol %.

In some embodiments, the glass composition may comprise magnesia (MgO) in an amount of from greater than or equal to 0.0 mol % to less than or equal to 10.0 mol % and all ranges and sub-ranges between the foregoing values. In some embodiments, the glass composition may comprise MgO in an amount of greater than or equal to 0.0 mol %, greater than or equal to 0.5 mol %, greater than or equal to 1.0 mol %, greater than or equal to 1.5 mol %, greater than or equal to 2.5 mol %, greater than or equal to 5.0 mol %, greater than or equal to 7.5 mol %, greater than or equal to 8.5 mol %, greater than or equal to 9.0 mol %, or greater than or equal to 9.5 mol %. In some other embodiments, the glass composition may comprise MgO in an amount of less than or equal to 10.0 mol %, less than or equal to 9.5 mol %, less than or equal to 9.0 mol %, less than or equal to 8.5 mol %, less than or equal to 7.5 mol %, less than or equal to 5.0 mol %, less than or equal to 2.5 mol %, less than or equal to 1.5 mol %, less than or equal to 1.0 mol %, or less than or equal to 0.5 mol %. In some more embodiments, the glass composition may comprise MgO in an amount of from 0.0 mol % to 10.0 mol %, from 0.0 mol % to 8.5 mol %, from 0.0 mol % to 5.0 mol %, from 0.0 mol % to 2.5 mol %, from 0.5 mol % to 8.5 mol %, from 0.5 mol % to 5.0 mol %, from 0.5 mol % to 2.5 mol %, from 1.0 mol % to 10.0 mol %, from 1.0 mol % to 9.0 mol %, from 1.5 mol % to 10.0 mol %, from 5.0 mol % to 9.5 mol %, from 5.0 mol % to 9.0 mol %, from 5.0 mol % to 7.5 mol %, from 7.5 mol % to 9.5 mol %, from 1.4 mol % to 5.0 mol %, from 2.5 mol % to 7.0 mol %, or from 3.5 mol % to 7.5 mol %.

In some embodiments, the glass composition may comprise strontium oxide (SrO) in an amount of from greater than or equal to 0.0 mol % to less than or equal to 35.0 mol % and all ranges and sub-ranges between the foregoing values. In some embodiments, the glass composition may contain SrO in an amount of greater than or equal to 0.0 mol %, greater than or equal to 5.0 mol %, greater than or equal to 10.0 mol %, greater than or equal to 15.0 mol %, greater than or equal to 20.0 mol %, greater than or equal to 25.0 mol %, or greater than or equal to 30.0 mol %. In some other embodiments, the glass composition may contain SrO in an amount of less than or equal to 35.0 mol %, less than or equal to 30.0 mol %, less than or equal to 25.0 mol %, less than or equal to 20.0 mol %, less than or equal to 15.0 mol %, less than or equal to 10.0 mol %, or less than or equal to 5.0 mol %. In some more embodiments, the glass composition may contain SrO in an amount of from 0.0 mol % to 35.0 mol %, from 0.0 mol % to 25.0 mol %, from 0.0 mol % to 15.0 mol %, from 5.0 mol % to 35.0 mol %, from 5.0 mol % to 25.0 mol %, from 5.0 mol % to 15.0 mol %, from 10.0 mol % to 35.0 mol %, from 10.0 mol % to 30.0 mol %, from 10.0 mol % to 25.0 mol %, from 10.0 mol % to 20.0 mol %, from 15.0 mol % to 35.0 mol %, from 15.0 mol % to 30.0 mol %, from 15.0 mol % to 25.0 mol %, from 20.0 mol % to 35.0 mol %, from 20.0 mol % to 30.0 mol %, from 10.0 mol % to 20.0 mol %, from 0.0 mol % to 7.5 mol %, from 2.0 mol % to 7.5 mol %, from 2.5 mol % to 7.5 mol %, from 5.0 mol % to 28.0 mol %, or from 19.0 mol % to 29.0 mol %.

In some embodiments, the glass composition may comprise a total content of divalent metal oxides (RO) in an amount of from greater than or equal to 0.0 mol % to less than or equal to 40.0 mol % and all ranges and sub-ranges between the foregoing values. Examples of divalent metal oxides include alkaline earth metal oxides. In some embodiments, the glass composition may contain RO in an amount of greater than or equal to 0.0 mol %, greater than or equal to 3.0 mol %, greater than or equal to 5.0 mol %, greater than or equal to 8.5 mol %, greater than or equal to 10.0 mol %, greater than or equal to 15.0 mol %, greater than or equal to 20.0 mol %, greater than or equal to 25.0 mol %, or greater than or equal to 30.0 mol %. In some other embodiments, the glass composition may contain RO in an amount of less than or equal to 40.0 mol %, less than or equal to 35.0 mol %, less than or equal to 30.0 mol %, less than or equal to 25.0 mol %, less than or equal to 20.0 mol %, less than or equal to 15.0 mol %, less than or equal to 10.0 mol %, or less than or equal to 5.0 mol %. In some more embodiments, the glass composition may contain RO in an amount of from 0.0 mol % to 40.0 mol %, from 0.0 mol % to 35.0 mol %, from 0.0 mol % to 25.0 mol %, from 0.0 mol % to 15.0 mol %, from 3.0 mol % to 40.0 mol %, from 3.0 mol % to 35.0 mol %, from 3.0 mol % to 30.0 mol %, from 3.0 mol % to 25.0 mol %, from 5.0 mol % to 40.0 mol %, from 5.0 mol % to 35.0 mol %, from 5.0 mol % to 25.0 mol %, from 5.0 mol % to 15.0 mol %, from 10.0 mol % to 40.0 mol %, from 10.0 mol % to 35.0 mol %, from 10.0 mol % to 30.0 mol %, from 10.0 mol % to 25.0 mol %, from 10.0 mol % to 20.0 mol %, from 15.0 mol % to 40.0 mol %, from 15.0 mol % to 35.0 mol %, from 15.0 mol % to 30.0 mol %, from 15.0 mol % to 25.0 mol %, from 20.0 mol % to 40.0 mol %, from 20.0 mol % to 35.0 mol %, from 20.0 mol % to 30.0 mol %, 8.5 mol % to 40.0 mol %, from 8.5 mol % to 35.0 mol %, from 8.5 mol % to 25.0 mol %, from 8.5 mol % to 15.0 mol %, from 12.0 mol % to 23.0 mol %, from 15.0 mol % to 29.0 mol %, or from 8.0 mol % to 32.0 mol %.

In some embodiments, the glass composition may comprise monovalent metal oxides ($R_2O$) in an amount of from greater than or equal to 0.0 mol % to less than or equal to 15.0 mol % and all ranges and sub-ranges between the foregoing values. Examples of monovalent metal oxides $R_2O$ include alkali metal oxides. In some embodiments, the glass composition may comprise $R_2O$ in an amount of greater than or equal to 0.0 mol %, greater than or equal to 1.0 mol %, greater than or equal to 2.0 mol %, greater than or equal to 3.0 mol %, greater than or equal to 5.0 mol %, greater than or equal to 10.0 mol %, greater than or equal to 12.0 mol %, greater than or equal to 13.0 mol %, or greater than or equal to 14.0 mol %. In some other embodiments, the glass composition may comprise $R_2O$ in an amount of less than or equal to 15.0 mol %, less than or equal to 14.0 mol %, less than or equal to 13.0 mol %, less than or equal to 12.0 mol %, less than or equal to 10.0 mol %, less than or equal to 5.0 mol %, less than or equal to 3.0 mol %, less than or equal to 2.0 mol %, or less than or equal to 1.0 mol %. In some more embodiments, the glass composition may comprise $R_2O$ in an amount of from 0.0 mol % to 15.0 mol %, from 0.0 mol % to 12.0 mol %, from 1.0 mol % to 15.0 mol %, from 1.0 mol % to 13.0 mol %, from 2.0 mol % to 15.0 mol %, from 2.0 mol % to 13.0 mol %, from 3.0 mol % to 15.0 mol %, from 3.0 mol % to 13.0 mol %, from 3.0 mol % to 10.0 mol %, from 5.0 mol % to 14.0 mol %, from 5.0 mol % to 13.0 mol %, from 5.0 mol % to 12.0 mol %, from 5.0 mol % to 10.0 mol %, from 10.0 mol % to 14.0 mol %, from 2.1 mol % to 9.0 mol %, from 2.5 mol % to 7.4 mol %, or from 7.5 mol % to 13.7 mol %.

In some embodiments, the glass composition may comprise a sum of ($RE_mO_n$+ $TiO_2$+$Nb_2O_5$+ $ZrO_2$+$Bi_2O_3$+$WO_3$), in mol %, in an amount of from greater than or equal to 0.0 mol % to less than or equal to 65.0 mol % and all ranges and sub-ranges between the foregoing values. In some embodiments, the glass composition may have a sum of ($RE_mO_n$+ $TiO_2$+$Nb_2O_5$+ $ZrO_2$+$Bi_2O_3$+$WO_3$) of greater than or equal to 0.0 mol %, greater than or equal to 10.0 mol %, greater than or equal to 20.0 mol %, greater than or equal to 25.0 mol %, greater than or equal to 30.0 mol %, greater than or equal to 39.0 mol %, greater than or equal to 40.0 mol %, greater than or equal to 50.0 mol %, or greater than or equal to 60.0 mol %. In some other embodiments, the glass composition may have a sum of ($RE_mO_n$+ $TiO_2$+$Nb_2O_5$+ $ZrO_2$+$Bi_2O_3$+$WO_3$) of less than or equal to 65.0 mol %, less than or equal to 60.0 mol %, less than or equal to 50.0 mol %, less than or equal to 40.0 mol %, less than or equal to 30.0 mol %, less than or equal to 20.0 mol %, or less than or equal to 10.0 mol %. In some more embodiments, the glass composition may have a sum ($RE_mO_n$+ $TiO_2$+$Nb_2O_5$+ $ZrO_2$+$Bi_2O_3$+$WO_3$) of from 0.0 mol % to 65.0 mol %, from 0.0 mol % to 50.0 mol %, from 0.0 mol % to 30.0 mol %, from 5.0 mol % to 65.0 mol %, from 5.0 mol % to 50.0 mol %, from 5.0 mol % to 30.0 mol %, from 20.0 mol % to 65.0 mol %, from 20.0 mol % to 60.0 mol %, from 20.0 mol % to 55.0 mol %, from 20.0 mol % to 50.0 mol %, from 25.0 mol % to 65.0 mol %, from 25.0 mol % to 60.0 mol %, from 25.0 mol % to 55.0 mol %, from 25.0 mol % to 50.0 mol %, from 25.0 mol % to 40.0 mol %, from 30.0 mol % to 65.0 mol %, from 30.0 mol % to 60.0 mol %, from 30.0 mol % to 50.0 mol %, from 39.0 mol % to 50.0 mol %, from 18.0 mol % to 45.0 mol %, from 13.0 mol % to 44.0 mol %, or from 13.0 mol % to 40.0 mol %.

In some embodiments, the glass composition may comprise a sum of ($SiO_2$+$B_2O_3$+ $Alk_2O$+ MgO+ CaO+ SrO+ BaO+ ZnO) in an amount of from greater than or equal to 0.0 mol % to less than or equal to 69.0 mol % and all ranges and sub-ranges between the foregoing values. In some embodiments, the glass composition may comprise ($SiO_2$+$B_2O_3$+ $Alk_2O$+ MgO+ CaO+ SrO+ BaO+ ZnO) in an amount of greater than or equal to 0.0 mol %, greater than or equal to 2.0 mol %, greater than or equal to 4.0 mol %, greater than or equal to 6.0 mol %, greater than or equal to 10.0 mol %, greater than or equal to 20.0 mol %, greater than or equal to 30.0 mol %, greater than or equal to 40.0 mol %, greater than or equal to 50.0 mol %, greater than or equal to 60.0 mol %, greater than or equal to 63.0 mol %, greater than or equal to 65.0 mol %, or greater than or equal to 67.0 mol %. In some other embodiments, the glass composition may comprise ($SiO_2$+$B_2O_3$+ $Alk_2O$+ MgO+ CaO+ SrO+ BaO+ ZnO) in an amount of less than or equal to 69.0 mol %, less than or equal to 67.0 mol %, less than or equal to 65.0 mol %, less than or equal to 63.0 mol %, less than or equal to 60.0 mol %, less than or equal to 50.0 mol %, less than or equal to 40.0 mol %, less than or equal to 30.0 mol %, less than or equal to 20.0 mol %, less than or equal to 10.0 mol %, less than or equal to 6.0 mol %, less than or equal to 4.0 mol %, or less than or equal to 2.0 mol %. In some more embodiments, the glass composition may comprise ($SiO_2$+$B_2O_3$+ $Alk_2O$+ MgO+ CaO+ SrO+ BaO+ ZnO) in an amount of from 0.0 mol % to 69.0 mol %, from 0.0 mol % to 60.0 mol %, from 0.0 mol % to 20.0 mol %, from 2.0 mol % to 69.0 mol %, from 2.0 mol % to 60.0 mol %, from 2.0 mol % to 20.0 mol %, from 4.0 mol % to 69.0 mol %, from 4.0 mol % to 63.0 mol %, from 4.0 mol % to 40.0 mol %, from 6.0 mol % to 63.0 mol %, from 10.0 mol % to 63.0 mol %, from 20.0 mol % to 65.0 mol %, from 20.0 mol % to 60.0 mol %, from 20.0 mol % to 40.0 mol %, from 30.0 mol % to 69.0 mol %, from 30.0 mol % to 60.0 mol %, from 40.0 mol % to 60.0 mol %, from 7.0 mol % to 6.03 mol %, from 13.0 mol % to 45.0 mol %, or from 15.0 mol % to 55.0 mol %.

In some embodiments, the glass composition may comprise a sum of ZnO and $Y_2O_3$ (ZnO+$Y_2O_3$) in an amount of from greater than or equal to 0.0 mol % to less than or equal to 5.0 mol % and all ranges and sub-ranges between the foregoing values. In some embodiments, the glass composition may comprise (ZnO+$Y_2O_3$) in an amount of greater than or equal to 0.0 mol %, greater than or equal to 0.2 mol %, greater than or equal to 0.4 mol %, greater than or equal to 0.6 mol %, greater than or equal to 1.0 mol %, greater than or equal to 2.0 mol %, greater than or equal to 3.0 mol %, greater than or equal to 4.0 mol %, greater than or equal to 4.4 mol %, greater than or equal to 4.6 mol %, or greater than or equal to 4.8 mol %. In some other embodiments, the glass composition may comprise (ZnO+$Y_2O_3$) in an amount of less than or equal to 5.0 mol %, less than or equal to 4.8 mol %, less than or equal to 4.6 mol %, less than or equal to 4.4 mol %, less than or equal to 4.0 mol %, less than or equal to 3.0 mol %, less than or equal to 2.0 mol %, less than or equal to 1.0 mol %, less than or equal to 0.6 mol %, less than or equal to 0.4 mol %, or less than or equal to 0.2 mol %. In some more embodiments, the glass composition may comprise (ZnO+$Y_2O_3$) in an amount of from 0.0 mol % to 5.0 mol %, from 0.0 mol % to 4.4 mol %, from 0.2 mol % to 4.4 mol %, from 0.4 mol % to 5.0 mol %, from 0.0 mol % to 2.0 mol %, from 0.6 mol % to 2.0 mol %, from 1.0 mol % to 5.0 mol %, from 1.0 mol % to 4.6 mol %, from 1.0 mol % to 4.0 mol %, from 1.0 mol % to 2.0 mol %, from 2.0 mol % to 4.6 mol %, from 2.0 mol % to 4.0 mol %, from 3.0 mol % to 5.0 mol %, from 3.0 mol % to 4.8 mol %, from 3.0 mol % to 4.6 mol %, from 3.0 mol % to 4.4 mol %, from 3.0 mol % to 4.0 mol %, from 0.0 mol % to 3.0 mol %, from 1.0 mol % to 3.0 mol %, or from 1.0 mol % to 5.0 mol %.

According to an embodiment of the present disclosure, the glasses described herein have a refractive index $n_d$ of greater than or equal to 1.80, as measured at 587.56 nm. In some examples, the glasses have a refractive index $n_d$ of greater than or equal to 1.80, greater than or equal to 1.85, greater than or equal to 1.90, greater than or equal to 1.95, greater than or equal to 2.00, greater than or equal to 2.05, or greater than or equal to 2.10, as measured at 587.56 nm. In some examples, the glasses have a refractive index $n_d$ of from 1.80 to 2.10, 1.85 to 2.10, 1.90 to 2.10, 1.91 to 2.10, 1.95 to 2.10, 2.00 to 2.10, 2.05 to 2.10, 1.80 to 2.05, 1.85 to 2.05, 1.90 to 2.05, 1.91 to 2.05, 1.95 to 2.05, 2.00 to 2.05, 1.80 to 2.00, 1.85 to 2.00, 1.90 to 2.00, 1.91 to 2.00, 1.95 to 2.00, 1.80 to 1.95, 1.85 to 1.95, 1.90 to 1.95, or 1.91 to 1.95, as measured at 587.56 nm.

At a given refractive index, lower density corresponds to a lower weight of the optical element which the glass is utilized in. Size and weight can be important in many types of optical devices, particularly portable optical devices, such as augmented reality systems, for example. As described above, the glasses of the present disclosure have a high refractive index in combination with a low density. According to an embodiment of the present disclosure, the glasses described herein have a density $d_{RT}$ of 5.5 g/cm³ or less, as measured at 25° C. In some examples, the glasses of the present disclosure may have a density $d_{RT}$ of 5.5 g/cm³ or less, 5.3 g/cm³ or less, 5.1 g/cm³ or less, 4.9 g/cm³ or less, 4.8 g/cm³ or less, or 4.5 g/cm³ or less, as measured at 25° C. In some examples, the glasses have a refractive index $n_d$ of greater than or equal to 1.95, as measured at a wavelength of 587.56 nm, and a density $d_{RT}$ of 5.3 g/cm³ or less, as measured at 25° C. In some examples, the glasses may have a refractive index $n_d$ of 1.95 to 2.0, as measured at 587.56 nm, and a density $d_{RT}$ of 4.3 g/cm³ to 5.3 g/cm³, as measured at 25° C.

In some embodiments, the glasses of the present disclosure can be characterized by a refractive index $n_d$ and a density $d_{RT}$ according to formula (I)(a):

$$n_d-(1.000+0.19*d_{RT})>0.000 \qquad (I)(a)$$

where the refractive index $n_d$ is measured at a wavelength of 587.56 nm and the density $d_{RT}$ is measured in g/cm$^3$ at 25° C.

In some embodiments, the glasses of the present disclosure can be characterized by a refractive index $n_d$ and a density $d_{RT}$ according to formula (I)(b):

$$n_d-(1.03+0.19*d_{RT})>0.000 \qquad (I)(b)$$

where the refractive index $n_d$ is measured at a wavelength of 587.56 nm and the density $d_{RT}$ is measured in g/cm$^3$ at 25° C.

In some embodiments, the glasses are characterized by a high transmittance. In general, the higher the transmittance of a glass, the longer is the path traversed by light at a given optical loss, which can improve optical performance in many applications. High refractive index glasses typically include species, such as $TiO_2$ and $Nb_2O_5$, which absorb at least a portion of optical light, particularly light in the blue and near-UV regions of the electromagnetic spectrum. In embodiments of the present disclosure, the transmittance of the glass may be characterized for different wavelengths within the range of from about 300 nm to 2300 nm. High transmission in the visible and near-UV range (blue region) is particularly desirable in some applications. High transmittance in the blue can be challenging to achieve in high refractive index glasses. The high levels of $TiO_2$ and/or $Nb_2O_5$ that are typically used in glasses to increase refractive index tend to decrease the transmittance in the near-UV region and shift the UV cut-off to higher wavelengths. Internal transmittance (Fresnel losses accounted for) in the blue can be considered as acceptable when a sample of thickness 10 mm has an internal transmittance equal to or greater than 90% at a wavelength of 460 nm, good when the internal transmittance is equal to or greater than 95%, and excellent when the internal transmittance is equal to or greater than 97%.

In some embodiments, the glass may be characterized by a refractive index $n_d$ (as measured at 587.56 nm) and a transmittance index $T_i$ that satisfies formula (II)(a):

$$n_d-(2.055-0.36*T_i)\geq 0.000 \qquad (II)(a)$$

where the transmittance index $T_i$ is determined according to formula (III):

$$T_i = \frac{(La_2O_3 + Gd_2O_3 + ZrO_2)}{(La_2O_3 + Gd_2O_3 + ZrO_2 + TiO_2 + Nb_2O_5)} \qquad (III)$$

where each oxide listed in formula (III) refers to the amount of the oxide, expressed in mol %, in the glass. The transmittance index $T_i$ is the molar fraction of the colorless index raisers $La_2O_3$, $Gd_2O_3$, and $ZrO_2$ to the total sum of the 5 index raisers $La_2O_3$, $Gd_2O_3$, $ZrO_2$, $Nb_2O_5$, and $TiO_2$. It has been found that the quantity of $T_i$ correlates to the transmittance of blue light of the high refractive index, low density glasses of the present disclosure.

FIG. 1 shows the relationship between the transmittance index $T_i$ according to formula (III) and the quantity $\lambda_{70\%}$. The quantity $\lambda_{70\%}$ indicates the minimum wavelength corresponding to a total transmittance of 70% or higher for a glass sample in the form of a plate having a thickness of 10 mm. Lower values of $\lambda_{70\%}$ generally correspond to a higher range of wavelengths at which the glass sample has a high internal transmittance, and therefore lower values of $\lambda_{70\%}$ generally correspond to a higher transmittance of the glass sample overall. The data points in FIG. 1 correspond to data taken from U.S. Pat. Nos. 8,728,963 and 9,643,880. The R value indicated on the graph corresponds to the Pearson correlation coefficient. U.S. Pat. No. 9,643,880 reported glass compositions in terms of cation percent. To calculate the transmittance index $T_i$ according to formula (III) in mol %, the cation percent values were assumed to be equivalent to atomic percent of atoms, excluding oxygen, and the cation percent values were converted to mole percent of oxides and applied to formula (III). As illustrated in FIG. 1, the data demonstrate a correlation between the quantity $\lambda_{70\%}$ and the transmittance index $T_i$.

In some embodiments, the glass may be characterized by a refractive index $n_d$ (as measured at 587.56 nm) and a transmittance index $T_i$ that satisfies formula (IV):

$$n_d-(2.000-0.36*T_i)\geq 0.000 \qquad (IV).$$

In some embodiments, the glass may have a transmittance index $T_i$ as determined according to formula (III) [mol %/mol %], of from greater than or equal to 0.25 to less than or equal to 0.75 and all ranges and sub-ranges between the foregoing values. In some embodiments, the glass composition may have a transmittance index $T_i$ [mol %/mol %] of greater than or equal to 0.25, greater than or equal to 0.30, greater than or equal to 0.40, greater than or equal to 0.485, greater than or equal to 0.50, greater than or equal to 0.52, greater than or equal to 0.532, greater than or equal to 0.55, greater than or equal to 0.60, or greater than or equal to 0.70. In some other embodiments, the glass composition may have the transmittance index $T_i$ [mol %/mol %] of less than or equal to 0.75, less than or equal to 0.70, less than or equal to 0.60, less than or equal to 0.50. In some more embodiments, the glass composition may have the $T_i$ [mol %/mol %] from 0.25 to 0.75, from 0.25 to 0.60, from 0.25 to 0.40, from 0.30 to 0.60, from 0.30 to 0.50, from 0.40 to 0.60, from 0.50 to 0.75, from 0.60 to 0.75, from 0.60 to 0.70, from 0.38 to 0.65, from 0.39 to 0.74, or from 0.50 to 0.71. It has been found that in some embodiments, in some concentration ranges, a transmittance index $T_i$ value of 0.532 or greater corresponds to an acceptably high internal transmittance of approximately 95% or greater in the visible range for a glass sample having a thickness of 10 mm.

In some embodiments, the relationship between the refractive index $n_d$ and the density $d_{RT}$ is characterized using the ratio $(n_d-1)/d_{RT}$, where the refractive index $n_d$ is measured at 587.56 nm and the density is measured in g/cm$^3$ at 25° C. The ratio of $(n_d-1)/d_{RT}$ is also referred to as "refraction" or "refraction value." The higher the refraction value, the higher the refractive index is at a given density.

In some embodiments, the glass may be characterized by a refractive index $n_d$ (as measured at 587.56 nm), a density $d_{RT}$ (as measured at 25° C.), and a transmittance index $T_i$ that satisfies formula (V):

$$[(n_d-1)/d_{RT}]-(0.262-0.115*T_i)>0.000 \qquad (V)$$

where the transmittance index $T_i$ is determined according to formula (III) above.

Refractive index, density, and refraction are properties that can be predicted from the glass composition. A linear regression analysis of comparative glasses near the composition space of the exemplary glasses of the present disclosure and some exemplary glasses was performed to determine an equation that can predict the composition dependence of the refractive index $n_d$ at a wavelength of 587.56 nm, the composition dependence of the density of the glass at 25° C. (in g/cm³), and the composition of dependence of the refraction of the glass. Formulas (VI), (VII), and (VIII) below were obtained from the linear regression analysis and used to predict the refractive index, density, and refraction, respectively, of the glasses:

$P_n = 1.81706 - 0.0035654*Al_2O_3 - 0.0038101*B_2O_3 +$ $0.00081216*BaO + 0.010373*Bi_2O_3 + 0.00013728*CaO +$ $0.0073116*Er_2O_3 + 0.0055226*Gd_2O_3 - 0.003343*K_2O +$ $0.0060806*La_2O_3 - 0.0009011*Li_2O - 0.001967*Na_2O +$ $0.0093799*Nb_2O_5 + 0.0060396*Nd_2O_3 - 0.0061024*P_2O_5 +$ $0.0040356*PbO - 0.0032812*SiO_2 + 0.0030562*TeO_2 +$ $0.0034148*TiO_2 + 0.004267*WO_3 + 0.0034424*Y_2O_3 +$ $0.0071109*Yb_2O_3 + 0.00096907*ZnO + 0.0026412*ZrO_2$   (VI)

$P_d = -0.018843*Al_2O_3 - 0.020477*B_2O_3 + 0.021988*BaO +$ $0.074733*Bi_2O_3 - 0.00243*CaO + 0.100258*Er_2O_3 +$ $0.07427*Gd_2O_3 - 0.018568*K_2O + 0.06037*La_2O_3 -$ $0.0089*Li_2O - 0.00909*Na_2O + 0.00625*Nb_2O_5 +$ $0.068993*Nd_2O_3 - 0.038868*P_2O_5 + 0.04853*PbO -$ $0.018196*SiO_2 + 0.013124*TeO_2 - 0.00529*TiO_2 +$ $0.044564*WO_3 + 0.022887*Y_2O_3 + 0.097857*Yb_2O_3 +$ $0.0077*ZnO + 0.012501*ZrO_2 + 4.16819$   (VII)

$P_{ref} = 0.201656 + 0.00018225*B_2O_3 - 0.0010873*BaO -$ $0.0024853*Bi_2O_3 - 0.0030326*Er_2O_3 - 0.0018856*Gd_2O_3 -$ $0.0017563*La_2O_3 - 0.0002505*Na_2O + 0.0017526*Nb_2O_5$ $+ 0.0025472*Nd_2O_3 - 0.0016439*PbO + 0.000050096*SiO_2 + 0.0011794*TiO_2 - 0.00072112*WO_3 - 0.00079167*Y_2O_3 - 0.0031015*Yb_2O_3 - 0.00034209*ZnO$   (VIII)

where $P_n$ is a refractive index parameter that predicts the refractive index $n_d$ of the glass at a wavelength of 587.56 nm, $P_d$ is a density parameter that predicts the density of the glass at 25° C. (in g/cm³), and $P_{ref}$ is a refraction parameter that predicts the refraction of the glass based on the composition of the glass, where each oxide listed in formulas (VI), (VII), and (VIII) refers to the amount of the oxide in the glass, expressed in mol %.

Table 1 below specifies the concentration limits where the formulas (VI), (VII), and (VIII) were derived. The linear regression analysis used to determine formulas (VI), (VII), and (VIII) randomly selected glasses to use as a training dataset to develop the regression and selected glasses to use as a validation dataset to evaluate the ability to interpolate within predefined compositional limits (shown in Table 1 below). The training dataset of glass compositions satisfying the criteria specified in Table 1 below and having measured values of the properties of interest, about 100 glass compositions for each property, was randomly selected from the literature data presented in the publicly available SciGlass Information System database and from the Exemplary Glasses from the embodiments presented herein. The linear regression analysis on the above-specified dataset was used to determine the formulas (VI), (VII), and (VIII), with the exclusion of insignificant variables and outliers. The resulting formulas (VI), (VII), and (VIII) are presented in Table 2 below. Another part of the glass compositions satisfying the same criteria was used as a validation set to evaluate the ability to interpolate within the predefined compositional limits, which corresponds to the standard deviations specified in the Table 2. An external dataset of prior art glass compositions, also randomly selected from the SciGlass Information System database, was used to evaluate the ability to predict the particular properties outside of the specified compositional limits with a reasonable accuracy. Multiple iterations of this process were performed in order to determine the best variant for each property of interest, corresponding to the above-mentioned regression formulas specified in Table 2.

TABLE 1

Composition Area Used for Modeling

| Property | $n_d$ | | $d_{RT}$ (g/cm³) | | $(n_d - 1)/d_{RT}$ | |
|---|---|---|---|---|---|---|
| Component limits | Min. (mol %) | Max. (mol %) | Min. (mol %) | Max. (mol %) | Min. (mol %) | Max. (mol %) |
| $TiO_2$ | 5 | 40 | 5 | 40 | 10 | 40 |
| $La_2O_3$ | 0 | 30 | 0 | 30 | 0 | 30 |
| $B_2O_3$ | 5 | 30 | 5 | 30 | 15 | 25 |
| $SiO_2$ | 5 | 20 | 5 | 20 | 5 | 20 |
| $ZrO_2$ | 0 | 10 | 0 | 10 | 0 | 8 |
| $Nb_2O_5$ | 0 | 15 | 0 | 15 | 0 | 7.5 |
| CaO | 0 | 20 | 0 | 20 | 0 | 20 |
| BaO | 0 | 10 | 0 | 10 | 0 | 7.5 |
| $Y_2O_3$ | 0 | 85 | 0 | 85 | 0 | 5 |
| Other species | 0 | 85 | 0 | 85 | 0 | 70 |

TABLE 2

Property Prediction Models

| Property | Abbreviation | Unit | Predicting Parameter | Regression Formula | Standard error |
|---|---|---|---|---|---|
| Refractive index at 587.56 nm | $n_d$ | | $P_n$ | Formula (VI) | 0.019 |
| Density at room temperature | $d_{RT}$ | g/cm³ | $P_d$ | Formula (VII) | 0.12 |
| Refraction $[(n_d-1)/d_{RT}]$ | $(n_d-1)/d_{RT}$ | cm³/g | $P_{ref}$ | Formula (VIII) | 0.0031 |

Figure 2:
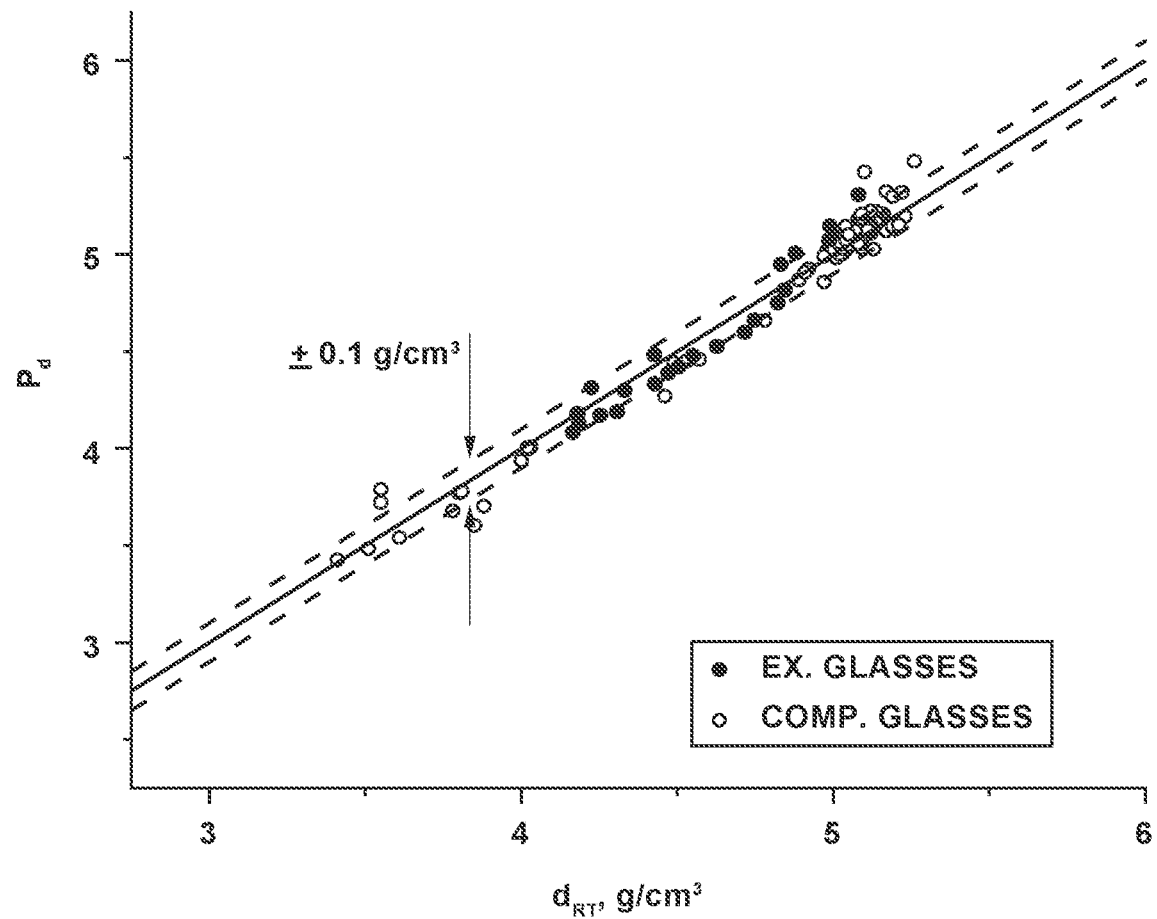
FIG. 2 is a plot illustrating the relationship between the density $d_{RT}$, as measured at room temperature (in g/cm$^3$), and the density parameter $P_d$ calculated according to formula (VII) for some comparative glasses and some exemplary glasses according to an embodiment of the present disclosure.
Figure 3:
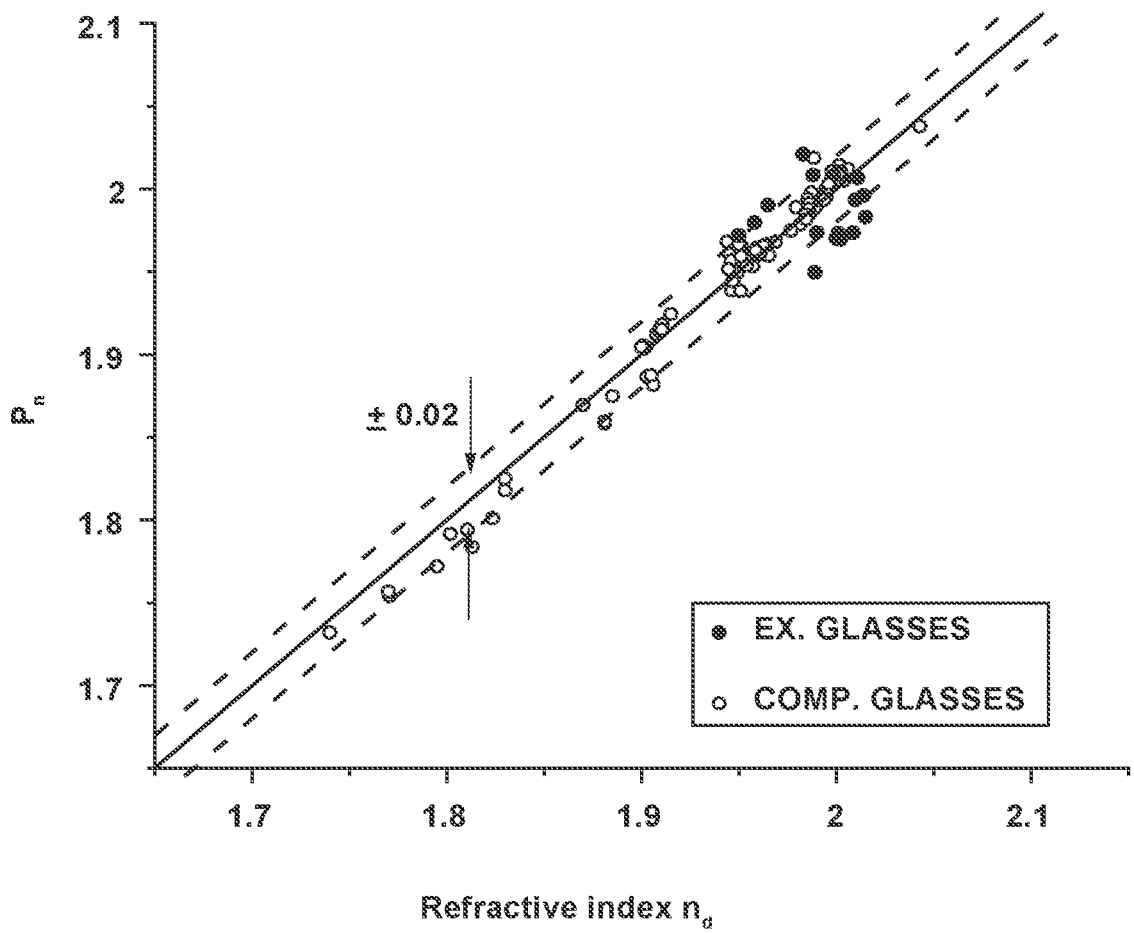
FIG. 3 is a plot illustrating the relationship between the refractive index $n_d$, as measured at 587.56 nm, and the refractive index parameter $P_n$ calculated according to formula (VI) for some comparative glasses and some exemplary glasses according to an embodiment of the present disclosure.
Figure 4:
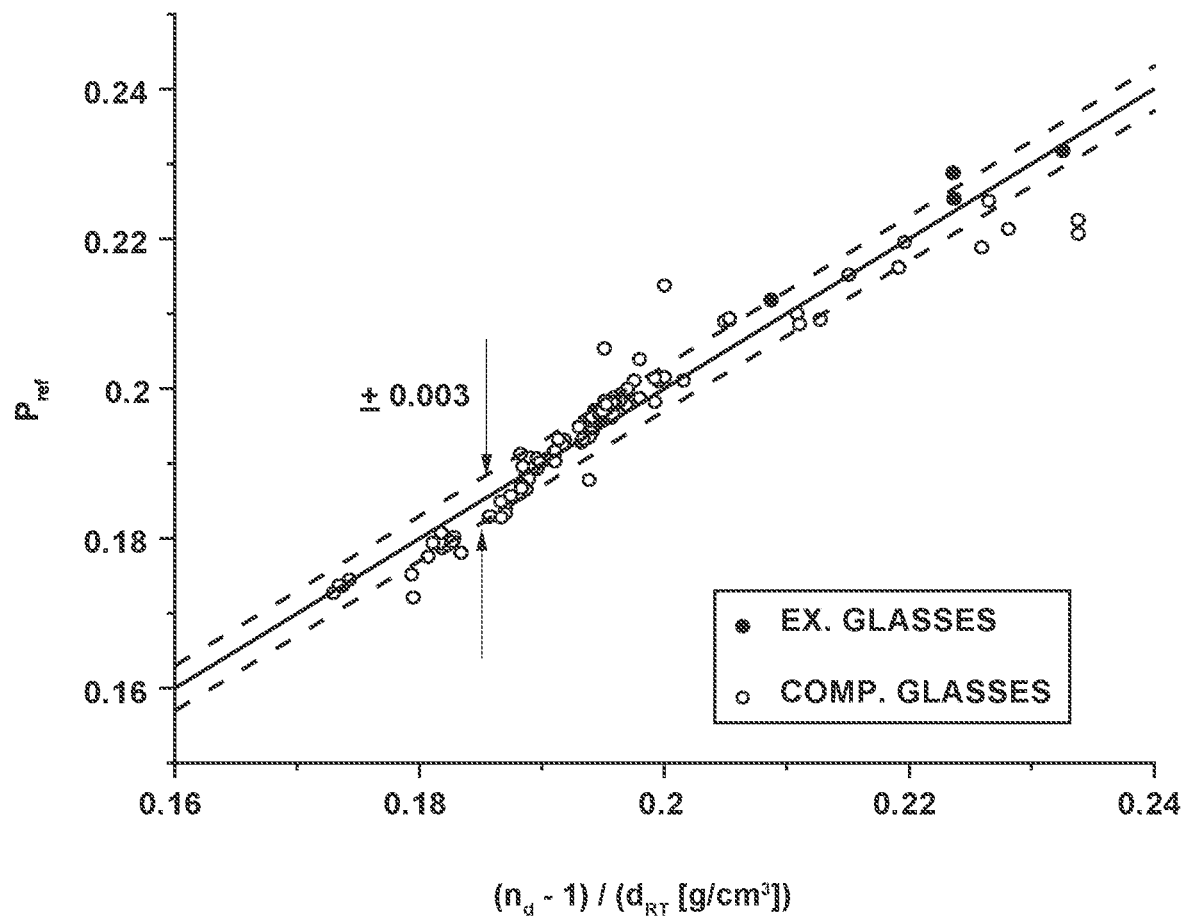
FIG. 4 is a plot illustrating the relationship between the refractive index to density ratio ("refraction") $(n_d-1)/d_{RT}$ and the refraction parameter $P_{ref}$ calculated according to formula (VIII) for some comparative glasses and some exemplary glasses according to an embodiment of the present disclosure.

FIG. 2 is a plot of measured density $d_{RT}$ (measured at 25° C., in g/cm³) as a function of density parameter $P_d$ for some Comparative Glasses ("Comp. Glasses") and Exemplary Glasses ("Ex. Glasses"). As illustrated by the data in FIG. 2, the composition dependence of the density parameter $P_d$ had an error within a range of ±0.12 g/cm³ of the measured density $d_{RT}$ for the majority of the glasses. FIG. 3 is a plot of measured refractive index $n_d$ (measured at 587.56 nm) as a function of refractive index parameter $P_n$ for some Comparative Glasses ("Comp. Glasses") and Exemplary Glasses ("Ex. Glasses"). As illustrated by the data in FIG. 3, the compositional dependence of the refractive index parameter $P_n$ had an error within a range of ±0.019 units of the measured refractive index $n_d$ for the majority of the glasses. FIG. 4 is a plot of the ratio of one less than the measured refractive index $n_d$ (measured at 587.56 nm) and measured density $d_{RT}$ (measured at 25° C., in g/cm³), $(n_d-1)/d_{RT}$ ("refraction"), as a function of the refraction parameter $P_{ref}$ for some Comparative Glasses ("Comp. Glasses") and Exemplary Glasses ("Ex. Glasses"). As illustrated by the data in FIG. 4, the compositional dependence of the refraction parameter $P_{ref}$ had an error within a range of ±0.003 units of the measured refraction value for the majority of the glasses.

Concentration limits representing some embodiments of the present disclosure are specified in Tables 3-5 below.

According to another embodiment of the present disclosure, the present glasses can have refractive index parameter $P_n$ and a density parameter $P_d$ that satisfies one or more of formula (IX) and (X):

$$P_n-(1.000+0.19*P_d)>0.000 \quad (IX)$$

$$P_n-(1.03+0.19*P_d)>0.000 \quad (X)$$

where $P_n$ is the refractive index parameter determined according to formula (VI) and $P_d$ is the density parameter determined according to formula (VII).

According to another embodiment of the present disclosure, the present glasses can have a refractive index parameter $P_n$ and a transmittance index $T_i$ that satisfy one or more formulas (XI)(a) and (XI)(b):

$$P_n-(2.055-0.36*T_i)>0.000 \quad (XI)(a)$$

$$P_n-(2.1-0.36*T_i)>0.000 \quad (XI)(b)$$

where $P_n$ is the refractive index parameter determined according to formula (VI) and $T_i$ is the transmittance index determined according to formula (III).

According to an embodiment of the present disclosure, the present glasses can have a refractive index parameter $P_{ref}$ and transmittance index $T_i$ that satisfy formula (XII):

$$P_{ref}-(0.262-0.115*T_i)>0.000 \quad (XII)$$

where $P_{ref}$ is the refraction parameter determined according to formula (VIII) and $T_i$ is the transmittance index determined according to formula (III).

In some embodiments, the glasses may be characterized by good glass forming ability, which can be assessed as a resistance to devitrification during cooling. As discussed above, glass forming ability can be measured numerically by determining the critical cooling rate of a melt, i.e., the minimum cooling rate at which a melt forms a glass without crystallization. According to one embodiment, the glasses may be characterized by a critical cooling rate less than or equal to 300° C./min. and in some examples, less than or equal to 100° C./min. In some embodiments, the glasses of the present disclosure can be characterized by an ability to cool, in air, from 1100° C. to 500° C. in 2.5 minutes without crystallizing. Glasses characterized by this glass forming ability can be compatible with press molding processes.

Exemplary Glasses A of the present disclosure according to some embodiments of the present disclosure are shown below in Table 3. Table 3 identifies the combination of components and their respective amounts according to some embodiments of the present disclosure. The Exemplary Glasses A in Table 3 may include additional components according to any aspects of the present disclosure as described herein in an amount that is not greater than 0.5 mol %.

TABLE 3

| Exemplary Glasses A | |
|---|---|
| Component | Amount (mol %) |
| $La_2O_3$ | 15.0 mol % to 50.0 mol % |
| $B_2O_3$ | 9.0 mol % to 33.0 mol % |
| $TiO_2$ | 0.0 mol % to 40.0 mol % |
| $ZrO_2$ | 0.0 mol % to 13.5 mol % |
| $Nb_2O_5$ | 0.0 mol % to 12.0 mol % |
| $Y_2O_3$ | 0.0 mol % to 3.0 mol % |
| $Ta_2O_5$ | 0.0 mol % to 1.5 mol % |
| ZnO | 0.0 mol % to 0.8 mol % |
| $Li_2O$ | 0.0 mol % to 0.5 mol % |

The Exemplary Glasses A in Table 3 may also have a ratio of $SiO_2/(B_2O_3+SiO_2)$, expressed in terms of mol % of each oxide, that is greater than or equal to 0.05 and less than or equal to 0.95.

Exemplary Glasses A according to some embodiments of the present disclosure may also have a transmittance index $T_i$ of greater than or equal to 0.532, where the transmittance index $T_i$ is determined according to formula (III).

Exemplary Glasses A according to some embodiments may also satisfy one or more of formulas (IX) and (X):

$$P_n-(1.000+0.19*P_d)>0.000 \quad (IX)$$

$$P_n-(1.03+0.19*P_d)>0.000 \quad (X)$$

where $P_n$ is the refractive index parameter determined according to formula (VI) and $P_d$ is the density parameter determined according to formula (VII).

Exemplary Glasses A according to some embodiments may also satisfy one or more of formulas (I)(a) and (I)(b):

$$n_d-(1.000+0.19*d_{RT})>0.000 \quad (I)(a)$$

$$n_d-(1.03+0.19*d_{RT})>0.000 \quad (I)(b)$$

where $n_d$ is the refractive index as measured at 587.56 nm and $d_{RT}$ is the density as measured at 25° C. (in g/cm³).

Exemplary Glasses B according to some embodiments of the present disclosure are shown below in Table 4. Table 4 identifies the combination of components and their respective amounts according to some embodiments of the present disclosure. The Exemplary Glasses B in Table 4 may include additional components according to any aspects of the present disclosure as described herein in an amount that is not greater than 0.5 mol %.

TABLE 4

| Exemplary Glasses B | |
|---|---|
| Component | Amount (mol %) |
| $SiO_2$ | ≥3.0 mol % |
| $B_2O_3$ | ≥1.0 mol % |
| CaO | 0.0 mol % to 32.0 mol % |
| $Gd_2O_3$ | 0.0 mol % to 27.0 mol % |
| $Nb_2O_5$ | 0.0 mol % to 25.0 mol % |
| $Bi_2O_3$ | 0.0 mol % to 20.0 mol % |
| $TiO_2$ | 0.0 mol % to 18.0 mol % |
| BaO | 0.0 mol % to 14.0 mol % |
| CdO | 0.0 mol % to 10.0 mol % |
| $Li_2O$ | 0.0 mol % to 7.0 mol % |
| ZnO | 0.0 mol % to 2.0 mol % |
| MgO | 0.0 mol % to 5.0 mol % |
| $TeO_2$ | 0.0 mol % to 5.0 mol % |
| $Y_2O_3$ | 0.0 mol % to 1.5 mol % |

TABLE 4-continued

| Exemplary Glasses B | |
|---|---|
| Component | Amount (mol %) |
| PbO | 0.0 mol % to 1.0 mol % |
| HfO$_2$ | 0.0 mol % to 1.0 mol % |
| Ta$_2$O$_5$ | 0.0 mol % to 0.5 mol % |

The Exemplary Glasses B in Table 4 may also contain fluorine in an amount of from 0.0 to 1.0 at. %. In some embodiments, the Exemplary Glasses B in Table 4 may also contain a sum (SiO$_2$+B$_2$O$_3$) of 50.0 mol % or less.

Exemplary Glasses B according to some embodiments of the present disclosure may also have a sum of (SiO$_2$+B$_2$O$_3$+ Alk$_2$O+ MgO+ CaO+ SrO+ BaO+ ZnO) of 69.0 mol % or less, where Alk$_2$O is a total content of alkali metal oxides. Exemplary Glasses B according to some embodiments may also have a sum of (RE$_m$O$_n$+ TiO$_2$+Nb$_2$O$_5$+ ZrO$_2$+Bi$_2$O$_3$+ WO$_3$) of 25.0 mol % or greater, where RE$_m$O$_n$ is a total content of rare earth metal oxides. Exemplary Glasses B according to some embodiments may also contain a sum of divalent metal oxides RO that is greater than or equal to 8.5 mol %.

Exemplary Glasses B according to some embodiments may satisfy one or more formulas (XI)(a) and (XI)(b):

$$P_n-(2.055-0.36*T_i)>0.000 \quad (XI)(a)$$

$$P_n-(2.1-0.36*T_i)>0.000 \quad (XI)(b)$$

where P$_n$ is the refractive index parameter determined according to formula (VI) and T$_i$ is the transmittance index determined according to formula (III).

Exemplary Glasses B according to some embodiments may also satisfy one or more formulas (II)(a) and (II)(b):

$$n_d-(2.055-0.36*T_i)\geq0.000 \quad (II)(a)$$

$$n_d-(2.1-0.36*T_i)\geq0.000 \quad (II)(b)$$

where n$_d$ is the refractive index, as measured at 587.56 nm, and T$_i$ is the transmittance index determined according to formula (III).

Exemplary Glasses C of the present disclosure according to some embodiments of the present disclosure are shown below in Table 5. Table 5 identifies the combination of components and their respective amounts according to an embodiment of the present disclosure. The Exemplary Glasses C in Table 5 may include additional components according to any aspects of the present disclosure as described herein.

TABLE 5

| Exemplary Glasses C | |
|---|---|
| Composition | Amount (mol %) |
| TiO$_2$ | 1.0 to 40.0 mol % |
| B$_2$O$_3$ | 1.0 to 29.0 mol % |
| SiO$_2$ | 0.0 to 32.0 mol % |
| La$_2$O$_3$ | 0.0 to 30.0 mol % |
| CaO | 0.0 to 15.0 mol % |
| BaO | 0.0 to 15.0 mol % |
| GeO$_2$ | 0.0 to 10.0 mol % |
| Al$_2$O$_3$ | 0.0 to 10.0 mol % |
| ZrO$_2$ | 0.0 to 7.8 mol % |
| Nb$_2$O$_5$ | 0.0 to 7.0 mol % |
| Li$_2$O | 0.0 to 3.5 mol % |

The Exemplary Glasses C in Table 5 may also contain fluorine in an amount of from 0.0 to 1.0 at. %. In some embodiments, the Exemplary Glasses C in Table 5 may contain a sum (SiO$_2$+B$_2$O$_3$) of 45.0 mol % or less. The Exemplary Glasses C in Table 5 may also contain a sum (Y$_2$O$_3$+ ZnO) of 2.0 mol % or less.

In some embodiments, the Exemplary Glasses C may also contain a total content of divalent metal oxides (RO) in an amount of from 0.0 mol % to 25.0 mol %. In some embodiments, the Exemplary Glasses C may also contain a total content of monovalent metal oxides (R$_2$O) in an amount of from 0.0 mol % to 15.0 mol %.

Exemplary Glasses C according to embodiments of the present disclosure may also have a transmittance index T$_i$ of from 0.25 to 0.75 and may further satisfy formula (XII):

$$P_{ref}-(0.262-0.115*T_i)>0.000 \quad (XII)$$

where P$_{ref}$ is the refraction parameter determined according to formula (VIII) and T$_i$ is the transmittance index determined according to formula (III).

In some embodiments, the Exemplary Glasses C may also satisfy formula (V):

$$[(n_d-1)/d_{RT}]-(0.262-0.115*T_i)>0.000 \quad (V)$$

where n$_d$ is the refractive index, as measured at 587.56 nm, and T$_i$ is the transmittance index determined according to formula (III).

Embodiments of the present disclosure can provide glasses that are characterized by a high refractive index n$_d$ of 1.80 or greater and a density of less than or equal to, 5.5 g/cm$^3$ (as measured at 25° C.) in combination with a high transmittance, particularly to blue light. In some embodiments, the glasses of the present disclosure can provide an improvement in glass forming ability compared to some prior art silicoborate glasses that have similar values of density, refractive index n$_d$, and transmittance. In some embodiments, the glasses provide comparable or improved transmittance to light in the visible region of the spectrum compared to prior art glasses having similar refractive index n$_d$ and/or density characteristics.

Glass transmittance can be based at least in part on the composition constituents and/or processes used to form the glass. In a manufacturing setting in which the process parameters have already been determined/optimized, the transmittance of the glass essentially becomes composition dependent. Without wishing to be bound by any theory, it is believed that components such as TiO$_2$ and Nb$_2$O$_5$ may reduce the blue transmittance of a glass, particularly when used in high concentrations. However, components such as TiO$_2$ and Nb$_2$O$_5$ can be used in to increase the refractive index of a glass without a corresponding undesirable increase in the density of the glass. Thus, in some embodiments, components such as TiO$_2$ and Nb$_2$O$_5$ can be added at concentrations adapted to provide a desired refractive index and density that also still provides a glass having an acceptable level of transmittance of blue light. The refractive index of the present glasses can also be increased using other oxides as well, such as ZrO$_2$, La$_2$O$_3$, Gd$_2$O$_3$, and in some cases other rare earth metal oxides. It has been found that the addition of these oxides can produce a glass having a desirable transmittance of blue light. However, these oxides may also increase the density, which may be undesirable in some applications. High concentrations of some of these oxides may also decrease the glass-forming ability of the composition. For example, these oxides may increase the liquidus temperature and/or result in precipitation of crystalline phases containing these oxides from the glass melts at high temperature. Of the oxides $ZrO_2$, $La_2O_3$, $Gd_2O_3$, $TiO_2$, and $Nb_2O_5$, $ZrO_2$ was observed in some compositions to have the greatest impact on liquidus temperature while at the same time having the least impact on blue transmittance of the glass. Thus, attempts to increase the refractive index and/or decrease density can have an undesirable effect on the glass-forming ability of a composition. Embodiments of the present disclosure can provide glasses that provide an acceptable balance of high refractive index $n_d$, density (as measured at 25° C.), and blue transmittance characteristics that is desirable in many applications, such as augmented reality devices, virtual reality devices, mixed reality devices, and/or eye wear, for example.

Examples

The following examples describe various features and advantages provided by the disclosure, and are in no way intended to limit the invention and appended claims.

Exemplary Glasses and Comparative Glasses were all prepared by melting relatively pure oxide materials. Table 6 below lists the typical tramp elements found in some of the oxides used in preparing the Exemplary Glasses and Comparative Glasses described herein.

TABLE 6

Raw Oxide Materials and Corresponding Level of Tramp Elements.

| Raw material | Fe content (ppm) | Cu content (ppm) | Ni content (ppm) | Cr content (ppm) |
|---|---|---|---|---|
| Quartz | <10 | <1 | <1 | <1 |
| Boric anhydride | <10 | <1 | <1 | <1 |
| Titanium oxide | <50 | <15 | <1 | <5 |
| Zirconium oxide | <5 | <5 | <5 | <5 |
| Niobium oxide | <70 | <5 | <5 | <5 |
| Lanthanum oxide | <90 | <4 | <5 | <5 |

Figure 5:
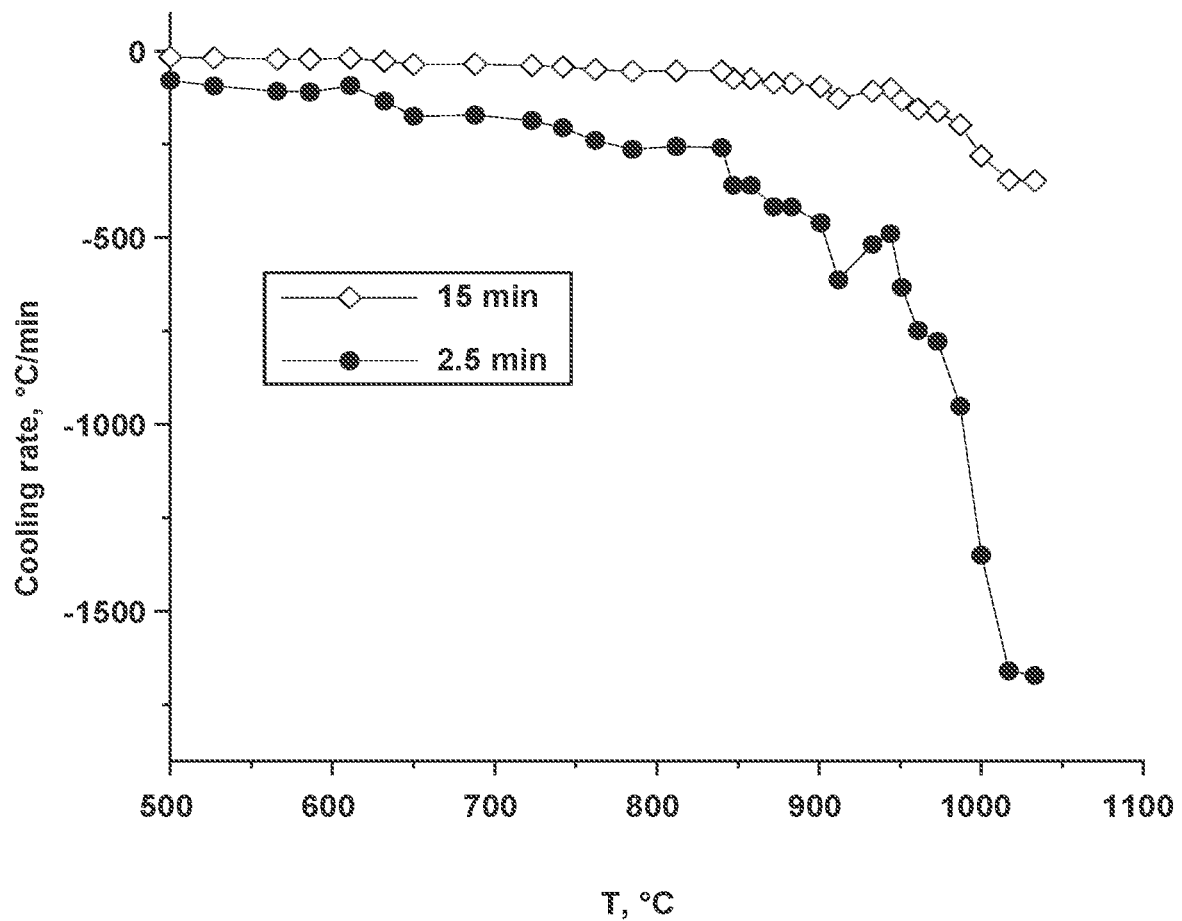
FIG. 5 is a plot of an exemplary cooling schedule according to a "15 min test" condition and a "2.5 min test" condition for some exemplary glasses according to an embodiment of the present disclosure.

To prepare the glass samples, about 15 grams of each sample (content of target species was more than 99.99 wt %) was melted from batch raw materials at a temperature of about 1300° C. in platinum or platinum-rhodium crucibles (Pt:Rh=80:20) for 1 hour. Two controlled cooling conditions were applied. In the first condition (referred to as "15 min test"), it takes about 15 min for the samples to cool from 1100° C. to 500° C. inside a furnace. In the second condition (referred to as "2.5 min test"), it takes about 2.5 min for the samples to cool from 1100° C. to 500° C. Temperature readings were obtained by direct reading of the furnace temperature or using an IR camera reading with calibration scaling. The first condition (15 min test) approximately corresponds to the cooling rate of up to 300° C./min at a temperature of 1000° C. and the second test condition (2.5 min test) approximately corresponds to the cooling rate of up to 600° C./min at 1000° C. (near to this temperature, the cooling rate approached the maximum). When the temperature is lower, the cooling rate also decreases significantly. Typical schedules of the first and second cooling regimes are shown in FIG. 5. No chemical analysis of the tested samples was performed because chemical analysis was performed for similar samples prepared in independent meltings by XRF method (X-ray fluorescence—for all oxides, except for $B_2O_3$) and by ICP method (inductively coupled plasma mass spectrometry—for $B_2O_3$). These analyses gave deviations from the batched compositions within ±2.0 mass % for the major components such as $Nb_2O_5$ which is equivalently less than about 1 mol %.

Table 7 below lists the glass compositions and properties for Exemplary Glasses 1-78, according to embodiments of the present disclosure. Table 7 includes the observations from three devitrification tests, referred to as "Devit test 1," "Devit test 2," and Devit test 3." "Devit test 1" refers to the results of observations of glass samples melted in 1 liter crucibles under an optical microscope (between 100× and 500× magnification). The abbreviations "A", "B", "C" and "D" are used as follows: no evidence of crystallization ("A"); a very limited number of crystals was found under the microscope, typically in only one or two spots within the glass and only at the surface, with more than 98% of the surface being crystal free ("B"); more crystals at the surface, but with more than 90% of the glass surface being crystal-free ("C"); and some crystals in the bulk of crucible, with less than 90% of the glass surface being crystal-free ("D"). "Devit test 2" refers to the "15 min test" cooling procedure as described above; the observation "OK" is used to indicate that a glass composition passed this test. "Devit test 3" refers to the "2.5 min test" cooling procedure as described above; the observation "OK" is used to indicate that a glass composition passed this test.

TABLE 7

| Exemplary Glass Compositions | | | | | | | | | |
|---|---|---|---|---|---|---|---|---|---|
| | | Exemplary Glass | | | | | | | |
| | | 1 | 2 | 3 | 4 | 5 | 6 | 7 | 8 |
| Composition - mol % | | | | | | | | | |
| $SiO_2$ | mol % | 10.50 | 11.81 | 12.60 | 11.26 | 15.44 | 9.77 | 9.98 | 10.76 |
| $B_2O_3$ | mol % | 22.50 | 21.68 | 22.78 | 20.37 | 20.64 | 17.98 | 17.00 | 17.98 |
| CaO | mol % | 8.28 | 8.36 | 0 | 0 | 0 | 14.99 | 14.99 | 9.99 |
| $Na_2O$ | mol % | 1.39 | 0 | 0 | 0 | 0 | 0 | 0 | 0 |
| $K_2O$ | mol % | 0.81 | 0 | 0 | 0 | 0 | 0 | 0 | 0 |
| $TiO_2$ | mol % | 17.97 | 18.15 | 19.16 | 20.27 | 21.31 | 32.54 | 33.73 | 32.44 |
| $ZrO_2$ | mol % | 6.99 | 7.06 | 7.45 | 7.88 | 8.00 | 6.36 | 6.99 | 6.33 |
| $Nb_2O_5$ | mol % | 5.94 | 6.00 | 6.33 | 6.70 | 6.98 | 4.85 | 3.00 | 4.87 |
| $La_2O_3$ | mol % | 22.65 | 22.87 | 24.14 | 25.54 | 24.68 | 13.42 | 14.21 | 13.50 |
| BaO | mol % | 1.65 | 2.74 | 6.12 | 6.48 | 0 | 0 | 0 | 4.00 |
| ZnO | mol % | 0.28 | 0.28 | 0.30 | 0.31 | 0 | 0 | 0 | 0 |
| $Gd_2O_3$ | mol % | 0.26 | 0.26 | 0.28 | 0.29 | 0.42 | 0 | 0 | 0 |
| $WO_3$ | mol % | 0.37 | 0.38 | 0.40 | 0 | 0 | 0 | 0 | 0 |
| $Y_2O_3$ | mol % | 0.40 | 0.41 | 0.43 | 0.88 | 2.54 | 0 | 0 | 0 |

TABLE 7-continued

| | | Exemplary Glass Compositions | | | | | | | |
|---|---|---|---|---|---|---|---|---|---|
| CeO$_2$ | mol % | 0 | 0 | 0 | 0 | 0 | 0.08 | 0.09 | 0.08 |
| Fe$_2$O$_3$ | mol % | 0 | 0 | 0 | 0 | 0 | 0.01 | 0.01 | 0.01 |
| SrO | mol % | 0 | 0 | 0 | 0 | 0 | 0 | 0 | 0.04 |
| | | Composition constraints | | | | | | | |
| SiO$_2$/(SiO$_2$ + B$_2$O$_3$) | mol % | 0.3182 | 0.3526 | 0.3561 | 0.3560 | 0.4279 | 0.3522 | 0.3700 | 0.3744 |
| RE$_m$O$_n$ + TiO$_2$ + Nb$_2$O$_5$ + ZrO$_2$ + Bi$_2$O$_3$ + WO$_3$ | mol % | 54.59 | 55.13 | 58.20 | 61.57 | 63.92 | 57.23 | 58.00 | 57.20 |
| SiO$_2$ + B$_2$O$_3$ | mol % | 33.00 | 33.49 | 35.38 | 31.64 | 36.08 | 27.76 | 26.99 | 28.75 |
| SiO$_2$ + B$_2$O$_3$ + Alk$_2$O + MgO + CaO + SrO + BaO + ZnO | mol % | 45.41 | 44.87 | 41.80 | 38.43 | 36.08 | 42.76 | 41.99 | 42.79 |
| Y$_2$O$_3$ + ZnO | mol % | 0.6801 | 0.6900 | 0.7301 | 1.191 | 2.540 | 0 | 0 | 0 |
| | | Measured properties | | | | | | | |
| n$_d$ | | 1.950 | 1.958 | 1.965 | 1.983 | 1.988 | 1.990 | 2.000 | |
| d$_{RT}$ | g/cm$^3$ | 4.831 | 4.879 | 4.989 | 5.081 | 4.987 | 4.428 | 4.471 | 4.505 |
| TX$_{460nm}$, % | | 94.790 | 95.450 | 95.440 | 94.910 | | | | |
| (n$_d$ − 1)/d$_{RT}$ | | 0.19664 | 0.19635 | 0.19341 | 0.19347 | 0.19813 | 0.22358 | 0.22366 | |
| T$_i$ | | 0.55562 | 0.55556 | 0.55562 | 0.55551 | 0.53916 | 0.34585 | 0.36589 | 0.34703 |
| Devit Test 2 | | | | | | | OK | | OK |
| Devit Test 1 | | A | A | B | B | A | | | |
| Devit Test 3 | | | | | | | OK | OK | OK |
| n$_d$ − (1 + 0.19 * d$_{RT}$) | | 0.0321 | 0.031 | 0.017 | 0.0176 | 0.0405 | 0.1487 | 0.1505 | |
| n$_d$ − (2.055 − 0.36 * T$_i$) | | 0.095 | 0.103 | 0.110 | 0.128 | 0.1271 | 0.0596 | 0.0767 | |
| (n$_d$ − 1)/d$_{RT}$ − (0.262 − 0.115 * T$_i$) | | −0.0015 | −0.0018 | −0.0047 | −0.0046 | −0.0019 | 0.0014 | 0.0037 | |
| | | Predicted properties | | | | | | | |
| P$_n$ [for n$_d$] | | 1.972 | 1.980 | 1.990 | 2.021 | 2.008 | 1.974 | 1.970 | 1.973 |
| P$_d$ [for d$_{RT}$] | g/cm$^3$ | 4.949 | 5.007 | 5.147 | 5.308 | 5.075 | 4.334 | 4.388 | 4.421 |
| P$_{ref}$ [for (n$_d$ − 1)/d$_{RT}$] | | 0.1948 | 0.1938 | 0.1898 | 0.1883 | 0.1974 | 0.2287 | 0.2254 | 0.2242 |
| P$_n$ − (1 + 0.19 * P$_d$) | | 0.0316 | 0.0284 | 0.0123 | 0.0124 | 0.0441 | 0.1502 | 0.1362 | 0.1332 |
| P$_n$ − (2.055 − 0.36 * T$_i$) | | 0.1169 | 0.1248 | 0.1352 | 0.1659 | 0.1473 | 0.0432 | 0.0466 | 0.0431 |
| P$_{ref}$ − (0.262 − 0.115 * T$_i$) | | −0.0033 | −0.0043 | −0.0083 | −0.0098 | −0.0026 | 0.0065 | 0.0054 | 0.0021 |

| | | Exemplary Glass | | | | | | | |
|---|---|---|---|---|---|---|---|---|---|
| | | 9 | 10 | 11 | 12 | 13 | 14 | 15 | 16 |
| | | Composition - mol % | | | | | | | |
| SiO$_2$ | mol % | 10.99 | 10.99 | 17.59 | 17.39 | 17.68 | 17.20 | 17.48 | 9.99 |
| B$_2$O$_3$ | mol % | 16.96 | 17.99 | 17.97 | 17.97 | 16.95 | 17.97 | 16.95 | 16.18 |
| CaO | mol % | 9.99 | 9.98 | 0.05 | 0.02 | 0.05 | 0.02 | 0.02 | 14.99 |
| Na$_2$O | mol % | 0 | 0 | 0.02 | 0 | 0.02 | 0 | 0 | 0 |
| TiO$_2$ | mol % | 33.64 | 35.97 | 29.60 | 32.49 | 33.08 | 35.01 | 35.91 | 31.91 |
| ZrO$_2$ | mol % | 6.99 | 7.00 | 5.07 | 5.74 | 6.34 | 6.32 | 6.98 | 6.99 |
| Nb$_2$O$_5$ | mol % | 2.97 | 3.99 | 6.55 | 5.67 | 3.84 | 4.90 | 2.98 | 2.20 |
| La$_2$O$_3$ | mol % | 14.35 | 9.99 | 22.99 | 20.58 | 21.89 | 18.45 | 19.54 | 17.62 |
| BaO | mol % | 3.99 | 3.99 | 0 | 0 | 0 | 0 | 0 | 0 |
| CeO$_2$ | mol % | 0.08 | 0.06 | 0.14 | 0.12 | 0.13 | 0.11 | 0.11 | 0.11 |
| Fe$_2$O$_3$ | mol % | 0.01 | 0.01 | 0.01 | 0.01 | 0.01 | 0.01 | 0.01 | 0.0077 |
| SrO | mol % | 0.03 | 0.03 | 0 | 0 | 0 | 0 | 0 | 0 |
| Al$_2$O$_3$ | mol % | 0 | 0 | 0.01 | 0.01 | 0.01 | 0.01 | 0.01 | 0 |
| | | Composition constraints | | | | | | | |
| SiO$_2$/(SiO$_2$ + B$_2$O$_3$) | mol % | 0.3932 | 0.3793 | 0.4947 | 0.4918 | 0.5105 | 0.4890 | 0.5077 | 0.3817 |
| RE$_m$O$_n$ + TiO$_2$ + Nb$_2$O$_5$ + ZrO$_2$ + Bi$_2$O$_3$ + WO$_3$ | mol % | 58.01 | 57.00 | 64.32 | 64.58 | 65.26 | 64.77 | 65.51 | 58.81 |
| SiO$_2$ + B$_2$O$_3$ | mol % | 27.96 | 28.98 | 35.59 | 35.38 | 34.65 | 35.19 | 34.45 | 26.19 |
| SiO$_2$ + B$_2$O$_3$ + Alk$_2$O + MgO + CaO + SrO + BaO + ZnO | mol % | 41.98 | 42.99 | 35.66 | 35.40 | 34.72 | 35.21 | 34.47 | 41.18 |
| | | Measured properties | | | | | | | |
| n$_d$ | | | | 2.011 | | | | | |
| d$_{RT}$ | g/cm$^3$ | 4.550 | 4.307 | 4.844 | 4.747 | 4.821 | 4.627 | 4.716 | |
| (n$_d$ − 1)/d$_{RT}$ | | | | 0.20871 | | | | | |
| T$_i$ | | 0.36822 | 0.29831 | 0.43712 | 0.40814 | 0.43334 | 0.38303 | 0.40547 | 0.41919 |
| Devit Test 2 | | OK | | | OK | OK | | OK | |
| Devit Test 3 | | OK | OK | OK | OK | OK | OK | OK | |

TABLE 7-continued

Exemplary Glass Compositions

| | | | | | | | | |
|---|---|---|---|---|---|---|---|---|
| $n_d - (1 + 0.19 * d_{RT})$ | | | 0.0906 | | | | | |
| $n_d - (2.055 - 0.36 * T_i)$ | | | 0.1133 | | | | | |
| $(n_d - 1)/d_{RT} - (0.262 - 0.115 * T_i)$ | | | −0.003 | | | | | |

Predicted properties

| | | | | | | | | |
|---|---|---|---|---|---|---|---|---|
| $P_n$ [for $n_d$] | | 1.970 | 1.957 | 2.007 | 1.996 | 1.993 | 1.987 | 1.983 | 1.980 |
| $P_d$ [for $d_{RT}$] | g/cm³ | 4.479 | 4.190 | 4.816 | 4.662 | 4.749 | 4.526 | 4.599 | 4.615 |
| $P_{ref}$ [for $(n_d - 1)/d_{RT}$] | | 0.2207 | 0.233 | 0.2118 | 0.2179 | 0.2129 | 0.2233 | 0.2189 | 0.2156 |
| $P_n - (1 + 0.19 * P_d)$ | | 0.1185 | 0.1608 | 0.0916 | 0.1103 | 0.0910 | 0.1268 | 0.1093 | 0.1031 |
| $P_n - (2.055 - 0.36 * T_i)$ | | 0.0471 | 0.0091 | 0.1089 | 0 | 0 | 0 | 0 | 0 |
| $P_{ref} - (0.262 - 0.115 * T_i)$ | | 9.900E−04 | 0.0053 | 8.200E−05 | 0.0029 | 7.600E−04 | 0.0053 | 0.0035 | 0.0019 |

| | | Exemplary Glass | | | | | | | |
|---|---|---|---|---|---|---|---|---|---|
| | | 17 | 18 | 19 | 20 | 21 | 22 | 23 | 24 |

Composition - mol %

| | | | | | | | | | |
|---|---|---|---|---|---|---|---|---|---|
| SiO₂ | mol % | 9.99 | 9.99 | 16.97 | 12.43 | 12.22 | 11.97 | 17.38 | 17.68 |
| B₂O₃ | mol % | 17.99 | 17.98 | 17.98 | 17.95 | 17.97 | 17.97 | 17.96 | 16.95 |
| CaO | mol % | 14.99 | 6.00 | 0.0222 | 0.03 | 0.02 | 0.0225 | 0.0493 | 0.0494 |
| Na₂O | mol % | 0 | 5.00 | 0 | 0.07 | 0.06 | 0.0611 | 0.0223 | 0.0223 |
| K₂O | mol % | 0 | 0 | 0 | 4.98 | 4.99 | 4.99 | 0 | 0 |
| TiO₂ | mol % | 35.97 | 35.96 | 37.95 | 32.12 | 34.76 | 37.94 | 32.49 | 33.09 |
| ZrO₂ | mol % | 7.00 | 6.99 | 6.99 | 5.65 | 6.26 | 6.99 | 5.73 | 6.34 |
| Nb₂O₅ | mol % | 4.00 | 3.99 | 4.00 | 5.77 | 4.96 | 3.99 | 5.67 | 3.84 |
| La₂O₃ | mol % | 9.99 | 9.99 | 15.98 | 20.86 | 18.63 | 15.98 | 20.57 | 21.89 |
| BaO | mol % | 0 | 3.99 | 0 | 0 | 0 | 0 | 0 | 0 |
| CeO₂ | mol % | 0.06 | 0.06 | 0.0941 | 0.12 | 0.11 | 0.0953 | 0.12 | 0.13 |
| Fe₂O₃ | mol % | 0.01 | 0.01 | 0.0078 | 0 | 0 | 0 | 0 | 0 |
| SrO | mol % | 0 | 0.03 | 0 | 0 | 0 | 0 | 0 | 0 |
| Al₂O₃ | mol % | 0 | 0 | 0.0122 | 0 | 0 | 0 | 0.0136 | 0.0136 |
| PbO | mol % | 0 | 0.01 | 0 | 0 | 0 | 0 | 0 | 0 |
| Ta₂O₅ | mol % | 0 | 0 | 0 | 0.01 | 0.01 | 0.0029 | 0.0063 | 0.0031 |

Composition constraints

| | | | | | | | | | |
|---|---|---|---|---|---|---|---|---|---|
| SiO₂/(SiO₂ + B₂O₃) | mol % | 0.3571 | 0.3572 | 0.4857 | 0.4092 | 0.4047 | 0.3999 | 0.4918 | 0.5105 |
| RE$_m$O$_n$ + TiO₂ + Nb₂O₅ + ZrO₂ + Bi₂O₃ + WO₃ | mol % | 57.01 | 56.98 | 64.99 | 64.51 | 64.71 | 64.97 | 64.55 | 65.27 |
| SiO₂ + B₂O₃ | mol % | 27.99 | 27.98 | 34.97 | 30.40 | 30.21 | 29.95 | 35.36 | 34.65 |
| SiO₂ + B₂O₃ + Alk₂O + MgO + CaO + SrO + BaO + ZnO | mol % | 42.98 | 43.00 | 34.99 | 35.48 | 35.28 | 35.02 | 35.43 | 34.72 |

Measured properties

| | | | | | | | | | |
|---|---|---|---|---|---|---|---|---|---|
| $n_d$ | | | 1.989 | | | | | 2.014 | 2.010 |
| $d_{RT}$ | g/cm³ | | 4.253 | | | | | | |
| $(n_d - 1)/d_{RT}$ | | | 0.23254 | | | | | | |
| $T_i$ | | 0.29830 | 0.29827 | 0.35386 | 0.41163 | 0.38524 | 0.35384 | 0.40800 | 0.43319 |
| Devit Test 3 | | OK | OK | OK | OK | OK | | | |
| $n_d - (1 + 0.19 * d_{RT})$ | | | 0.1809 | | | | | | |
| $n_d - (2.055 - 0.36 * T_i)$ | | | 0.0414 | | | | | 0.1059 | 0.1109 |
| $(n_d - 1)/d_{RT} - (0.262 - 0.115 * T_i)$ | | | 0.0048 | | | | | | |

Predicted properties

| | | | | | | | | | |
|---|---|---|---|---|---|---|---|---|---|
| $P_n$ [for $n_d$] | | 1.957 | 1.950 | 1.976 | 1.997 | 1.987 | 1.975 | 1.996 | 1.993 |
| $P_d$ [for $d_{RT}$] | g/cm³ | 4.107 | 4.172 | 4.367 | 4.678 | 4.535 | 4.366 | 4.661 | 4.749 |
| $P_{ref}$ [for $(n_d - 1)/d_{RT}$] | | 0.2373 | 0.2317 | 0.2295 | 0.2169 | 0.2225 | 0.2292 | 0.2179 | 0.213 |
| $P_n - (1 + 0.19 * P_d)$ | | 0.1771 | 0.1569 | 0.1458 | 0.1080 | 0.1252 | 0.1458 | 0.1104 | 0.0911 |
| $P_n - (2.055 - 0.36 * T_i)$ | | 0 | 0.0414 | 0 | 0 | 0 | 0 | 0.1059 | 0.1109 |
| $P_{ref} - (0.262 - 0.115 * T_i)$ | | 0.0096 | 0.0040 | 0.0082 | 0.0022 | 0.0048 | 0.0079 | 0.0028 | 7.700E−04 |

| | | Exemplary Glass | | | | | | | |
|---|---|---|---|---|---|---|---|---|---|
| | | 25 | 26 | 27 | 28 | 29 | 30 | 31 | 32 |

Composition - mol %

| | | | | | | | | | |
|---|---|---|---|---|---|---|---|---|---|
| SiO₂ | mol % | 17.47 | 9.79 | 10.76 | 10.99 | 9.77 | 11.82 | 13.50 | 15.29 |
| B₂O₃ | mol % | 16.94 | 17.97 | 17.98 | 16.94 | 17.98 | 17.71 | 17.49 | 17.24 |
| CaO | mol % | 0.0469 | 14.99 | 9.99 | 9.99 | 14.99 | 11.23 | 8.13 | 4.81 |
| Na₂O | mol % | 0.0212 | 0.0189 | 0.0196 | 0.0194 | 0 | 0 | 0 | 0.02 |
| TiO₂ | mol % | 35.90 | 32.52 | 32.45 | 33.64 | 32.53 | 32.01 | 31.58 | 31.12 |

TABLE 7-continued

| Exemplary Glass Compositions | | | | | | | | | |
|---|---|---|---|---|---|---|---|---|---|
| $ZrO_2$ | mol % | 6.98 | 6.35 | 6.33 | 6.99 | 6.36 | 6.21 | 6.09 | 5.95 |
| $Nb_2O_5$ | mol % | 2.98 | 4.85 | 4.87 | 2.96 | 4.85 | 4.77 | 4.71 | 4.64 |
| $La_2O_3$ | mol % | 19.53 | 13.41 | 13.49 | 14.35 | 13.42 | 16.14 | 18.38 | 20.78 |
| BaO | mol % | 0 | 0 | 3.99 | 3.99 | 0 | 0 | 0 | 0 |
| $CeO_2$ | mol % | 0.11 | 0.0818 | 0.0777 | 0.084 | 0.08 | 0.09 | 0.11 | 0.13 |
| $Fe_2O_3$ | mol % | 0 | 0.0074 | 0.0076 | 0.0075 | 0.01 | 0.01 | 0.01 | 0.01 |
| SrO | mol % | 0 | 0 | 0.0352 | 0.0349 | 0 | 0 | 0 | 0 |
| $Al_2O_3$ | mol % | 0.0129 | 0 | 0 | 0 | 0 | 0 | 0 | 0.01 |
| $Ta_2O_5$ | mol % | 0.003 | 0.0053 | 0.0055 | 0.0027 | 0.01 | 0.01 | 0 | 0 |
| Composition constraints | | | | | | | | | |
| $SiO_2/(SiO_2 + B_2O_3)$ | mol % | 0.5076 | 0.3526 | 0.3744 | 0.3934 | 0.3521 | 0.4003 | 0.4356 | 0.4701 |
| $RE_mO_n + TiO_2 + Nb_2O_5 + ZrO_2 + Bi_2O_3 + WO_3$ | mol % | 65.48 | 57.20 | 57.20 | 58.01 | 57.22 | 59.20 | 60.85 | 62.60 |
| $SiO_2 + B_2O_3$ | mol % | 34.43 | 27.77 | 28.75 | 27.94 | 27.76 | 29.54 | 31.00 | 32.55 |
| $SiO_2 + B_2O_3 + Alk_2O + MgO + CaO + SrO + BaO + ZnO$ | mol % | 34.50 | 42.78 | 42.79 | 41.98 | 42.76 | 40.78 | 39.14 | 37.38 |
| Measured properties | | | | | | | | | |
| $n_d$ | | 2.015 | 2.0086 | 2.0012 | 2.002 | | | | |
| $T_i$ | | 0.40547 | 0.34594 | 0.34683 | 0.36825 | 0.34594 | 0.37794 | 0.40261 | 0.42768 |
| Devit Test 2 | | | | | | OK | OK | OK | OK |
| Devit Test 3 | | | | | | OK | OK | OK | OK |
| $n_d - (2.055 - 0.36 * T_i)$ | | 0.106 | 0.0781 | 0.071 | 0.0796 | | | | |
| Predicted properties | | | | | | | | | |
| $P_n$ [for $n_d$] | | 1.983 | 1.974 | 1.973 | 1.970 | 1.974 | 1.981 | 1.987 | 1.994 |
| $P_d$ [for $d_{RT}$] | g/cm³ | 4.598 | 4.333 | 4.420 | 4.479 | 4.334 | 4.476 | 4.593 | 4.718 |
| $P_{ref}$ [for $(n_d - 1)/d_{RT}$] | | 0.2189 | 0.2287 | 0.2243 | 0.2206 | 0.2287 | 0.2233 | 0.2188 | 0.2139 |
| $P_n - (1 + 0.19 * P_d)$ | | 0.1093 | 0.1502 | 0.1334 | 0.1185 | 0.1502 | 0.1306 | 0.1145 | 0.0973 |
| $P_n - (2.055 - 0.36 * T_i)$ | | 0.1060 | 0.0781 | 0.0710 | 0.0796 | 0 | 0 | 0 | 0 |
| $P_{ref} - (0.262 - 0.115 * T_i)$ | | 0.0035 | 0.0065 | 0.0021 | 9.800E-04 | 0.0065 | 0.0047 | 0.0031 | 0.0011 |

| | | Exemplary Glass | | | | | | | |
|---|---|---|---|---|---|---|---|---|---|
| | | 33 | 34 | 35 | 36 | 37 | 38 | 39 | 40 |
| Composition - mol % | | | | | | | | | |
| $SiO_2$ | mol % | 14.98 | 9.77 | 9.88 | 16.96 | 12.98 | 9.54 | 9.73 | 10.54 |
| $B_2O_3$ | mol % | 19.96 | 17.98 | 17.70 | 17.97 | 17.11 | 15.78 | 14.96 | 15.76 |
| CaO | mol % | 0.02 | 14.99 | 11.00 | 0.05 | 0.05 | 14.97 | 14.98 | 9.97 |
| $Na_2O$ | mol % | 0 | 0 | 0 | 0.02 | 0.02 | 0.0238 | 0.0234 | 0.0244 |
| $TiO_2$ | mol % | 34.96 | 32.53 | 32.54 | 32.93 | 37.76 | 23.78 | 25.19 | 23.80 |
| $ZrO_2$ | mol % | 5.99 | 6.36 | 6.35 | 6.49 | 6.49 | 5.63 | 6.24 | 5.64 |
| $Nb_2O_5$ | mol % | 3.99 | 4.85 | 4.85 | 3.49 | 3.49 | 3.61 | 2.00 | 3.58 |
| $La_2O_3$ | mol % | 19.97 | 13.42 | 13.57 | 21.95 | 21.97 | 26.50 | 26.70 | 26.49 |
| BaO | mol % | 0 | 0 | 3.98 | 0 | 0 | 0 | 0 | 3.99 |
| $CeO_2$ | mol % | 0.12 | 0.08 | 0.08 | 0.13 | 0.13 | 0.15 | 0.16 | 0.16 |
| $Fe_2O_3$ | mol % | 0 | 0.01 | 0.01 | 0 | 0 | 0.0092 | 0.0091 | 0.0095 |
| SrO | mol % | 0 | 0 | 0.04 | 0 | 0 | 0 | 0 | 0.0292 |
| $Al_2O_3$ | mol % | 0.01 | 0 | 0 | 0.01 | 0 | 0 | 0 | 0 |
| $Ta_2O_5$ | mol % | 0 | 0.01 | 0.01 | 0 | 0 | 0 | 0 | 0 |
| Composition constraints | | | | | | | | | |
| $SiO_2/(SiO_2 + B_2O_3)$ | mol % | 0.4288 | 0.3521 | 0.3581 | 0.4856 | 0.4314 | 0.3766 | 0.3941 | 0.4007 |
| $RE_mO_n + TiO_2 + Nb_2O_5 + ZrO_2 + Bi_2O_3 + WO_3$ | mol % | 65.01 | 57.22 | 57.36 | 64.97 | 69.82 | 59.65 | 60.26 | 59.64 |
| $SiO_2 + B_2O_3$ | mol % | 34.96 | 27.76 | 27.59 | 34.95 | 30.11 | 25.34 | 24.71 | 26.32 |
| $SiO_2 + B_2O_3 + Alk_2O + MgO + CaO + SrO + BaO + ZnO$ | mol % | 34.98 | 42.76 | 42.62 | 35.02 | 30.18 | 40.34 | 39.73 | 40.35 |
| Measured properties | | | | | | | | | |
| $T_i$ | | 0.39991 | 0.34594 | 0.34756 | 0.43845 | 0.40818 | 0.53974 | 0.54782 | 0.53995 |
| Devit Test 2 | | OK | OK | OK | OK | | | | |
| Devit Test 3 | | OK | OK | OK | OK | OK | | | |

TABLE 7-continued

Exemplary Glass Compositions

Predicted properties

|  |  |  |  |  |  |  |  |  |
|---|---|---|---|---|---|---|---|---|
| $P_n$ [for $n_d$] |  | 1.986 | 1.974 | 1.978 | 1.989 | 2.022 | 2.019 | 2.014 | 2.018 |
| $P_d$ [for $d_{RT}$] | g/cm³ | 4.608 | 4.334 | 4.444 | 4.745 | 4.811 | 5.203 | 5.218 | 5.284 |
| $P_{ref}$ [for $(n_d - 1)/d_{RT}$] |  | 0.2192 | 0.2287 | 0.2241 | 0.2122 | 0.2175 | 0.1928 | 0.1912 | 0.1885 |
| $P_n - (1 + 0.19 * P_d)$ |  | 0.1106 | 0.1502 | 0.1336 | 0.0871 | 0.1076 | 0.0304 | 0.0225 | 0.0140 |
| $P_{ref} - (0.262 - 0.115 * T_i)$ |  | 0.0032 | 0.0065 | 0.0021 | 6.100E−04 | 0.0024 | −0.0071 | −0.0078 | −0.0114 |

Exemplary Glass

|  |  | 41 | 42 | 43 | 44 | 45 | 46 | 47 | 48 |
|---|---|---|---|---|---|---|---|---|---|

Composition - mol %

| | | | | | | | | | |
|---|---|---|---|---|---|---|---|---|---|
| SiO₂ | mol % | 10.73 | 9.53 | 9.74 | 18.69 | 13.69 | 9.61 | 9.80 | 9.61 |
| B₂O₃ | mol % | 14.95 | 15.77 | 14.97 | 14.98 | 14.97 | 25.96 | 25.97 | 25.97 |
| CaO | mol % | 9.99 | 6.00 | 5.99 | 0.0546 | 0.0552 | 24.98 | 24.96 | 24.98 |
| Na₂O | mol % | 0.024 | 4.99 | 4.99 | 0.0247 | 0.0749 | 0 | 0 | 0 |
| K₂O | mol % | 0 | 0 | 0 | 0 | 4.99 | 0 | 0 | 0 |
| TiO₂ | mol % | 25.21 | 23.80 | 25.21 | 28.65 | 28.64 | 8.85 | 7.00 | 8.83 |
| ZrO₂ | mol % | 6.25 | 5.64 | 6.24 | 6.22 | 6.21 | 6.99 | 6.99 | 6.99 |
| Nb₂O₅ | mol % | 1.97 | 3.60 | 2.04 | 2.04 | 2.04 | 7.99 | 9.34 | 7.99 |
| La₂O₃ | mol % | 26.69 | 26.50 | 26.71 | 29.15 | 29.15 | 15.51 | 15.83 | 15.51 |
| BaO | mol % | 3.99 | 3.99 | 3.99 | 0 | 0 | 0 | 0 | 0 |
| CeO₂ | mol % | 0.16 | 0.16 | 0.16 | 0.18 | 0.17 | 0.09 | 0.10 | 0.09 |
| Fe₂O₃ | mol % | 0.0093 | 0 | 0 | 0 | 0 | 0.01 | 0.01 | 0.01 |
| SrO | mol % | 0.0288 | 0.0292 | 0.0288 | 0 | 0 | 0 | 0 | 0 |
| Al₂O₃ | mol % | 0 | 0 | 0 | 0.015 | 0 | 0 | 0 | 0 |
| Ta₂O₅ | mol % | 0 | 0 | 0 | 0 | 0.0035 | 0.01 | 0.01 | 0.01 |

Composition constraints

| | | | | | | | | | |
|---|---|---|---|---|---|---|---|---|---|
| SiO₂/(SiO₂ + B₂O₃) | mol % | 0.4178 | 0.3766 | 0.3942 | 0.5550 | 0.4777 | 0.2701 | 0.2739 | 0.2701 |
| RE$_m$O$_n$ + TiO₂ + Nb₂O₅ + ZrO₂ + Bi₂O₃ + WO₃ | mol % | 60.24 | 59.67 | 60.27 | 66.20 | 66.18 | 39.40 | 39.22 | 39.39 |
| SiO₂ + B₂O₃ | mol % | 25.71 | 25.32 | 24.72 | 33.70 | 28.69 | 35.59 | 35.79 | 35.59 |
| SiO₂ + B₂O₃ + Alk₂O + MgO + CaO + SrO + BaO + ZnO | mol % | 39.75 | 40.33 | 39.73 | 33.78 | 33.82 | 60.58 | 60.76 | 60.59 |

Measured properties

| | | | | | | | | | |
|---|---|---|---|---|---|---|---|---|---|
| $T_i$ |  | 0.54787 | 0.53986 | 0.54787 | 0.53546 | 0.53552 | 0.57197 | 0.58286 | 0.57219 |
| Devit Test 2 |  |  |  |  |  |  | OK |  | OK |
| Devit Test 3 |  |  |  |  |  |  | OK | OK | OK |

Predicted properties

| | | | | | | | | | |
|---|---|---|---|---|---|---|---|---|---|
| $P_n$ [for $n_d$] |  | 2.013 | 2.011 | 2.006 | 2.009 | 2.009 | 1.908 | 1.916 | 1.908 |
| $P_d$ [for $d_{RT}$] | g/cm³ | 5.299 | 5.268 | 5.283 | 5.221 | 5.219 | 4.428 | 4.462 | 4.428 |
| $P_{ref}$ [for $(n_d - 1)/d_{RT}$] |  | 0.1869 | 0.1872 | 0.1856 | 0.1915 | 0.1912 | 0.2041 | 0.2037 | 0.2041 |
| $P_n - (1 + 0.19 * P_d)$ |  | 0.0061 | 0.0103 | 0.0023 | 0.0175 | 0.0174 | 0.0667 | 0.0679 | 0.0666 |
| $P_{ref} - (0.262 - 0.115 * T_i)$ |  | −0.0121 | −0.0127 | −0.0134 | −0.0090 | −0.0092 | 0.0078 | 0.0087 | 0.0079 |

Exemplary Glass

|  |  | 49 | 50 | 51 | 52 | 53 | 54 | 55 | 56 |
|---|---|---|---|---|---|---|---|---|---|

Composition - mol %

| | | | | | | | | | |
|---|---|---|---|---|---|---|---|---|---|
| SiO₂ | mol % | 9.61 | 9.61 | 27.98 | 17.55 | 18.18 | 16.72 | 15.76 | 5.53 |
| B₂O₃ | mol % | 25.97 | 25.97 | 9.99 | 21.00 | 20.84 | 19.43 | 19.99 | 29.98 |
| CaO | mol % | 24.98 | 24.98 | 6.01 | 5.99 | 6.00 | 6.01 | 6.00 | 5.99 |
| Na₂O | mol % | 0 | 0 | 1.99 | 3.00 | 3.00 | 2.99 | 2.99 | 3.00 |
| K₂O | mol % | 0 | 0 | 2.00 | 2.00 | 2.00 | 2.00 | 1.99 | 2.00 |
| TiO₂ | mol % | 8.83 | 8.83 | 9.99 | 8.98 | 6.99 | 6.99 | 11.92 | 11.54 |
| ZrO₂ | mol % | 6.99 | 6.99 | 8.00 | 10.07 | 9.57 | 3.09 | 8.41 | 8.49 |
| Nb₂O₅ | mol % | 7.99 | 7.99 | 9.99 | 9.47 | 10.66 | 12.99 | 7.11 | 7.09 |
| La₂O₃ | mol % | 15.51 | 15.51 | 9.99 | 9.86 | 10.68 | 10.87 | 9.72 | 10.02 |
| BaO | mol % | 0 | 0 | 5.99 | 3.99 | 3.99 | 4.00 | 4.00 | 4.00 |
| WO₃ | mol % | 0 | 0 | 0 | 0 | 0 | 6.83 | 4.04 | 4.30 |
| CeO₂ | mol % | 0.09 | 0.09 | 0.06 | 0.06 | 0.07 | 0.06 | 0.06 | 0.06 |
| Fe₂O₃ | mol % | 0.01 | 0.01 | 0.01 | 0.01 | 0.01 | 0.01 | 0.01 | 0.01 |
| SrO | mol % | 0 | 0 | 6.00 | 4.00 | 3.99 | 3.99 | 4.00 | 4.00 |
| Al₂O₃ | mol % | 0 | 0 | 0.01 | 0.01 | 0.01 | 0.01 | 0.01 | 0 |
| Ta₂O₅ | mol % | 0.01 | 0.01 | 0 | 0 | 0 | 0 | 0 | 0 |
| Li₂O | mol % | 0 | 0 | 1.98 | 4.00 | 4.01 | 4.00 | 4.00 | 3.99 |

TABLE 7-continued

Exemplary Glass Compositions

Composition constraints

| | | | | | | | | | |
|---|---|---|---|---|---|---|---|---|---|
| $SiO_2/(SiO_2 + B_2O_3)$ | mol % | 0.2701 | 0.2701 | 0.7369 | 0.4552 | 0.4659 | 0.4625 | 0.4408 | 0.1557 |
| $RE_mO_n + TiO_2 + Nb_2O_5 + ZrO_2 + Bi_2O_3 + WO_3$ | mol % | 39.39 | 39.39 | 38.02 | 38.43 | 37.95 | 40.82 | 41.24 | 41.48 |
| $SiO_2 + B_2O_3$ | mol % | 35.59 | 35.59 | 37.98 | 38.56 | 39.03 | 36.17 | 35.76 | 35.52 |
| $SiO_2 + B_2O_3 + Alk_2O + MgO + CaO + SrO + BaO + ZnO$ | mol % | 60.59 | 60.59 | 61.96 | 61.55 | 62.03 | 59.16 | 58.74 | 58.51 |

Measured properties

| | | | | | | | | | |
|---|---|---|---|---|---|---|---|---|---|
| $d_{RT}$ | g/cm³ | | | | 4.184 | 4.180 | 4.426 | 4.331 | 4.224 |
| $T_i$ | | 0.57219 | 0.57219 | 0.47376 | 0.51922 | 0.53432 | 0.41145 | 0.48787 | 0.49827 |
| Devit Test 2 | | OK | OK | | | | | | |
| Devit Test 3 | | OK | OK | OK | OK | OK | OK | OK | OK |

Predicted properties

| | | | | | | | | | |
|---|---|---|---|---|---|---|---|---|---|
| $P_n$ [for $n_d$] | | 1.908 | 1.908 | 1.890 | 1.873 | 1.880 | 1.925 | 1.883 | 1.880 |
| $P_d$ [for $d_{RT}$] | g/cm³ | 4.428 | 4.428 | 4.211 | 4.125 | 4.178 | 4.483 | 4.299 | 4.313 |
| $P_{ref}$ [for $(n_d - 1)/d_{RT}$] | | 0.2041 | 0.2041 | 0.2096 | 0.2111 | 0.2094 | 0.2079 | 0.2075 | 0.2077 |
| $P_n - (1 + 0.19 * P_d)$ | | 0.0666 | 0.0666 | 0.0900 | 0.0897 | 0.0862 | 0.0734 | 0.0662 | 0.0607 |
| $P_{ref} - (0.262 - 0.115 * T_i)$ | | 0.0079 | 0.0079 | 0.0021 | 0.0089 | 0.0089 | −0.0068 | 0.0016 | 0.0030 |

Exemplary Glass

| | | 57 | 58 | 59 | 60 | 61 | 62 | 63 | 64 |
|---|---|---|---|---|---|---|---|---|---|

Composition - mol %

| | | | | | | | | | |
|---|---|---|---|---|---|---|---|---|---|
| $SiO_2$ | mol % | 10.47 | 11.45 | 10.71 | 10.04 | 10.89 | 10.31 | 11.00 | 10.42 |
| $B_2O_3$ | mol % | 25.98 | 25.97 | 25.98 | 25.98 | 25.98 | 25.98 | 25.99 | 25.98 |
| CaO | mol % | 24.98 | 24.98 | 24.97 | 24.97 | 24.98 | 24.97 | 24.97 | 24.97 |
| $TiO_2$ | mol % | 11.42 | 10.28 | 10.03 | 10.16 | 8.78 | 8.76 | 11.31 | 11.27 |
| $ZrO_2$ | mol % | 6.99 | 6.99 | 6.99 | 6.99 | 6.99 | 7.00 | 8.67 | 7.00 |
| $Nb_2O_5$ | mol % | 7.99 | 10.25 | 9.18 | 7.99 | 10.16 | 9.21 | 7.99 | 7.99 |
| $La_2O_3$ | mol % | 12.08 | 10.00 | 12.05 | 13.76 | 12.13 | 13.68 | 9.99 | 10.00 |
| $WO_3$ | mol % | 0 | 0 | 0 | 0 | 0 | 0 | 0 | 2.30 |
| $CeO_2$ | mol % | 0.07 | 0.06 | 0.07 | 0.08 | 0.07 | 0.08 | 0.06 | 0.06 |
| $Fe_2O_3$ | mol % | 0.01 | 0.01 | 0.01 | 0.01 | 0.01 | 0.01 | 0.01 | 0.01 |
| $Ta_2O_5$ | mol % | 0.01 | 0.01 | 0.01 | 0.01 | 0.01 | 0.01 | 0.01 | 0.01 |

Composition constraints

| | | | | | | | | | |
|---|---|---|---|---|---|---|---|---|---|
| $SiO_2/(SiO_2 + B_2O_3)$ | mol % | 0.2873 | 0.3059 | 0.2919 | 0.2788 | 0.2954 | 0.2841 | 0.2974 | 0.2862 |
| $RE_mO_n + TiO_2 + Nb_2O_5 + ZrO_2 + Bi_2O_3 + WO_3$ | mol % | 38.53 | 37.56 | 38.30 | 38.96 | 38.11 | 38.70 | 38.00 | 38.59 |
| $SiO_2 + B_2O_3$ | mol % | 36.46 | 37.44 | 36.70 | 36.04 | 36.88 | 36.30 | 37.00 | 36.41 |
| $SiO_2 + B_2O_3 + Alk_2O + MgO + CaO + SrO + BaO + ZnO$ | mol % | 61.45 | 62.42 | 61.68 | 61.02 | 61.87 | 61.28 | 61.98 | 61.39 |

Measured properties

| | | | | | | | | | |
|---|---|---|---|---|---|---|---|---|---|
| $T_i$ | | 0.49567 | 0.45283 | 0.49782 | 0.53336 | 0.50234 | 0.53514 | 0.49157 | 0.46869 |
| Devit Test 2 | | OK | | | OK | | | OK | OK |
| Devit Test 3 | | OK | OK | OK | OK | OK | OK | OK | OK |

Predicted properties

| | | | | | | | | | |
|---|---|---|---|---|---|---|---|---|---|
| $P_n$ [for $n_d$] | | 1.893 | 1.895 | 1.899 | 1.900 | 1.903 | 1.906 | 1.883 | 1.890 |
| $P_d$ [for $d_{RT}$] | g/cm³ | 4.192 | 4.068 | 4.200 | 4.307 | 4.214 | 4.313 | 4.077 | 4.170 |
| $P_{ref}$ [for $(n_d - 1)/d_{RT}$] | | 0.2132 | 0.2195 | 0.2137 | 0.2087 | 0.2138 | 0.2093 | 0.2168 | 0.215 |
| $P_n - (1 + 0.19 * P_d)$ | | 0.0967 | 0.1216 | 0.1005 | 0.0820 | 0.1026 | 0.0863 | 0.1080 | 0.0976 |
| $P_{ref} - (0.262 - 0.115 * T_i)$ | | 0.0082 | 0.0096 | 0.0089 | 0.0081 | 0.0096 | 0.0089 | 0.0113 | 0.0069 |

Exemplary Glass

| | | 65 | 66 | 67 | 68 | 69 | 70 | 71 | 72 |
|---|---|---|---|---|---|---|---|---|---|

Composition - mol %

| | | | | | | | | | |
|---|---|---|---|---|---|---|---|---|---|
| $SiO_2$ | mol % | 10.46 | 9.99 | 10.04 | 9.56 | 8.99 | 7.95 | 4.74 | 5.10 |
| $B_2O_3$ | mol % | 25.98 | 25.98 | 25.98 | 25.98 | 25.97 | 25.98 | 34.48 | 36.69 |
| CaO | mol % | 24.97 | 24.97 | 24.98 | 24.98 | 24.98 | 30.04 | 9.78 | 5.80 |
| $Na_2O$ | mol % | 0 | 0 | 0 | 0 | 0 | 0 | 0.02 | 0.02 |
| $TiO_2$ | mol % | 9.81 | 9.97 | 8.59 | 8.69 | 7.00 | 10.97 | 6.98 | 6.99 |
| $ZrO_2$ | mol % | 8.56 | 7.00 | 8.55 | 6.99 | 7.00 | 6.99 | 7.78 | 7.18 |

TABLE 7-continued

| Exemplary Glass Compositions | | | | | | | | | |
|---|---|---|---|---|---|---|---|---|---|
| Nb$_2$O$_5$ | mol % | 7.99 | 7.99 | 8.00 | 7.99 | 8.00 | 7.99 | 7.18 | 8.73 |
| La$_2$O$_3$ | mol % | 9.99 | 9.99 | 10.00 | 9.99 | 9.99 | 9.99 | 21.95 | 21.95 |
| BaO | mol % | 0 | 0 | 0 | 0 | 0 | 0 | 6.90 | 7.33 |
| WO$_3$ | mol % | 2.16 | 4.02 | 3.79 | 5.74 | 7.99 | 0 | 0 | 0 |
| CeO$_2$ | mol % | 0.06 | 0.06 | 0.06 | 0.06 | 0.06 | 0.06 | 0.13 | 0.13 |
| Fe$_2$O$_3$ | mol % | 0.01 | 0.01 | 0.01 | 0.01 | 0.01 | 0.01 | 0 | 0 |
| SrO | mol % | 0 | 0 | 0 | 0 | 0 | 0 | 0.06 | 0.06 |
| Ta$_2$O$_5$ | mol % | 0.01 | 0.01 | 0.01 | 0.01 | 0.01 | 0.01 | 0.01 | 0.01 |
| Composition constraints | | | | | | | | | |
| SiO$_2$/(SiO$_2$ + B$_2$O$_3$) | mol % | 0.2870 | 0.2778 | 0.2787 | 0.2690 | 0.2571 | 0.2343 | 0.1208 | 0.1220 |
| RE$_m$O$_n$ + TiO$_2$ + Nb$_2$O$_5$ + ZrO$_2$ + Bi$_2$O$_3$ + WO$_3$ | mol % | 38.55 | 39.02 | 38.97 | 39.44 | 40.01 | 35.98 | 43.98 | 44.95 |
| SiO$_2$ + B$_2$O$_3$ | mol % | 36.45 | 35.98 | 36.03 | 35.55 | 34.98 | 33.95 | 39.24 | 41.82 |
| SiO$_2$ + B$_2$O$_3$ + Alk$_2$O + MgO + CaO + SrO + BaO + ZnO | mol % | 61.43 | 60.96 | 61.01 | 60.54 | 59.97 | 64.00 | 56.01 | 55.04 |
| Measured properties | | | | | | | | | |
| T$_i$ | | 0.51026 | 0.48612 | 0.52793 | 0.50451 | 0.53119 | 0.47254 | 0.67748 | 0.64957 |
| Devit Test 2 | | | | | | | OK | | |
| Devit Test 3 | | OK | OK | OK | OK | OK | OK | OK | OK |
| Predicted properties | | | | | | | | | |
| P$_n$ [for n$_d$] | | 1.888 | 1.894 | 1.893 | 1.899 | 1.904 | 1.888 | 1.922 | 1.926 |
| P$_d$ [for d$_{RT}$] | g/cm$^3$ | 4.190 | 4.261 | 4.277 | 4.352 | 4.472 | 4.101 | 4.935 | 4.904 |
| P$_{ref}$ [for (n$_d$ − 1)/d$_{RT}$] | | 0.2134 | 0.2122 | 0.2108 | 0.2094 | 0.2058 | 0.2162 | 0.1829 | 0.1856 |
| P$_n$ − (1 + 0.19 * P$_d$) | | 0.0922 | 0.0846 | 0.0799 | 0.0716 | 0.0547 | 0.1086 | −0.0152 | −0.0062 |
| P$_{ref}$ − (0.262 − 0.115 * T$_i$) | | 0.0101 | 0.0061 | 0.0095 | 0.0055 | 0.0049 | 0.0085 | −0.0012 | −0.0017 |

| | | Exemplary Glass | | | | | |
|---|---|---|---|---|---|---|---|
| | | 73 | 74 | 75 | 76 | 77 | 78 |
| Composition - mol % | | | | | | | |
| SiO$_2$ | mol % | 5.65 | 14.17 | 6.68 | 13.63 | 16.54 | 8.92 |
| B$_2$O$_3$ | mol % | 39.88 | 17.24 | 25.90 | 25.54 | 16.90 | 28.51 |
| CaO | mol % | 0.06 | 8.09 | 32.18 | 15.13 | 3.89 | 0.03 |
| Na$_2$O | mol % | 0.03 | 0 | 0 | 0 | 0 | 0 |
| TiO$_2$ | mol % | 6.97 | 28.93 | 10.11 | 12.88 | 28.01 | 16.97 |
| ZrO$_2$ | mol % | 6.34 | 6.09 | 7.00 | 7.23 | 5.93 | 7.12 |
| Nb$_2$O$_5$ | mol % | 10.97 | 7.04 | 7.99 | 7.29 | 7.25 | 7.19 |
| La$_2$O$_3$ | mol % | 21.93 | 18.30 | 9.99 | 9.08 | 21.33 | 21.67 |
| BaO | mol % | 7.97 | 0 | 0 | 6.04 | 0 | 0 |
| WO$_3$ | mol % | 0 | 0 | 0 | 0 | 0 | 3.43 |
| CeO$_2$ | mol % | 0.13 | 0.11 | 0.06 | 0.0525 | 0.12 | 0.13 |
| Fe$_2$O$_3$ | mol % | 0 | 0.01 | 0.01 | 0.0071 | 0 | 0 |
| SrO | mol % | 0.06 | 0 | 0 | 0.0436 | 0 | 0 |
| Al$_2$O$_3$ | mol % | 0 | 0.01 | 0 | 0.0222 | 0.01 | 0 |
| Ta$_2$O$_5$ | mol % | 0.01 | 0.01 | 0.01 | 0.0026 | 0.01 | 0.01 |
| Li$_2$O | mol % | 0 | 0 | 0 | 2.99 | 0 | 0 |
| MgO | mol % | 0 | 0 | 0 | 0.0561 | 0 | 0 |
| Bi$_2$O$_3$ | mol % | 0 | 0 | 0 | 0 | 0 | 6.01 |
| Composition constraints | | | | | | | |
| SiO$_2$/(SiO$_2$ + B$_2$O$_3$) | mol % | 0.1241 | 0.4511 | 0.2046 | 0.3480 | 0.4946 | 0.2383 |
| RE$_m$O$_n$ + TiO$_2$ + Nb$_2$O$_5$ + ZrO$_2$ + Bi$_2$O$_3$ + WO$_3$ | mol % | 46.31 | 60.45 | 35.13 | 36.52 | 62.62 | 62.50 |
| SiO$_2$ + B$_2$O$_3$ | mol % | 45.56 | 31.43 | 32.66 | 39.18 | 33.46 | 37.46 |
| SiO$_2$ + B$_2$O$_3$ + Alk$_2$O + MgO + CaO + SrO + BaO + ZnO | mol % | 53.68 | 39.52 | 64.85 | 63.45 | 37.36 | 37.49 |
| Measured properties | | | | | | | |
| d$_{RT}$ | g/cm$^3$ | | | | 4.165 | | |
| T$_i$ | | 0.61179 | 0.40410 | 0.48404 | 0.44718 | 0.43602 | 0.54385 |
| Devit Test 2 | | OK | | OK | | | OK |
| Devit Test 3 | | OK | OK | OK | | OK | OK |

TABLE 7-continued

Exemplary Glass Compositions

Predicted properties

| | | | | | | | |
|---|---|---|---|---|---|---|---|
| $P_n$ [for $n_d$] | | 1.930 | 1.998 | 1.889 | 1.866 | 2.008 | 2.032 |
| $P_d$ [for $d_{RT}$] | g/cm³ | 4.859 | 4.610 | 4.124 | 4.082 | 4.771 | 5.378 |
| $P_{ref}$ [for $(n_d - 1)/d_{RT}$] | | 0.1894 | 0.2198 | 0.2151 | 0.2124 | 0.2138 | 0.1844 |
| $P_n - (1 + 0.19 * P_d)$ | | 0.0066 | 0.1224 | 0.1058 | 0.0903 | 0.1015 | 0.0106 |
| $P_{ref} - (0.262 - 0.115 * T_i)$ | | −0.0022 | 0.0043 | 0.0088 | 0.0019 | 0.0020 | −0.0150 |

Table 8 below lists the glass compositions and properties for Comparative Glasses C1-C32.

TABLE 8

Compositions and Properties of Comparative Glasses

Comparative Examples

| | | C1 | C2 | C3 | C4 | C5 | C6 | C7 | C8 |
|---|---|---|---|---|---|---|---|---|---|
| Reference | | [3] | [13] | [11] | [3] | [3] | [2] | [9] | [15] |

Composition - mol %

| | | C1 | C2 | C3 | C4 | C5 | C6 | C7 | C8 |
|---|---|---|---|---|---|---|---|---|---|
| $La_2O_3$ | mol % | 30.57 | 16.25 | 23.32 | 28.69 | 15.26 | 15.90 | 27.87 | 24.32 |
| $Nb_2O_5$ | mol % | 8.38 | 0 | 4.60 | 7.52 | 1.85 | 0 | 9.85 | 4.61 |
| $B_2O_3$ | mol % | 29.40 | 10.49 | 25.00 | 26.78 | 23.13 | 24.81 | 12.54 | 31.35 |
| $ZrO_2$ | mol % | 8.89 | 0 | 7.67 | 0.18 | 12.20 | 4.67 | 8.50 | 4.85 |
| $SiO_2$ | mol % | 13.69 | 30.38 | 15.97 | 21.28 | 22.94 | 28.74 | 29.64 | 21.60 |
| $Y_2O_3$ | mol % | 2.94 | 1.62 | 1.13 | 2.81 | 2.08 | 0 | 0.77 | 0.62 |
| $Bi_2O_5$ | mol % | 0.86 | 0 | 0 | 0 | 0 | 0 | 0 | 0 |
| $TiO_2$ | mol % | 5.20 | 11.43 | 18.05 | 11.54 | 15.09 | 7.21 | 7.43 | 6.41 |
| O | mol % | 0.0816 | 0 | 0 | 1.21 | 1.05 | 0 | 0 | 0 |
| $Al_2O_3$ | mol % | 0 | 29.84 | 0 | 0 | 0 | 11.29 | 0 | 0 |
| $Gd_2O_3$ | mol % | 0 | 0 | 4.26 | 0 | 5.35 | 0 | 2.60 | 2.12 |
| $Ta_2O_5$ | mol % | 0 | 0 | 0 | 0 | 1.05 | 0 | 0.79 | 0 |
| $CaF_2$ | mol % | 0 | 0 | 0 | 0 | 0 | 7.38 | 0 | 0 |
| BaO | mol % | 0 | 0 | 0 | 0 | 0 | 0 | 0 | 3.40 |
| $WO_3$ | mol % | 0 | 0 | 0 | 0 | 0 | 0 | 0 | 0.69 |
| $Sb_2O_3$ | mol % | 0 | 0 | 0 | 0 | 0 | 0 | 0 | 0.0263 |

Measured properties

| | | C1 | C2 | C3 | C4 | C5 | C6 | C7 | C8 |
|---|---|---|---|---|---|---|---|---|---|
| $n_d$ | | 1.902 | | 1.9512 | 1.904 | 1.892 | | 1.960 | 1.8646 |
| $d_{RT}$ | g/cm³ | 4.850 | | 5.040 | 4.900 | 5.000 | | 5.150 | 4.790 |
| $(n_d - 1)/d_{RT}$ | | 0.18598 | | 0.18873 | 0.18449 | 0.17840 | | 0.18641 | 0.18050 |
| $T_i$ | | 0.74377 | 0.58712 | 0.60874 | 0.60204 | 0.65913 | 0.74058 | 0.69274 | 0.73963 |

Predicted properties

| | | C1 | C2 | C3 | C4 | C5 | C6 | C7 | C8 |
|---|---|---|---|---|---|---|---|---|---|
| $P_n$ [for $n_d$] | | 1.985 | 1.714 | 1.964 | 1.941 | 1.885 | 1.735 | 1.999 | 1.872 |
| $P_d$ [for $d_{RT}$] | g/cm³ | 5.431 | 3.796 | 5.145 | 5.028 | 4.734 | 3.954 | 5.394 | 4.934 |
| $P_{ref}$ [for $(n_d - 1)/d_{RT}$] | | 0.1703 | 0.1887 | 0.1865 | 0.1815 | 0.1894 | 0.188 | 0.177 | 0.1727 |

Comparative Examples

| | | C9 | C10 | C11 | C12 | C13 | C14 | C15 | C16 |
|---|---|---|---|---|---|---|---|---|---|
| Reference | | [15] | [15] | [15] | [1] | [8] | [14] | [14] | [14] |

Composition - mol %

| | | C9 | C10 | C11 | C12 | C13 | C14 | C15 | C16 |
|---|---|---|---|---|---|---|---|---|---|
| $La_2O_3$ | mol % | 23.88 | 25.33 | 24.05 | 10.44 | 26.50 | 21.71 | 24.52 | 21.79 |
| $Nb_2O_5$ | mol % | 3.76 | 4.53 | 2.73 | 4.58 | 0 | 6.06 | 4.74 | 5.87 |
| $B_2O_3$ | mol % | 30.05 | 31.36 | 32.78 | 13.63 | 20.75 | 21.94 | 27.10 | 21.91 |
| $ZrO_2$ | mol % | 5.89 | 8.05 | 7.07 | 5.64 | 7.72 | 7.00 | 7.13 | 7.00 |
| $SiO_2$ | mol % | 16.26 | 16.67 | 13.46 | 19.01 | 17.60 | 11.62 | 5.93 | 11.60 |
| $Y_2O_3$ | mol % | 0.26 | 0.27 | 0 | 0.78 | 0 | 0.37 | 1.54 | 0.36 |
| $TiO_2$ | mol % | 14.63 | 9.77 | 13.71 | 35.63 | 9.71 | 25.60 | 28.27 | 25.76 |
| $Al_2O_3$ | mol % | 0 | 0.46 | 0 | 0 | 0 | 0 | 0 | 0 |
| $Gd_2O_3$ | mol % | 2.52 | 1.71 | 2.66 | 0.60 | 0 | 3.10 | 0 | 3.09 |
| $Ta_2O_5$ | mol % | 0 | 0 | 1.23 | 0 | 7.18 | 0 | 0 | 0 |
| BaO | mol % | 2.05 | 1.13 | 1.37 | 7.97 | 0 | 0 | 0 | 0 |
| $WO_3$ | mol % | 0.68 | 0.69 | 0.92 | 0 | 0 | 0.44 | 0.72 | 0.44 |
| $Sb_2O_3$ | mol % | 0.0261 | 0.0266 | 0.0267 | 0.0205 | 0 | 0.0105 | 0.0416 | 0.0105 |
| SrO | mol % | 0 | 0 | 0 | 1.66 | 0 | 0 | 0 | 0 |
| ZnO | mol % | 0 | 0 | 0 | 0.84 | 0 | 0 | 0 | 0 |
| $GeO_2$ | mol % | 0 | 0 | 0 | 0 | 8.42 | 0 | 0 | 0 |
| $Yb_2O_3$ | mol % | 0 | 0 | 0 | 0 | 1.34 | 0 | 0 | 0 |

TABLE 8-continued

Compositions and Properties of Comparative Glasses

| | | | | | | | | |
|---|---|---|---|---|---|---|---|---|
| SnO$_2$ | mol % | 0 | 0 | 0 | 0 | 0 | 0.68 | 0 | 0.68 |
| Li$_2$O | mol % | 0 | 0 | 0 | 0 | 0 | 1.48 | 0 | 1.48 |

Measured properties

| | | | | | | | | |
|---|---|---|---|---|---|---|---|---|
| $n_d$ | | 1.9068 | 1.8974 | 1.9066 | 2.0125 | 1.9225 | 2.0018 | 1.9998 | 2.0011 |
| $d_{RT}$ | g/cm$^3$ | 4.830 | 4.810 | 4.920 | 4.680 | | | | |
| $(n_d - 1)/d_{RT}$ | | 0.18774 | 0.18657 | 0.18427 | 0.21635 | | | | |
| $T_i$ | | 0.63712 | 0.71047 | 0.67265 | 0.29308 | 0.77905 | 0.50113 | 0.48952 | 0.50208 |

Predicted properties

| | | | | | | | | |
|---|---|---|---|---|---|---|---|---|
| $P_n$ [for $n_d$] | | 1.915 | 1.907 | 1.905 | 1.956 | 1.907 | 2.009 | 2.012 | 2.008 |
| $P_d$ [for $d_{RT}$] | g/cm$^3$ | 4.986 | 5.009 | 5.005 | 4.310 | 5.217 | 5.053 | 5.022 | 5.056 |
| $P_{ref}$ [for $(n_d - 1)/d_{RT}$] | | 0.1822 | 0.178 | 0.1799 | 0.2267 | 0.1664 | 0.2025 | 0.2037 | 0.2022 |

Comparative Examples

| | | C17 | C18 | C19 | C20 | C21 | C22 | C23 | C24 |
|---|---|---|---|---|---|---|---|---|---|
| Reference | | [14] | [14] | [12] | [5] | [10] | [1] | [4] | [7] |

Composition - mol %

| | | | | | | | | | |
|---|---|---|---|---|---|---|---|---|---|
| La$_2$O$_3$ | mol % | 21.75 | 22.01 | 22.24 | 27.93 | 22.47 | 12.11 | 14.96 | 9.82 |
| Nb$_2$O$_5$ | mol % | 5.77 | 4.68 | 4.40 | 6.22 | 4.43 | 5.39 | 10.58 | 7.55 |
| B$_2$O$_3$ | mol % | 21.87 | 21.88 | 12.66 | 13.20 | 12.94 | 11.75 | 24.35 | 26.38 |
| ZrO$_2$ | mol % | 6.98 | 7.42 | 7.03 | 5.37 | 7.02 | 6.51 | 0 | 7.34 |
| SiO$_2$ | mol % | 11.58 | 12.30 | 15.27 | 22.94 | 15.29 | 18.47 | 15.52 | 13.40 |
| Y$_2$O$_3$ | mol % | 0.36 | 0.39 | 0.45 | 0.41 | 0.38 | 0 | 0 | 0 |
| TiO$_2$ | mol % | 25.98 | 28.05 | 34.12 | 14.27 | 34.38 | 30.88 | 17.68 | 11.88 |
| O | mol % | 0 | 0 | 0.72 | 0 | 0 | 0 | 0 | 0 |
| Gd$_2$O$_3$ | mol % | 3.09 | 3.28 | 3.10 | 2.03 | 3.11 | 0.61 | 0 | 0 |
| Ta$_2$O$_5$ | mol % | 0 | 0 | 0 | 4.58 | 0 | 0 | 0 | 0 |
| BaO | mol % | 0 | 0 | 0 | 0 | 0 | 8.84 | 14.28 | 0 |
| WO$_3$ | mol % | 0.44 | 0 | 0 | 0 | 0 | 0.68 | 0 | 0 |
| Sb$_2$O$_3$ | mol % | 0.0105 | 0 | 0 | 0 | 0 | 0 | 0 | 0 |
| ZnO | mol % | 0 | 0 | 0 | 0 | 0 | 1.97 | 0 | 0 |
| SnO$_2$ | mol % | 0.68 | 0 | 0 | 0 | 0 | 0 | 0 | 0 |
| Li$_2$O | mol % | 1.48 | 0 | 0 | 0 | 0 | 0 | 0 | 0 |
| PbO | mol % | 0 | 0 | 0 | 2.97 | 0 | 0 | 0 | 0 |
| As$_2$O$_3$ | mol % | 0 | 0 | 0 | 0.0929 | 0 | 0 | 0 | 0.0279 |
| CaO | mol % | 0 | 0 | 0 | 0 | 0 | 2.81 | 0 | 23.60 |
| K$_2$O | mol % | 0 | 0 | 0 | 0 | 0 | 0 | 1.50 | 0 |
| Na$_2$O | mol % | 0 | 0 | 0 | 0 | 0 | 0 | 1.14 | 0 |

Measured properties

| | | | | | | | | | |
|---|---|---|---|---|---|---|---|---|---|
| $n_d$ | | 2.0016 | 2.0022 | 2.048 | 1.992 | 2.048 | 2.0312 | 1.920 | 1.883 |
| $d_{RT}$ | g/cm$^3$ | | | 5.140 | 5.350 | 5.140 | 4.720 | | 4.070 |
| $(n_d - 1)/d_{RT}$ | | | | 0.20389 | 0.18542 | 0.20389 | 0.21847 | | 0.21695 |
| $T_i$ | | 0.50059 | 0.49975 | 0.45591 | 0.63289 | 0.45646 | 0.34643 | 0.34611 | 0.46898 |

Predicted properties

| | | | | | | | | | |
|---|---|---|---|---|---|---|---|---|---|
| $P_n$ [for $n_d$] | | 2.008 | 2.006 | 2.051 | 2.007 | 2.050 | 1.974 | 1.928 | 1.866 |
| $P_d$ [for $d_{RT}$] | g/cm$^3$ | 5.053 | 5.051 | 5.156 | 5.501 | 5.154 | 4.552 | 4.539 | 3.996 |
| $P_{ref}$ [for $(n_d - 1)/d_{RT}$] | | 0.2024 | 0.2024 | 0.2075 | 0.1749 | 0.2075 | 0.2174 | 0.2042 | 0.2171 |

Comparative Examples

| | | C25 | C26 | C27 | C28 | C29 | C30 | C31 | C32 |
|---|---|---|---|---|---|---|---|---|---|
| Reference | | [6] | [6] | [7] | [6] | [7] | [6] | [7] | [7] |

Composition - mol %

| | | | | | | | | | |
|---|---|---|---|---|---|---|---|---|---|
| La$_2$O$_3$ | mol % | 7.99 | 7.66 | 9.47 | 7.56 | 9.69 | 7.84 | 9.84 | 9.14 |
| Nb$_2$O$_5$ | mol % | 10.05 | 9.56 | 6.88 | 9.51 | 6.48 | 9.87 | 7.36 | 7.21 |
| B$_2$O$_3$ | mol % | 29.76 | 26.70 | 25.88 | 27.46 | 25.81 | 29.24 | 28.02 | 26.66 |
| ZrO$_2$ | mol % | 8.50 | 7.28 | 7.47 | 8.07 | 7.18 | 8.35 | 7.36 | 7.64 |
| SiO$_2$ | mol % | 11.69 | 10.07 | 13.15 | 10.97 | 13.11 | 11.48 | 13.43 | 13.15 |
| TiO$_2$ | mol % | 10.81 | 10.01 | 13.01 | 10.14 | 13.65 | 10.62 | 13.28 | 13.01 |
| BaO | mol % | 3.75 | 0 | 0 | 0 | 0 | 0 | 0 | 0 |
| SrO | mol % | 0 | 0 | 0 | 0 | 0 | 5.46 | 0 | 0 |
| Li$_2$O | mol % | 0 | 0 | 0 | 1.45 | 0 | 0 | 0 | 0 |
| As$_2$O$_3$ | mol % | 0 | 0 | 0.0274 | 0 | 0.0273 | 0 | 0.0279 | 0.0274 |
| CaO | mol % | 17.45 | 28.72 | 24.12 | 24.85 | 24.06 | 17.14 | 20.69 | 23.16 |

Measured properties

| | | | | | | | | | |
|---|---|---|---|---|---|---|---|---|---|
| $n_d$ | | 1.886 | 1.889 | 1.885 | 1.885 | 1.885 | 1.883 | 1.884 | 1.884 |
| $d_{RT}$ | g/cm$^3$ | 4.040 | 4.010 | 4.050 | 3.980 | 4.060 | 4.040 | 4.050 | 4.030 |
| $(n_d - 1)/d_{RT}$ | | 0.21931 | 0.22170 | 0.21852 | 0.22236 | 0.21798 | 0.21856 | 0.21827 | 0.21935 |
| $T_i$ | | 0.44150 | 0.43299 | 0.45987 | 0.44292 | 0.45606 | 0.44150 | 0.45441 | 0.45354 |

TABLE 8-continued

Compositions and Properties of Comparative Glasses

Predicted properties

| | | | | | | | | | |
|---|---|---|---|---|---|---|---|---|---|
| $P_n$ [for $n_d$] | | 1.873 | 1.876 | 1.865 | 1.870 | 1.864 | 1.869 | 1.863 | 1.863 |
| $P_d$ [for $d_{RT}$] | g/cm$^3$ | 3.980 | 3.929 | 3.979 | 3.896 | 3.986 | 3.902 | 3.961 | 3.950 |
| $P_{ref}$ [for $(n_d - 1)/d_{RT}$] | | 0.2199 | 0.2221 | 0.2178 | 0.2226 | 0.2174 | 0.2236 | 0.2187 | 0.2191 |

The reference key for each of the Comparative Glasses listed in Table 8 is as follows: [1] CN110510869 (CDGM GLASS CO., LTD); [2] FR1214486A (LEITZ GMBH ERNST); [3] U.S. Ser. No. 10/287,205B2 (CDGM GLASS CO LTD); [4] US2004220041 (HIKARI GLASS CO., LTD.); [5] U.S. Pat. No. 4,584,279A (SCHOTT GLAS-WERKE); [6] U.S. Pat. No. 5,288,669A (CORNING INC); [7] U.S. Pat. No. 6,121,176A (CORNING INC); [8] U.S. Pat. No. 7,490,485B2 (HOYA CORP); [9] U.S. Pat. No. 9,018,116B2 (SCHOTT AG); [10] U.S. Pat. No. 9,302,930B2 (HOYA CO LTD); [11] U.S. Pat. No. 9,394,194B2 (HOYA CO LTD); [12] U.S. Pat. No. 9,643,880B2 (HOYA CORP); [13] WO$_{2006106781}$ (NIPPON SHEET GLASS CO., LTD.); [14] WO2012099168A1 (OHARA KK); [15] WO2017110304A1.

Figure 6:
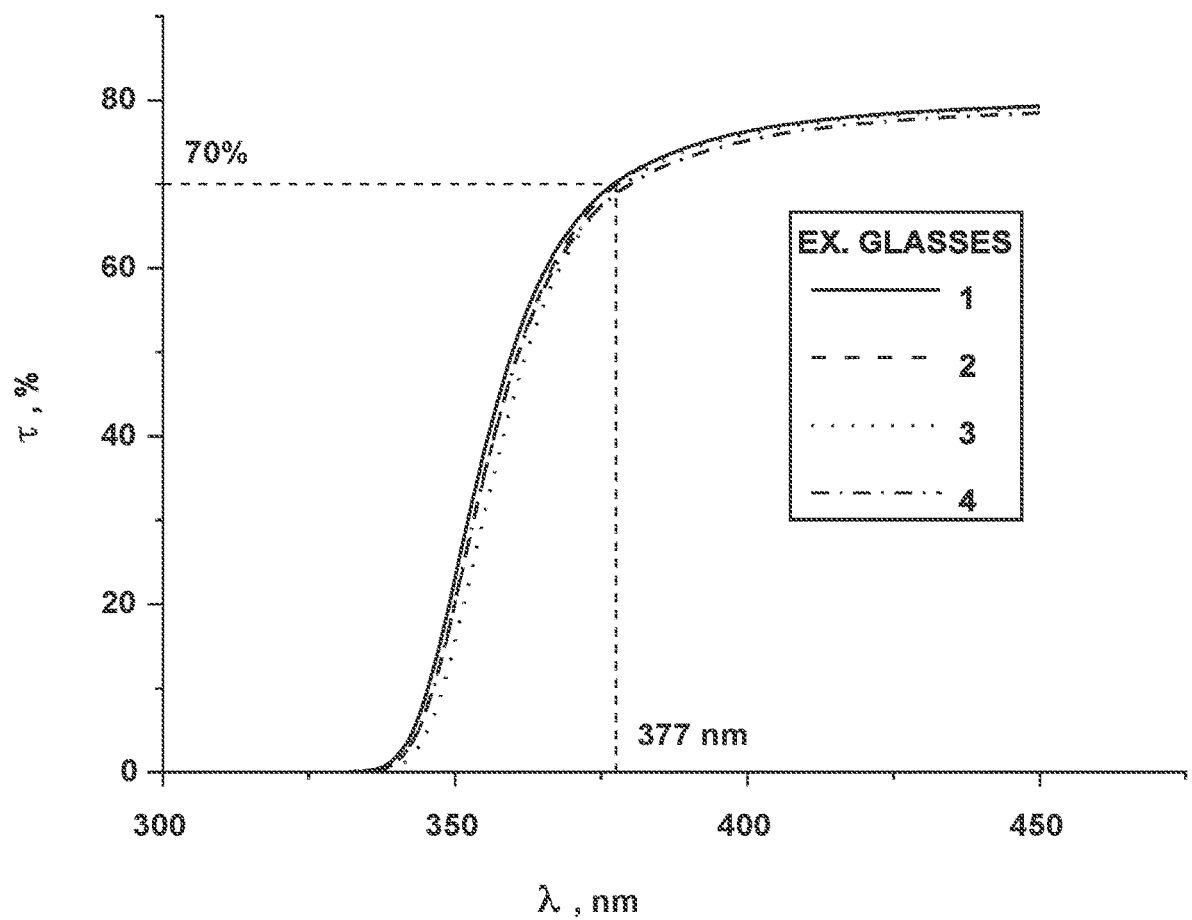
FIG. 6 is a plot illustrating the relationship between the total transmittance T and wavelength for some exemplary glasses according to an embodiment of the present disclosure.

FIG. 6 is a plot showing the total transmittance τ as a function of wavelength for several Exemplary Glasses, Examples 1-4. The transmittance was measured using glass samples having a thickness of 2 mm with a Cary 5000 Spectrometer using an integrating sphere at wavelengths of from 250 nm to 2500 nm, at a 1 nm resolution. As shown in FIG. 6, several of the Exemplary Glasses exhibit a $\lambda_{70\%}$ of less than 400 nm, and in some cases a $\lambda_{70\%}$ of less than 390 nm or less than 380 nm.

Figure 7:
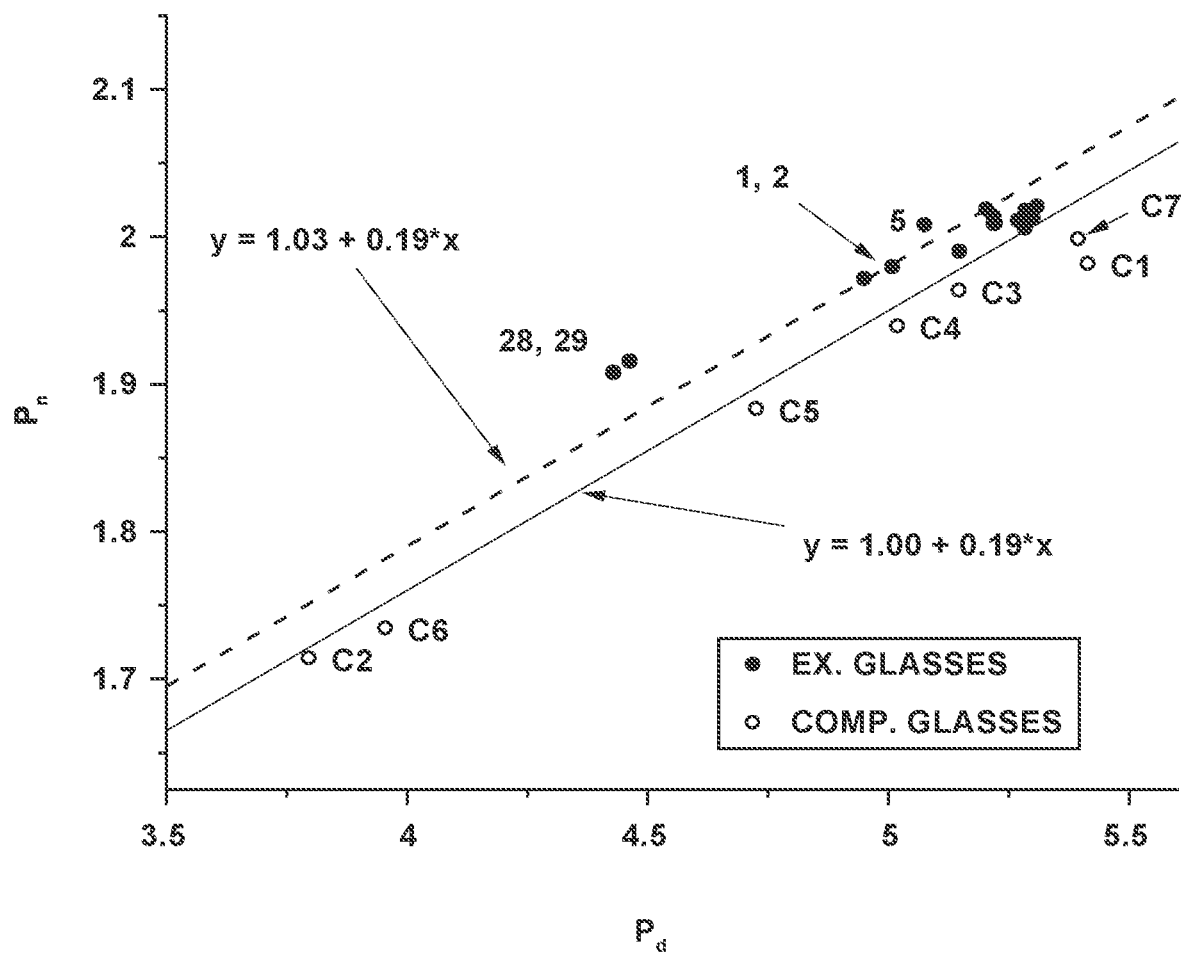
FIG. 7 is a plot illustrating the relationship between the density parameter $P_d$ calculated according to formula (VII) and the refractive index parameter $P_n$ calculated according to formula (VI) for some comparative glasses and some exemplary glasses according to an embodiment of the present disclosure.

FIG. 7 is a plot showing the relationship between the density parameter $P_d$ and the refractive index parameter $P_n$ for some of the Exemplary Glasses and some of the Comparative Glasses. The said Exemplary Glasses (filled circles) are the Examples 1 to 5 and 38 to 50 from Table 7. The said Comparative Glasses (open circles) are the Examples C1 to C7 from Table 8. The refractive index parameter $P_n$ predicts the refractive index at 587.56 nm and was determined according to formula (VI). The density parameter $P_d$ predicts the density at room temperature and was determined according to formula (VII). All of the Exemplary Glasses and Comparative Glasses shown in FIG. 7 have the features specified in Table 9 below. In Table 9, the entry "Not limited", if present, refers to a limitation that was not considered when selecting the compositions. In FIG. 7, some of the above-enumerated compositions may be labeled for better visibility.

TABLE 9

Limitations for Glass Compositions Shown in FIG. 7

| Quantity | Unit | Min | Max |
|---|---|---|---|
| La$_2$O$_3$ | mol % | 15 | 50 |
| B$_2$O$_3$ | mol % | 9 | 33 |
| TiO$_2$ | mol % | 0 | 40 |
| ZrO$_2$ | mol % | 0 | 13.5 |
| Nb$_2$O$_5$ | mol % | 0 | 12 |
| Y$_2$O$_3$ | mol % | 0 | 3 |
| Ta$_2$O$_5$ | mol % | 0 | 1.5 |

TABLE 9-continued

Limitations for Glass Compositions Shown in FIG. 7

| Quantity | Unit | Min | Max |
|---|---|---|---|
| ZnO | mol % | 0 | 0.8 |
| Li$_2$O | mol % | 0 | 0.5 |
| SiO$_2$/(SiO$_2$ + B$_2$O$_3$) | mol % | 0.05 | 0.95 |
| $T_i$ | | 0.532 | Not limited |

The above-enumerated Comparative Glasses were selected as having the highest refractive index $P_n$ at comparable values of the density parameter $P_d$ among the known glasses that have the features specified in Table 9.

The line corresponding to the formula y=1.00+0.19*x shown in FIG. 7 provides a visual representation of the differences between the Comparative Glasses having the features specified in Table 9 and the Exemplary Glasses 1 to 5 and 38 to 50 according to the present disclosure. As can be seen in FIG. 7, the mentioned Exemplary Glasses (filled circles) and none of the Comparative Glasses (open circles) represented in FIG. 7 fall above the line y=1.00+0.19*x, where y corresponds to the refractive index parameter $P_n$ and x corresponds to the density parameter $P_d$. In other words, some of the Exemplary Glasses and none of the Comparative Glasses represented in FIG. 7 satisfy the following formula (IX):

$$P_n - (1.000 + 0.19 * P_d) > 0.000 \quad (IX).$$

As can also be seen in FIG. 7, some of Exemplary Glasses and none of the Comparative Glasses represented in FIG. 7 fall above the line y=1.03+0.19*x, where y corresponds to the refractive index parameter $P_n$ and x corresponds to the density parameter $P_d$. In other words, the said Exemplary Glasses and none of the Comparative Glasses represented in FIG. 7 satisfy the following formula (X):

$$P_n - (1.03 + 0.19 * P_d) > 0.000 \quad (X).$$

The data shown in FIG. 7 illustrates that, under the conditions specified in Table 9 above, some of the Exemplary Glasses from the present disclosure have higher values of the refractive index parameter $P_n$ at comparable values of the density parameter $P_d$ compared to the best of the Comparative Glasses satisfying the same conditions. This can be interpreted as these Exemplary Glasses, by prediction, have the highest values of the refractive index $n_d$, as measured at 587.56 nm, at comparable values of density $d_{RT}$, as measured at 25° C. (g/cm$^3$) among the said glasses. In other words, the Exemplary Glasses shown in FIG. 7, by prediction, provide an improvement in the combination of high refractive index $n_d$ and low density at room temperature $d_{RT}$ among the known glasses that have the features specified in Table 9.

Figure 8:
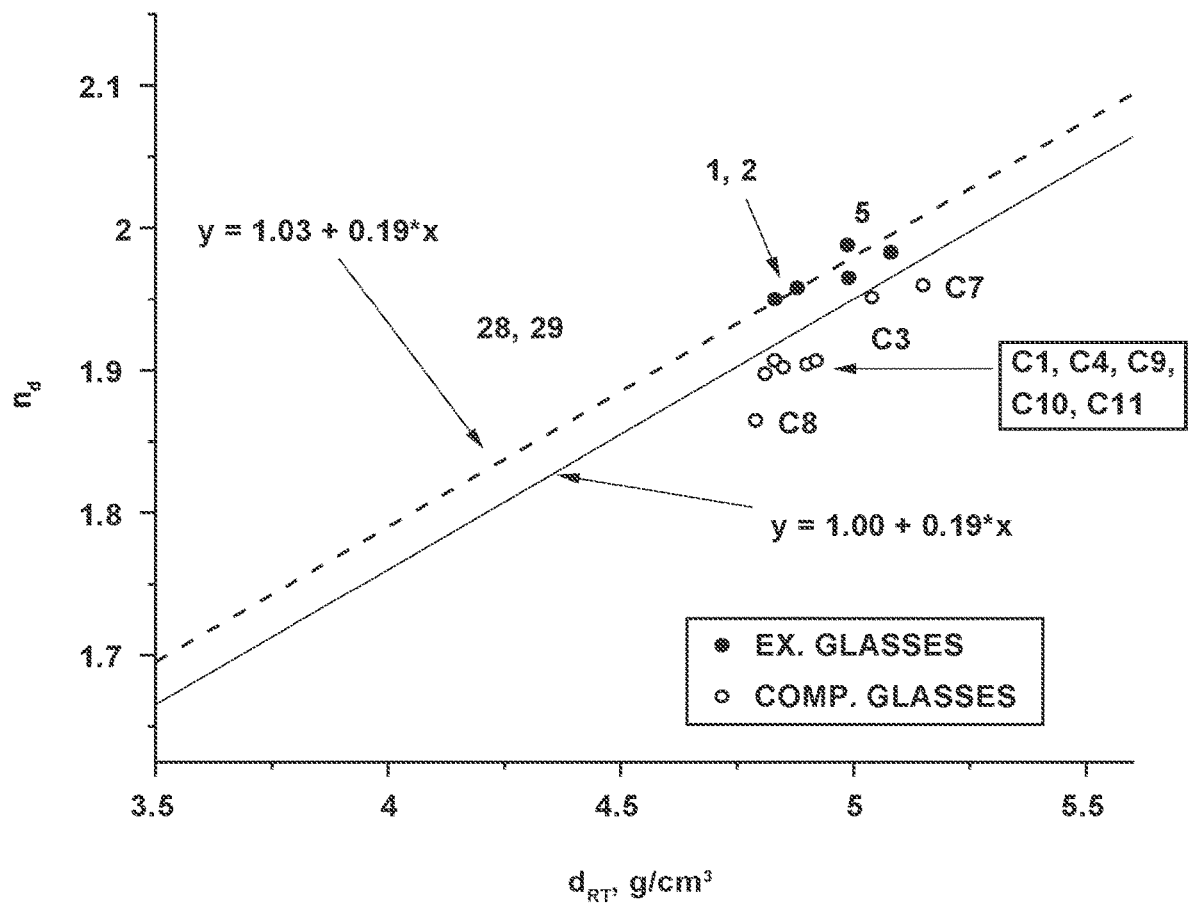
FIG. 8 is a plot illustrating the relationship between the density $d_{RT}$, as measured at room temperature (in g/cm$^3$), and the refractive index $n_d$, as measured at 587.56 nm, for some comparative glasses and some exemplary glasses according to an embodiment of the present disclosure.

FIG. 8 is a plot showing the relationship between the density $d_{RT}$ (as measured at 25° C. in g/cm$^3$) and the refractive index $n_d$ (as measured at 587.56 nm) for some of the Exemplary Glasses and some of the Comparative Glasses. The said Exemplary Glasses (filled circles) are the Examples 1 to 5 from Table 7. The said Comparative Glasses (open circles) are the Examples C1, C3, C4 and C7 to C11 from Table 8. All of the Exemplary Glasses and Comparative Glasses shown in FIG. 8 have the features specified in Table 10 below. In Table 10, the entry "Not limited", if present, refers to a limitation that was not considered when selecting the compositions. In FIG. 8, some of the above-enumerated compositions may be labeled for better visibility.

TABLE 10

Limitations for Glass Compositions Shown in FIG. 8

| Quantity | Unit | Min | Max |
|---|---|---|---|
| $La_2O_3$ | mol % | 15 | 50 |
| $B_2O_3$ | mol % | 9 | 33 |
| $TiO_2$ | mol % | 0 | 40 |
| $ZrO_2$ | mol % | 0 | 13.5 |
| $Nb_2O_5$ | mol % | 0 | 12 |
| $Y_2O_3$ | mol % | 0 | 3 |
| $Ta_2O_5$ | mol % | 0 | 1.5 |
| ZnO | mol % | 0 | 0.8 |
| $Li_2O$ | mol % | 0 | 0.5 |
| $SiO_2/(SiO_2 + B_2O_3)$ | mol % | 0.05 | 0.95 |
| $T_i$ | | 0.532 | Not limited |

The above-enumerated Comparative Glasses were selected as having the highest measured values of the refractive index $n_d$ (as measured at 587.56 nm) at comparable values of the density $d_{RT}$ (as measured at 25° C. in g/cm$^3$) among the known glasses that have the mentioned features specified in Table 10.

The line corresponding to the formula y=1.00+0.19*x shown in FIG. 8 provides a visual representation of the differences between the Comparative Glasses having the features specified in Table 10 and the Exemplary Glasses 1 to 5 according to the present disclosure. As can be seen in FIG. 8, the mentioned Exemplary Glasses (filled circles) and none of the Comparative Glasses (open circles) represented in FIG. 8 fall above the line y=1.00+0.19*x, where y corresponds to $n_d$ and x corresponds to $d_{RT}$. In other words, some of the Exemplary Glasses and none of the Comparative Glasses represented in FIG. 8 satisfy the following formula (I)(a):

$$n_d-(1.000+0.19*d_{RT})>0.000 \quad (I)(a).$$

As can also be seen in FIG. 8, some of Exemplary Glasses and none of the Comparative Glasses represented in FIG. 8 fall above the line y=1.03+0.19*x, where y corresponds to $n_d$ and x corresponds to $d_{RT}$. In other words, the said Exemplary Glasses and none of the Comparative Glasses represented in FIG. 8 satisfy the following formula (I)(b):

$$n_d-(1.03+0.19*d_{RT})>0.000 \quad (I)(b).$$

The data shown in FIG. 8 illustrates that, under the conditions specified in Table 10 above, some of the Exemplary Glasses from the present disclosure have higher measured values of the refractive index $n_d$ (as measured at 587.56 nm) at comparable measured values of the density $d_{RT}$ (as measured at 25° C. in g/cm$^3$) than the best of the Comparative Glasses satisfying the same conditions. This can be interpreted as these Exemplary Glasses, according to measured properties, have the highest values of $n_d$ at comparable values of $d_{RT}$ among the said glasses. In other words, the Exemplary Glasses shown in FIG. 8, by measured properties, provide an improvement in the combination of the density $d_{RT}$ and refractive index $n_d$ among the known glasses that have the features specified in Table 10.

The predicted and measured property data shown in FIGS. 7 and 8, respectively, illustrates that some Exemplary Glasses from the present disclosure have a better combination of refractive index $n_d$ (as measured at 587.56 nm) and density $d_{RT}$ (as measured at 25° C. in g/cm$^3$) than the best of the Comparative Glasses that have the features specified in Tables 9 and 10 accordingly.

The values of all attributes specified in Tables 9 and 10 and formulas (IX), (X), (I)(a), and (I)(b) for the Comparative Glasses C1 to C11 plotted in FIGS. 7 and 8 are presented in Table 11 below. Full compositions of Comparative Glasses are presented in Table 8. Full compositions and above-mentioned attributes of the Exemplary Glasses from the present disclosure are presented in Table 7.

TABLE 11

Attributes of Comparative Example Glasses Having the Features Specified in Tables 9 and 10

| Ex. # | | C1 | C2 | C3 | C4 | C5 | C6 |
|---|---|---|---|---|---|---|---|
| Composition | | | | | | | |
| $B_2O_3$ | mol % | 29.82 | 10.49 | 24.99 | 27.44 | 23.70 | 24.81 |
| $TiO_2$ | mol % | 5.17 | 11.43 | 18.06 | 11.67 | 15.22 | 7.21 |
| $ZrO_2$ | mol % | 8.82 | 0 | 7.68 | 0.18 | 12.26 | 4.67 |
| $Nb_2O_5$ | mol % | 8.35 | 0 | 4.61 | 7.58 | 1.86 | 0 |
| $Y_2O_3$ | mol % | 2.93 | 1.62 | 1.12 | 2.83 | 2.10 | 0 |
| $Ta_2O_5$ | mol % | 0 | 0 | 0 | 0 | 1.05 | 0 |
| ZnO | mol % | 0 | 0 | 0 | 0 | 0 | 0 |
| $Li_2O$ | mol % | 0 | 0 | 0 | 0 | 0 | 0 |
| Measured properties | | | | | | | |
| $T_i$ | | 0.7438 | 0.5871 | 0.6087 | 0.602 | 0.6591 | 0.7406 |
| Composition | | | | | | | |
| $SiO_2/(SiO_2 + B_2O_3)$ | mol % | 0.3135 | 0.7434 | 0.3899 | 0.4377 | 0.4929 | 0.5025 |

TABLE 11-continued

Attributes of Comparative Example Glasses Having the Features Specified in Tables 9 and 10

Measured properties

| | | | | | | |
|---|---|---|---|---|---|---|
| $d_{RT}$ | g/cm³ | 4.850 | | 5.040 | 4.900 | 5.000 |
| $n_d$ | | 1.902 | | 1.9512 | 1.904 | 1.892 |
| $n_d - (1 + 0.19 * d_{RT})$ | | −0.0195 | | −0.0064 | −0.027 | −0.058 |
| $n_d - (1.03 + 0.19 * d_{RT})$ | | −0.0495 | | −0.0364 | −0.057 | −0.088 |

Predicted properties

| | | | | | | |
|---|---|---|---|---|---|---|
| $P_d$ | g/cm³ | 5.4135 | 3.7959 | 5.1453 | 5.0176 | 4.7249 | 3.9539 |
| $P_n$ | | 1.9821 | 1.7144 | 1.9638 | 1.9396 | 1.8835 | 1.7347 |
| $P_n - (1 + 0.19 * P_d)$ | | −0.0464 | −0.0068 | −0.0138 | −0.0137 | −0.0142 | −0.0165 |
| $P_n - (1.03 + 0.19 * P_d)$ | | −0.0764 | −0.0368 | −0.0438 | −0.0437 | −0.0442 | −0.0465 |

| Ex. # | | C7 | C8 | C9 | C10 | C11 |
|---|---|---|---|---|---|---|

Composition

| | | | | | | |
|---|---|---|---|---|---|---|
| $B_2O_3$ | mol % | 12.54 | 31.35 | 30.05 | 31.36 | 32.78 |
| $TiO_2$ | mol % | 7.43 | 6.41 | 14.63 | 9.77 | 13.71 |
| $ZrO_2$ | mol % | 8.50 | 4.85 | 5.89 | 8.05 | 7.07 |
| $Nb_2O_5$ | mol % | 9.85 | 4.60 | 3.76 | 4.53 | 2.73 |
| $Y_2O_3$ | mol % | 0.77 | 0.62 | 0.26 | 0.27 | 0 |
| $Ta_2O_5$ | mol % | 0.79 | 0 | 0 | 0 | 0.123 |
| ZnO | mol % | 0 | 0 | 0 | 0 | 0 |
| $Li_2O$ | mol % | 0 | 0 | 0 | 0 | 0 |

Measured properties

| | | | | | | |
|---|---|---|---|---|---|---|
| $T_i$ | | 0.6927 | 0.7396 | 0.6371 | 0.7105 | 0.6726 |

Composition

| | | | | | | |
|---|---|---|---|---|---|---|
| $SiO_2/(SiO_2 + B_2O_3)$ | mol % | 0.7027 | 0.4079 | 0.3511 | 0.3471 | 0.2911 |

Measured properties

| | | | | | | |
|---|---|---|---|---|---|---|
| $d_{RT}$ | g/cm³ | 5.150 | 4.790 | 4.830 | 4.810 | 4.920 |
| $n_d$ | | 1.960 | 1.8646 | 1.9068 | 1.8974 | 1.9066 |
| $n_d - (1 + 0.19 * d_{RT})$ | | −0.0185 | −0.0455 | −0.0109 | −0.0165 | −0.0282 |
| $n_d - (1.03 + 0.19 * d_{RT})$ | | −0.0485 | −0.0755 | −0.0409 | −0.0465 | −0.0582 |

Predicted properties

| | | | | | | |
|---|---|---|---|---|---|---|
| $P_d$ | g/cm³ | 5.3938 | 7.4374 | 7.4668 | 7.4529 | 7.4264 |
| $P_n$ | | 1.9988 | 2.1839 | 2.196 | 2.201 | 2.1741 |
| $P_n - (1 + 0.19 * P_d)$ | | −0.0261 | −0.2292 | −0.2227 | −0.2150 | −0.2370 |
| $P_n - (1.03 + 0.19 * P_d)$ | | −0.0561 | −0.2592 | −0.2527 | −0.2450 | −0.2670 |

Figure 9:
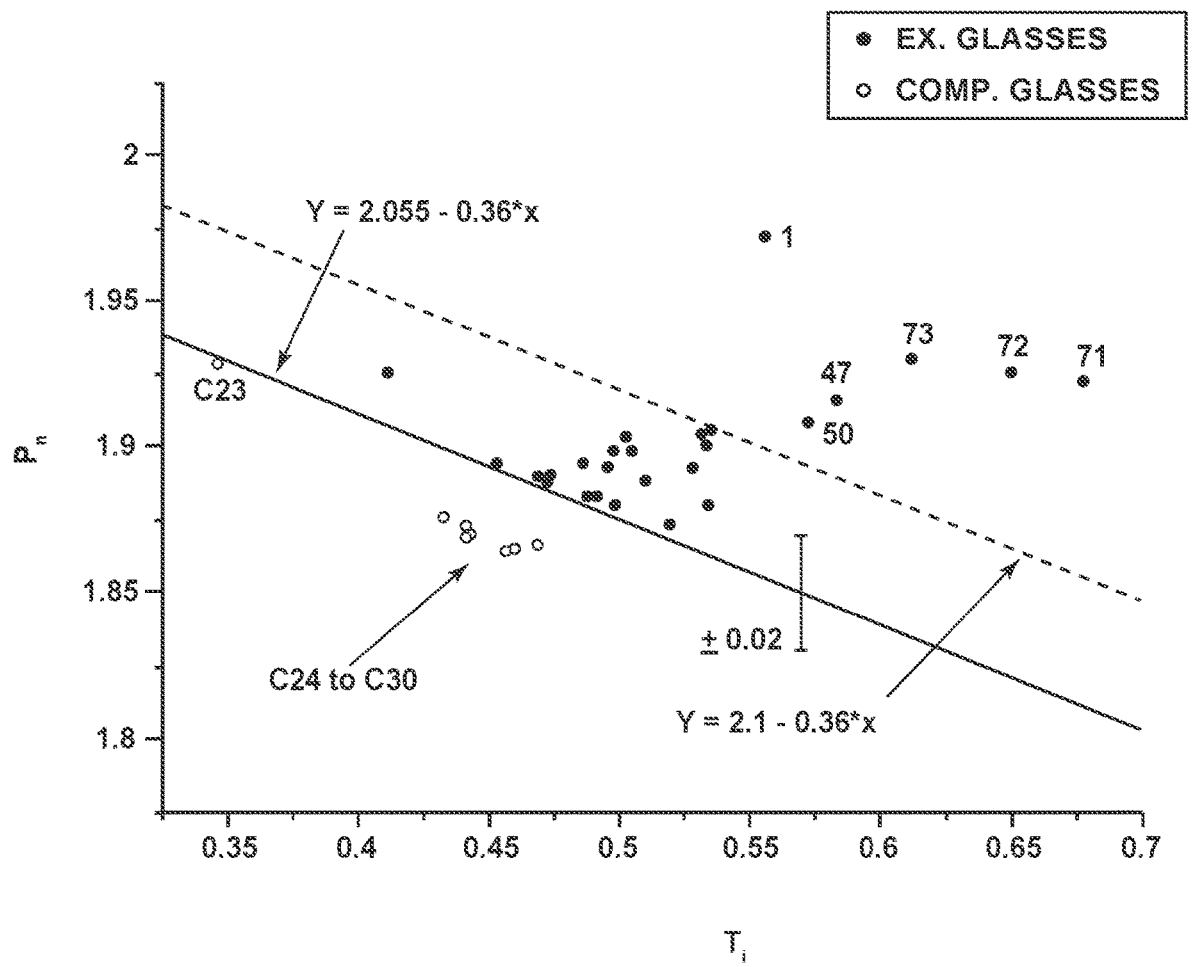
FIG. 9 is a plot illustrating the relationship between the transmittance index $T_i$ calculated according to formula (III) and the refractive index parameter $P_n$ calculated according to formula (VI) for some comparative glasses and some exemplary glasses according to an embodiment of the present disclosure.

FIG. 9 is a plot showing the relationship between the transmittance index $T_i$ and the refractive index parameter $P_n$ for some of the Exemplary Glasses and some of the Comparative Glasses. The said Exemplary Glasses (filled circles) are the Examples 1 and 46 to 73 from Table 7. The said Comparative Glasses (open circles) are the Examples C23 to C30 from Table 8. The refractive index parameter $P_n$ predicts the refractive index $n_d$ at 587.56 nm and was determined according to formula (VI). The transmittance index $T_i$ was determined according to formula (III). All of the Exemplary Glasses and Comparative Glasses shown in FIG. 9 have the features specified in Table 12 below. In Table 12, the entry "Not limited", if present, refers to a limitation that was not considered when selecting the compositions. In FIG. 9, some of the above-enumerated compositions may be labeled for better visibility.

TABLE 12

Limitations for Glass Compositions Shown in FIG. 9

| Quantity | Unit | Min | Max |
|---|---|---|---|
| $SiO_2$ | mol % | 3 | 49 |
| $B_2O_3$ | mol % | 1 | 47 |
| CaO | mol % | 0 | 32 |
| $Gd_2O_3$ | mol % | 0 | 27 |
| $Nb_2O_5$ | mol % | 0 | 25 |
| $Bi_2O_3$ | mol % | 0 | 20 |
| $TiO_2$ | mol % | 0 | 18 |
| BaO | mol % | 0 | 15 |
| CdO | mol % | 0 | 10 |
| $Li_2O$ | mol % | 0 | 7 |
| ZnO | mol % | 0 | 7 |
| MgO | mol % | 0 | 5 |
| $TeO_2$ | mol % | 0 | 5 |

TABLE 12-continued

Limitations for Glass Compositions Shown in FIG. 9

| Quantity | Unit | Min | Max |
|---|---|---|---|
| $Y_2O_3$ | mol % | 0 | 1.5 |
| PbO | mol % | 0 | 1 |
| $HfO_2$ | mol % | 0 | 1 |
| $Ta_2O_5$ | mol % | 0 | 0.5 |
| RO | mol % | 8.5 | 71 |
| F | at. % | 0 | 1 |
| $RE_mO_n + TiO_2 + Nb_2O_5 + ZrO_2 + Bi_2O_3 + WO_3$ | mol % | 25 | 87.5 |
| $SiO_2 + B_2O_3 + Alk_2O + MgO + CaO + SrO + BaO + ZnO$ | mol % | 4 | 69 |
| $SiO_2 + B_2O_3$ | mol % | 4 | 50 |

The above-enumerated Comparative Glasses were selected as having the highest refractive index parameter $P_n$ at comparable values of the transmittance index $T_i$ among the known glasses that have the features specified in Table 12.

The line corresponding to the formula $y=2.055-0.36*x$ shown in FIG. 9 provides a visual representation of the differences between the Comparative Glasses having the features specified in Table 12 and the Exemplary Glasses 1 and 46 to 73 according to the present disclosure. As can be seen in FIG. 9, the mentioned Exemplary Glasses (filled circles) and none of the Comparative Glasses (open circles) represented in FIG. 9 fall above the line $y=2.055-0.36*x$, where y corresponds to the refractive index parameter $P_n$ and x corresponds to the transmittance index $T_i$. In other words, some of the Exemplary Glasses and none of the Comparative Glasses represented in FIG. 9 satisfy the following formula (XI)(a):

$$P_n-(2.055-0.36*T_i)>0.000 \qquad (XI)(a).$$

As can also be seen in FIG. 9, some of Exemplary Glasses and none of the Comparative Glasses represented in FIG. 9 fall above the line $y=2.1-0.36*x$, where y corresponds to the refractive index parameter $P_n$ and x corresponds to the transmittance index $T_i$. In other words, the said Exemplary Glasses and none of the Comparative Glasses represented in FIG. 9 satisfy the following formula (XI)(b):

$$P_n-(2.1-0.36*T_i)>0.000 \qquad (XI)(b).$$

The data shown in FIG. 9 illustrates that, under the conditions specified in Table 12 above, some of the Exemplary Glasses from the present disclosure have higher values of the refractive index parameter $P_n$ at comparable values of the transmittance index $T_i$ than the best of the Comparative Glasses satisfying the same conditions. This can be interpreted as these Exemplary Glasses, by prediction, have the highest values of the refractive index $n_d$ at 587.56 nm at comparable values of the transmittance index $T_i$ among the said glasses. In other words, the Exemplary Glasses shown in FIG. 9, by prediction, provide an improvement in the combination of transmittance index $T_i$ and refractive index $n_d$ among the known glasses that have the features specified in Table 12.

Figure 10:
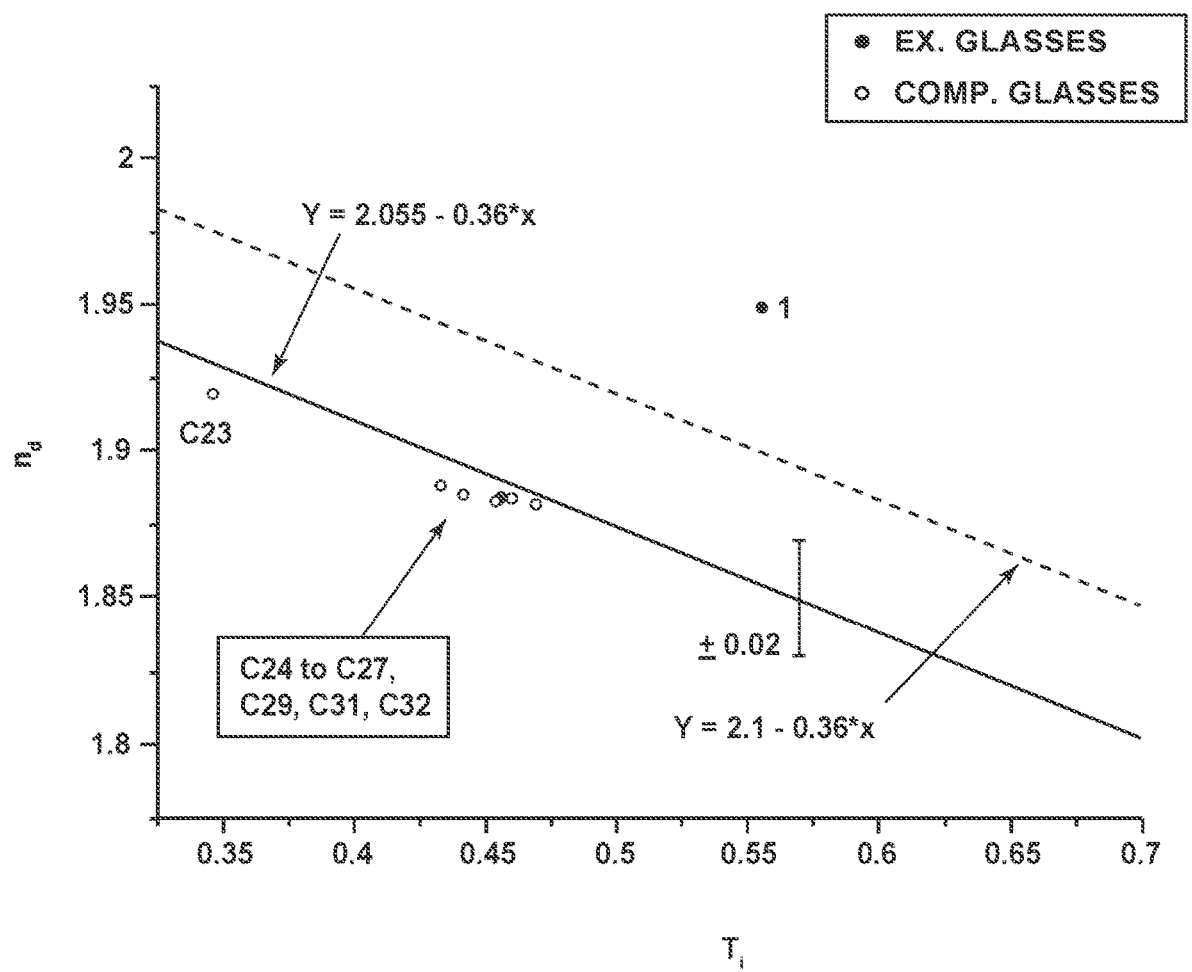
FIG. 10 is a plot illustrating the relationship between the transmittance index $T_i$ calculated according to formula (III) and the refractive index $n_d$, as measured at 587.56 nm, for some comparative glasses and some exemplary glasses according to an embodiment of the present disclosure.

FIG. 10 is a plot showing the relationship between the transmittance index $T_i$ and the refractive index $n_d$, as measured at 587.56 nm, for some of the Exemplary Glasses and some of the Comparative Glasses. The said Exemplary Glasses (filled circles) are the Examples 1 from Table 7. The said Comparative Glasses (open circles) are the Examples C23 to C27, C29, C31 and C32 from Table 8. All of the Exemplary Glasses and Comparative Glasses shown in FIG. 10 have the features specified in Table 13 below. In Table 13, the entry "Not limited", if present, refers to a limitation that was not considered when selecting the compositions. In FIG. 10, some of the above-enumerated compositions may be labeled for better visibility.

TABLE 13

Limitations for Glass Compositions Shown in FIG. 10

| Quantity | Unit | Min | Max |
|---|---|---|---|
| $SiO_2$ | mol % | 3 | 49 |
| $B_2O_3$ | mol % | 1 | 47 |
| CaO | mol % | 0 | 32 |
| $Gd_2O_3$ | mol % | 0 | 27 |
| $Nb_2O_5$ | mol % | 0 | 25 |
| $Bi_2O_3$ | mol % | 0 | 20 |
| $TiO_2$ | mol % | 0 | 18 |
| BaO | mol % | 0 | 15 |
| CdO | mol % | 0 | 10 |
| $Li_2O$ | mol % | 0 | 7 |
| ZnO | mol % | 0 | 7 |
| MgO | mol % | 0 | 5 |
| $TeO_2$ | mol % | 0 | 5 |
| $Y_2O_3$ | mol % | 0 | 1.5 |
| PbO | mol % | 0 | 1 |
| $HfO_2$ | mol % | 0 | 1 |
| $Ta_2O_5$ | mol % | 0 | 0.5 |
| RO | mol % | 8.5 | 71 |
| F | at. % | 0 | 1 |
| $RE_mO_n + TiO_2 + Nb_2O_5 + ZrO_2 + Bi_2O_3 + WO_3$ | mol % | 25 | 87.5 |
| $SiO_2 + B_2O_3 + Alk_2O + MgO + CaO + SrO + BaO + ZnO$ | mol % | 4 | 69 |
| $SiO_2 + B_2O_3$ | mol % | 4 | 50 |

The above-enumerated Comparative Glasses were selected as having the highest measured values of the refractive index $n_d$, as measured at 587.56 nm, at comparable values of the transmittance index $T_i$ among the known glasses that have the mentioned features specified in Table 13.

The line corresponding to the formula $y=2.055-0.36*x$ shown in FIG. 10 provides a visual representation of the differences between the Comparative Glasses having the features specified in Table 13 and the Exemplary Glasses 1 according to the present disclosure. As can be seen in FIG. 10, the mentioned Exemplary Glasses (filled circles) and none of the Comparative Glasses (open circles) represented in FIG. 10 fall above the line $y=2.055-0.36*x$, where y corresponds to the refractive index $n_d$ and x corresponds to the transmittance index $T_i$. In other words, some of the Exemplary Glasses and none of the Comparative Glasses represented in FIG. 10 satisfy the following formula (II)(a):

$$n_d-(2.055-0.36*T_i) \geq 0.000 \qquad (II)(a).$$

As can also be seen in FIG. 10, some of Exemplary Glasses and none of the Comparative Glasses represented in FIG. 10 fall above the line $y=2.1-0.36*x$, where y corresponds to the refractive index $n_d$ and x corresponds to the transmittance index $T_i$. In other words, the said Exemplary Glasses and none of the Comparative Glasses represented in FIG. 10 satisfy the following formula (II)(b):

$$n_d-(2.1-0.36*T_i) \geq 0.000 \qquad (II)(b).$$

The data shown in FIG. 10 illustrates that, under the conditions specified in Table 13 above, some of the Exemplary Glasses from the present disclosure have higher measured values of the refractive index $n_d$, as measured at 587.56 nm, at comparable measured values of the transmittance index $T_i$ than the best of the Comparative Glasses satisfying the same conditions. This can be interpreted as these exemplary glasses, according to measured properties, have the highest values of refractive index $n_d$ at comparable values of the transmittance index $T_i$ among the said glasses. In other words, the Exemplary Glasses shown in FIG. 10, by measured properties, provide an improvement in the combination of transmittance index $T_i$ and refractive index $n_d$ among the known glasses that have the features specified in Table 13.

Figure 11:
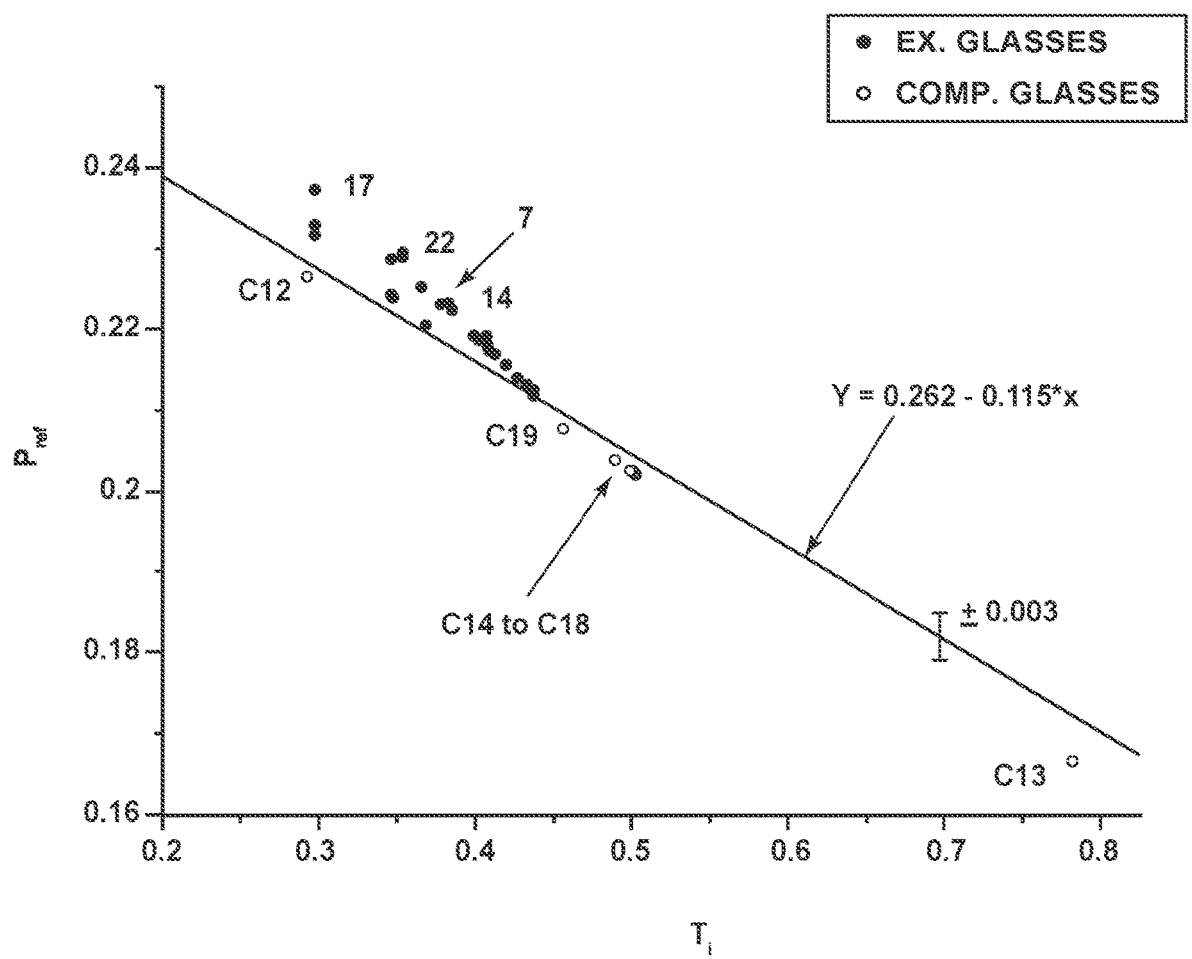
FIG. 11 is a plot illustrating the relationship between the transmittance index $T_i$ calculated according to formula (III) and the refraction parameter $Pr_ef$ calculated according to formula (VIII) for some comparative glasses and some exemplary glasses according to an embodiment of the present disclosure.

The values of all attributes specified in Tables 12 and 13 and formulas (XI)(a), (XI)(b), (II)(a), and (II)(b) for the Comparative Glasses C23 to C32 plotted in FIGS. 9 and 10 are presented in Table 14 below. Full compositions of the Comparative Glasses are presented in Table 8. Full compositions and above-mentioned attributes of the Exemplary Glasses from the present disclosure are presented in Table 7.

some of the Exemplary Glasses and some of the Comparative Glasses. The said Exemplary Glasses (filled circles) are the Examples 6 to 37 from Table 7. The said Comparative Glasses (open circles) are the Examples C12 to C19 from Table 8. The refraction parameter $P_{ref}$ predicts the ratio of $(n_d-1)/d_{RT}$ ("refraction"), where $n_d$ is the refractive index as measured at 587.56 nm and $d_{RT}$ is the density as measured at 25° C. (in g/cm³), and was determined according to formula (VIII). All of the Exemplary Glasses and Comparative Glasses shown in FIG. 11 have the features specified in Table 15 below. In Table 15, the entry "Not limited", if present, refers to a limitation that was not considered when selecting the compositions. In FIG. 11, some of the above-enumerated compositions may be labeled for better visibility.

TABLE 14

Attributes of Comparative Example Glasses Having the Features Specified in Tables 12 and 13

| | | Ex. # | | | | | | | | | |
|---|---|---|---|---|---|---|---|---|---|---|---|
| | | C23 | C24 | C25 | C26 | C27 | C28 | C29 | C30 | C31 | C32 |
| Composition | | | | | | | | | | | |
| SiO₂ | mol % | 15.52 | 13.40 | 11.69 | 10.07 | 13.15 | 10.97 | 13.11 | 11.48 | 13.43 | 13.15 |
| B₂O₃ | mol % | 24.35 | 26.38 | 29.76 | 26.70 | 25.88 | 27.46 | 25.81 | 29.24 | 28.02 | 26.66 |
| CaO | mol % | 0 | 23.60 | 17.45 | 28.72 | 24.12 | 24.85 | 24.06 | 17.14 | 20.69 | 23.16 |
| Gd₂O₃ | mol % | 0 | 0 | 0 | 0 | 0 | 0 | 0 | 0 | 0 | 0 |
| Nb₂O₅ | mol % | 10.58 | 7.55 | 10.05 | 9.55 | 6.88 | 9.51 | 6.48 | 9.87 | 7.36 | 7.21 |
| Bi₂O₃ | mol % | 0 | 0 | 0 | 0 | 0 | 0 | 0 | 0 | 0 | 0 |
| TiO₂ | mol % | 17.68 | 11.88 | 10.81 | 10.01 | 13.01 | 10.14 | 13.65 | 10.62 | 13.28 | 13.01 |
| BaO | mol % | 14.28 | 0 | 3.75 | 0 | 0 | 0 | 0 | 0 | 0 | 0 |
| CdO | mol % | 0 | 0 | 0 | 0 | 0 | 0 | 0 | 0 | 0 | 0 |
| Li₂O | mol % | 0 | 0 | 0 | 0 | 0 | 1.45 | 0 | 0 | 0 | 0 |
| ZnO | mol % | 0 | 0 | 0 | 0 | 0 | 0 | 0 | 0 | 0 | 0 |
| ZnO | mol % | 0 | 0 | 0 | 0 | 0 | 0 | 0 | 0 | 0 | 0 |
| MgO | mol % | 0 | 0 | 0 | 0 | 0 | 0 | 0 | 0 | 0 | 0 |
| TeO₂ | mol % | 0 | 0 | 0 | 0 | 0 | 0 | 0 | 0 | 0 | 0 |
| Y₂O₃ | mol % | 0 | 0 | 0 | 0 | 0 | 0 | 0 | 0 | 0 | 0 |
| F | mol % | 0 | 0 | 0 | 0 | 0 | 0 | 0 | 0 | 0 | 0 |
| PbO | mol % | 0 | 0 | 0 | 0 | 0 | 0 | 0 | 0 | 0 | 0 |
| HfO₂ | mol % | 0 | 0 | 0 | 0 | 0 | 0 | 0 | 0 | 0 | 0 |
| Ta₂O₅ | mol % | 0 | 0 | 0 | 0 | 0 | 0 | 0 | 0 | 0 | 0 |
| RE$_m$O$_n$ + TiO₂ + Nb₂O₅ + ZrO₂ + Bi₂O₃ + WO₃ | mol % | 43.22 | 36.59 | 37.34 | 34.51 | 36.82 | 35.28 | 36.99 | 36.68 | 37.83 | 36.99 |
| SiO₂ + B₂O₃ + Alk₂O + MgO + CaO + SrO + BaO + ZnO | mol % | 56.78 | 63.39 | 62.66 | 65.49 | 63.15 | 64.72 | 62.98 | 63.32 | 62.14 | 62.98 |
| SiO₂ + B₂O₃ | mol % | 39.86 | 39.78 | 41.45 | 36.77 | 39.03 | 38.43 | 38.92 | 40.72 | 41.45 | 39.81 |
| Measured properties | | | | | | | | | | | |
| $T_i$ | | 0.3461 | 0.469 | 0.4415 | 0.433 | 0.4599 | 0.4429 | 0.4561 | 0.4415 | 0.4544 | 0.4535 |
| $n_d$ | | 1.920 | 1.883 | 1.886 | 1.889 | 1.885 | 1.885 | 1.885 | 1.883 | 1.884 | 1.884 |
| $d_{RT}$ | g/cm³ | | 4.070 | 4.040 | 4.010 | 4.050 | 3.980 | 4.060 | 4.040 | 4.050 | 4.030 |
| $n_d - (2.055 - 0.36 * T_i)$ | | −0.0104 | −0.0032 | −0.0101 | −0.0101 | −0.0044 | | −0.0058 | | −0.0074 | −0.0077 |
| $n_d - (2.1 - 0.36 * T_i)$ | | −0.0554 | −0.0482 | −0.0551 | −0.0551 | −0.0494 | | −0.0508 | | −0.0524 | −0.0527 |
| Predicted properties | | | | | | | | | | | |
| $P_n$ | | 1.9283 | 1.8663 | 1.8729 | 1.8759 | 1.8649 | 1.8696 | 1.8642 | 1.8689 | 1.8627 | 1.8633 |
| $P_d$ | g/cm³ | 4.5386 | 3.9957 | 3.9802 | 3.9287 | 3.9794 | 3.896 | 3.9856 | 3.9024 | 3.9614 | 3.9499 |
| $P_n - (2.055 - 0.36 * T_i)$ | | −0.0021 | −0.0199 | −0.0231 | −0.0233 | −0.0246 | −0.0259 | −0.0266 | −0.0271 | −0.0287 | −0.0285 |
| $P_n - (2.1 - 0.36 * T_i)$ | | −0.0471 | −0.0649 | −0.0681 | −0.0683 | −0.0696 | −0.0709 | −0.0716 | −0.0721 | −0.0737 | −0.0735 |

The predicted and measured property data shown in FIGS. 9 and 10, respectively, illustrates that some Exemplary Glasses from the present disclosure have a better combination of transmittance index $T_i$ and refractive index $n_d$, as measured at 587.56 nm, than the best of the Comparative Glasses that have the features specified in Tables 12 and 13 accordingly.

FIG. 11 is a plot showing the relationship between the transmittance index $T_i$ and the refraction parameter $P_{ref}$ for

TABLE 15

Limitations for Glass Compositions Shown in FIG. 11

| Quantity | Unit | Min | Max |
|---|---|---|---|
| TiO₂ | mol % | 1 | 40 |
| B₂O₃ | mol % | 1 | 29 |
| SiO₂ | mol % | 0 | 32 |

TABLE 15-continued

Limitations for Glass Compositions Shown in FIG. 11

| Quantity | Unit | Min | Max |
|---|---|---|---|
| $La_2O_3$ | mol % | 0 | 30 |
| CaO | mol % | 0 | 15 |
| BaO | mol % | 0 | 15 |
| $GeO_2$ | mol % | 0 | 10 |
| $Al_2O_3$ | mol % | 0 | 10 |
| $ZrO_2$ | mol % | 0 | 7.8 |
| $Nb_2O_5$ | mol % | 0 | 7 |
| $Li_2O$ | mol % | 0 | 4 |
| RO | mol % | 0 | 25 |
| $R_2O$ | mol % | 0 | 15 |
| F | at. % | 0 | 1 |
| $SiO_2 + B_2O_3$ | mol % | 1 | 45 |
| $Y_2O_3 + ZnO$ | mol % | 0 | 2 |
| $T_i$ | | 0.25 | 0.75 |

The above-enumerated Comparative Glasses were selected as having the highest refraction parameter $P_{ref}$ at comparable values of the transmittance index $T_i$ among the known glasses that have the features specified in Table 15.

The line corresponding to the formula y=0.262−0.115*x shown in FIG. 11 provides a visual representation of the differences between the Comparative Glasses having the features specified in Table 15 and the Exemplary Glasses 6 to 37 according to the present disclosure. As can be seen in FIG. 11, the mentioned Exemplary Glasses (filled circles) and none of the Comparative Glasses (open circles) represented in FIG. 11 fall above the line y=0.262−0.115*x, where y corresponds to the refraction parameter $P_{ref}$ and x corresponds to the transmittance index $T_i$. In other words, some of the Exemplary Glasses and none of the Comparative Glasses represented in FIG. 11 satisfy the following formula (XII):

$$P_{ref} - (0.262 - 0.115 * T_i) > 0.000 \quad \text{(XII)}.$$

The data in FIG. 11 illustrates that, under the conditions specified in Table 15 above, some of the Exemplary Glasses from the present disclosure have higher values of the refraction parameter $P_{ref}$ at comparable values of the transmittance index $T_i$ than the best of the Comparative Glasses satisfying the same conditions. This can be interpreted as these Exemplary Glasses, by prediction, have the highest values of the ratio of the refractive index $n_d$ to density $d_{RT}$ $(n_d-1)/d_{RT}$ ("refraction") at comparable values of the transmittance index $T_i$ among the said glasses. In other words, the Exemplary Glasses of FIG. 11, by prediction, provide an improvement in the combination of transmittance index $T_i$ and refraction among the known glasses that have the features specified in Table 15.

Figure 12:
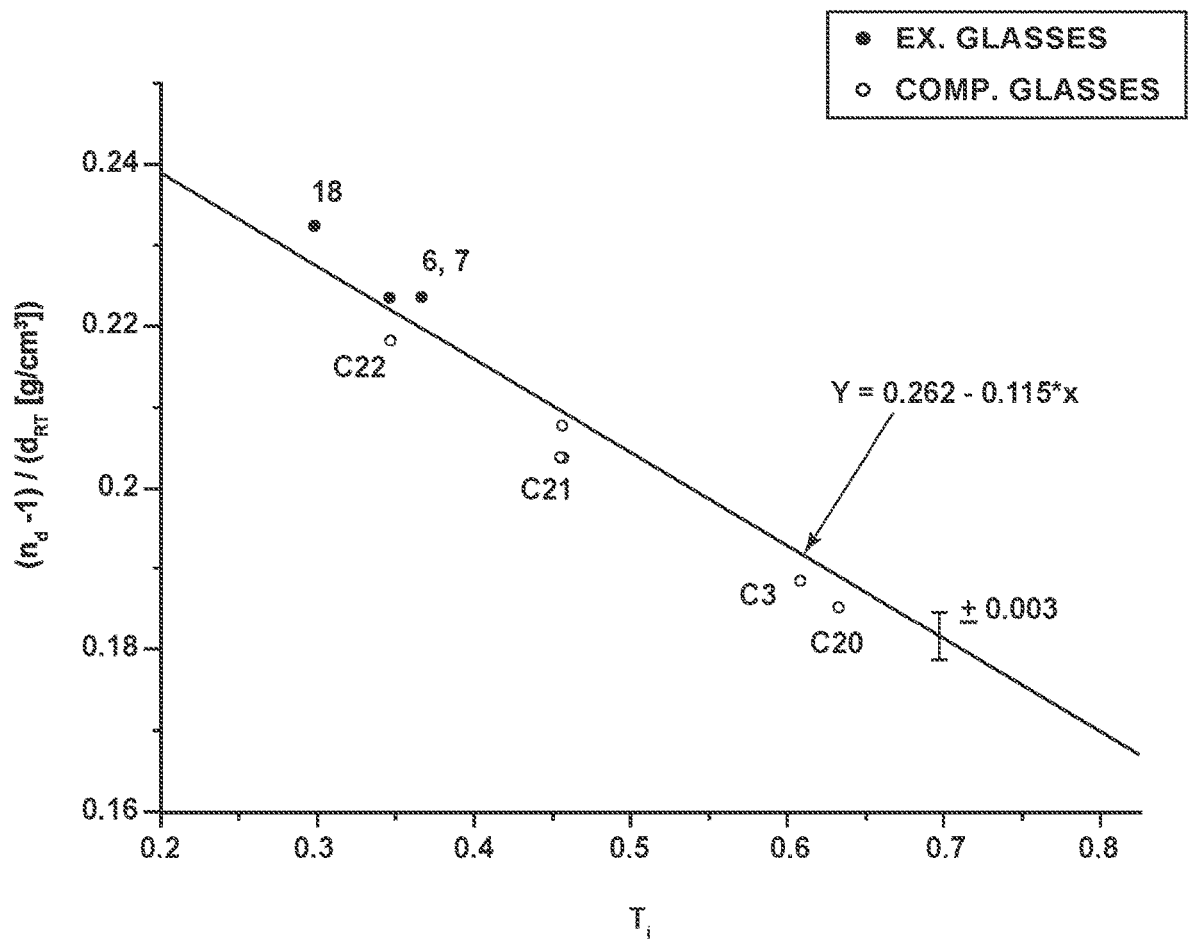
FIG. 12 is a plot illustrating the relationship between the transmittance index $T_i$ calculated according to formula (III) and the refractive index to density ratio ("refraction") $(n_d-1)/d_{RT}$ for some comparative glasses and some exemplary glasses according to an embodiment of the present disclosure.

FIG. 12 is a plot showing the relationship between the transmittance index $T_i$ and the ratio $(n_d-1)/d_{RT}$ ("refraction"), where $n_d$ is the refractive index as measured at 587.56 nm and $d_{RT}$ is the density as measured at 25° C. (in g/cm³) for some of the Exemplary Glasses and some of the Comparative Glasses. The said Exemplary Glasses (filled circles) are the Examples 6, 7, and 18 from Table 7. The said Comparative Glasses (open circles) are the Examples C3 and C19 to C22 from Table 8. All of the Exemplary Glasses and Comparative Glasses shown in FIG. 12 have the features specified in Table 16 below. In Table 16, the entry "Not limited", if present, refers to a limitation that was not considered when selecting the compositions. In FIG. 12, some of the above-enumerated compositions may be labeled for better visibility.

TABLE 16

Limitations for Glass Compositions Shown in FIG. 12

| Quantity | Unit | Min | Max |
|---|---|---|---|
| $TiO_2$ | mol % | 1 | 40 |
| $B_2O_3$ | mol % | 1 | 29 |
| $SiO_2$ | mol % | 0 | 32 |
| $La_2O_3$ | mol % | 0 | 30 |
| CaO | mol % | 0 | 15 |
| BaO | mol % | 0 | 15 |
| $GeO_2$ | mol % | 0 | 10 |
| $Al_2O_3$ | mol % | 0 | 10 |
| $ZrO_2$ | mol % | 0 | 7.8 |
| $Nb_2O_5$ | mol % | 0 | 7 |
| $Li_2O$ | mol % | 0 | 4 |
| RO | mol % | 0 | 25 |
| $R_2O$ | mol % | 0 | 15 |
| F | at. % | 0 | 1 |
| $SiO_2 + B_2O_3$ | mol % | 1 | 45 |
| $Y_2O_3 + ZnO$ | mol % | 0 | 2 |
| $T_i$ | | 0.25 | 0.75 |

The above-enumerated Comparative Glasses were selected as having the highest measured values of the ratio of the refractive index $n_d$ to density $d_{RT}$ $(n_d-1)/d_{RT}$ (refraction) at comparable values of the transmittance index $T_i$ among the known glasses that have the mentioned features specified in Table 16.

The line corresponding to the formula y=0.262−0.115*x shown in FIG. 12 provides a visual representation of the differences between the Comparative Glasses having the features specified in Table 16 and the Exemplary Glasses 6, 7, and 18 according to the present disclosure. As can be seen in FIG. 12, the mentioned Exemplary Glasses (filled circles) and none of the Comparative Glasses (open circles) represented in FIG. 12 fall above the line y=0.262−0.115*x, where y corresponds to the ratio $(n_d-1)/d_{RT}$ (refraction) and x corresponds to the transmittance index $T_i$. In other words, some of the Exemplary Glasses and none of the Comparative Glasses represented in FIG. 12 satisfy the following formula (V):

$$[(n_d-1)/d_{RT}] - (0.262 - 0.115 * T_i) > 0.000 \quad \text{(V)}.$$

The data shown in FIG. 12 illustrates that, under the conditions specified in Table 16 above, some of the Exemplary Glasses from the present disclosure have higher measured values of the ratio $(n_d-1)/d_{RT}$ (refraction) at comparable measured values of the transmittance index $T_i$ than the best of the Comparative Glasses satisfying the same conditions. This can be interpreted as these Exemplary Glasses, according to measured properties, have the highest values of ratio $(n_d-1)/d_{RT}$ at comparable values of $T_i$ among the said glasses. In other words, the Exemplary Glasses shown in FIG. 12, by measured properties, provide an improvement in the combination of transmittance index $T_i$ and refraction (ratio of $(n_d-1)/d_{RT}$) among the known glasses that have the features specified in Table 16.

The values of all attributes specified in Tables 15 and 16 and Formulas (XII) and (V) for the Comparative Glasses C3 and C12 to C22 plotted in FIGS. 11 and 12 are presented in Table 17 below. Full compositions of the Comparative Glasses are presented in Table 8. Full compositions and above-mentioned attributes of the Exemplary Glasses from the present disclosure are presented in Table 7.

TABLE 17

Attributes of Comparative Glasses Having the Features Specified in Tables 15 and 16

| Ex. # | | C3 | C12 | C13 | C14 | C15 | C16 |
|---|---|---|---|---|---|---|---|
| Composition | | | | | | | |
| $B_2O_3$ | mol % | 24.99 | 13.63 | 20.75 | 21.94 | 27.10 | 21.92 |
| $SiO_2$ | mol % | 15.97 | 19.01 | 17.60 | 11.62 | 5.93 | 11.61 |
| $La_2O_3$ | mol % | 23.33 | 10.44 | 26.50 | 21.71 | 24.52 | 21.80 |
| RO | mol % | 0 | 10.46 | 0 | 0 | 0 | 0 |
| CaO | mol % | 0 | 0 | 0 | 0 | 0 | 0 |
| BaO | mol % | 0 | 7.97 | 0 | 0 | 0 | 0 |
| $R_2O$ | mol % | 0 | 0 | 0 | 1.46 | 0 | 1.46 |
| $GeO_2$ | mol % | 0 | 0 | 8.42 | 0 | 0 | 0 |
| $Al_2O_3$ | mol % | 0 | 0 | 0 | 0 | 0 | 0 |
| $ZrO_2$ | mol % | 7.68 | 5.64 | 7.72 | 7.01 | 7.13 | 7.00 |
| $Nb_2O_5$ | mol % | 4.61 | 4.58 | 0 | 6.06 | 4.74 | 5.87 |
| $Li_2O$ | mol % | 0 | 0 | 0 | 1.46 | 0 | 1.46 |
| F | mol % | 0 | 0 | 0 | 0 | 0 | 0 |
| $SiO_2 + B_2O_3$ | mol % | 40.96 | 32.63 | 38.35 | 33.56 | 33.03 | 33.53 |
| $Y_2O_3 + ZnO$ | mol % | 1.12 | 0.84 | 0.78 | 0.37 | 1.54 | 0.37 |
| Measured properties | | | | | | | |
| $T_i$ | | 0.6087 | 0.2931 | 0.779 | 0.5011 | 0.4895 | 0.5021 |
| $(n_d - 1)/d_{RT}$ | | 0.1887 | 0.2164 | | | | |
| $(n_d - 1)/d_{RT} - (0.262 - 0.115 * T_i)$ | | -0.0033 | | | | | |
| Predicted properties | | | | | | | |
| $P_{ref}$ | | 0.1865 | 0.2267 | 0.1664 | 0.2025 | 0.2037 | 0.2022 |
| $P_{ref} - (0.262 - 0.115 * T_i)$ | | -0.0055 | -0.0016 | -0.0060 | -0.0019 | -0.0020 | -0.0021 |

| Ex. # | | C17 | C18 | C19 | C20 | C21 | C22 |
|---|---|---|---|---|---|---|---|
| Composition | | | | | | | |
| $B_2O_3$ | mol % | 21.87 | 21.88 | 12.93 | 13.20 | 12.94 | 11.75 |
| $SiO_2$ | mol % | 11.59 | 12.30 | 15.31 | 22.94 | 15.29 | 18.47 |
| $La_2O_3$ | mol % | 21.76 | 22.01 | 22.37 | 27.93 | 22.46 | 12.11 |
| RO | mol % | 0 | 0 | 0 | 2.96 | 0 | 13.63 |
| CaO | mol % | 0 | 0 | 0 | 0 | 0 | 2.81 |
| BaO | mol % | 0 | 0 | 0 | 0 | 0 | 8.84 |
| $R_2O$ | mol % | 1.45 | 0 | 0 | 0 | 0 | 0 |
| $GeO_2$ | mol % | 0 | 0 | 0 | 0 | 0 | 0 |
| $Al_2O_3$ | mol % | 0 | 0 | 0 | 0 | 0 | 0 |
| $ZrO_2$ | mol % | 6.99 | 7.41 | 7.04 | 5.37 | 7.02 | 6.50 |
| $Nb_2O_5$ | mol % | 5.77 | 4.68 | 4.43 | 6.22 | 4.43 | 5.39 |
| $Li_2O$ | mol % | 1.45 | 0 | 0 | 0 | 0 | 0 |
| F | mol % | 0 | 0 | 0 | 0 | 0 | 0 |
| $SiO_2 + B_2O_3$ | mol % | 33.46 | 34.18 | 28.24 | 36.14 | 28.22 | 30.22 |
| $Y_2O_3 + ZnO$ | mol % | 0.36 | 0.39 | 0.45 | 0.41 | 0.37 | 1.97 |
| Measured properties | | | | | | | |
| $T_i$ | | 0.5006 | 0.4998 | 0.4559 | 0.6329 | 0.4565 | 0.3464 |
| $(n_d - 1)/d_{RT}$ | | | | 0.2039 | 0.1854 | 0.2039 | 0.2185 |
| $(n_d - 1)/d_{RT} - (0.262 - 0.115 * T_i)$ | | | | -0.0057 | -0.0038 | -0.0056 | -0.0037 |
| Predicted properties | | | | | | | |
| $P_{ref}$ | | 0.2023 | 0.2024 | 0.2076 | 0.1749 | 0.2075 | 0.2174 |
| $P_{ref} - (0.262 - 0.115 * T_i)$ | | -0.0021 | -0.0021 | -0.0020 | -0.0143 | -0.0020 | -0.0048 |

The predicted and measured property data shown in FIGS. 11 and 12, respectively, illustrates that some Exemplary Glasses from the present disclosure have a better combination of refraction (ratio of $(n_d-1)/d_{RT}$) and transmittance index $T_i$ than the best of the Comparative Glasses that have the features specified in Tables 15 and 16 accordingly.

The following non-limiting aspects are encompassed by the present disclosure. To the extent not already described, any one of the features of the first through the twenty-sixth aspects may be combined in part or in whole with features of any one or more of the other aspects of the present disclosure to form additional aspects, even if such a combination is not explicitly described.

According to a first aspect of the present disclosure, a glass comprises: $B_2O_3$ from 9.0 mol % to 33.0 mol %; $La_2O_3$ from 15.0 mol % to 50.0 mol %; $SiO_2$ at greater than 0.0 mol %, wherein a ratio of $SiO_2$ (expressed in mol %) to a sum (expressed in mol %) of $SiO_2$ and $B_2O_3$ ($SiO_2/(SiO_2+B_2O_3)$) is from 0.05 to 0.95; and at least one oxide selected from $Nb_2O_5$, $TiO_2$, $ZrO_2$, $Y_2O_3$, $Li_2O$, $Ta_2O_5$, $Al_2O_3$, BaO, $Bi_2O_3$, CaO, $Er_2O_3$, $Gd_2O_3$, $K_2O$, $Na_2O$, $Nd_2O_3$, $P_2O_5$, PbO, $TeO_2$, $WO_3$, $Y_2O_3$, $Yb_2O_3$, and ZnO, subject to the proviso that: $Nb_2O_5$ is from 0.0 mol % to 12.0 mol %; $TiO_2$ is from 0.0 mol % to 40.0 mol %; $ZrO_2$ is from 0.0 mol % to 13.5 mol %; $Y_2O_3$ is from 0.0 mol % to 3.0 mol %; ZnO is from 0.0 mol % to 0.8 mol %; $Li_2O$ is from 0.0 mol % to 0.5 mol %; and $Ta_2O_5$ is from 0.0 mol % to 1.5 mol %, and wherein the glass has a refractive index parameter $P_n$ and a density parameter $P_d$ that satisfy formula (IX):

$$P_n-(1.000+0.19*P_d)>0.000 \tag{IX}$$

where the refractive index parameter $P_n$ is calculated according to formula (VI):

$P_n=1.81706-0.0035654*Al_2O_3-0.0038101*B_2O_3+$ $0.00081216*BaO+0.010373*Bi_2O_3+$
$\quad 0.00013728*CaO+$ $0.0073116*Er_2O_3+0.0055226*Gd_2O_3-$
$\quad 0.003343*K_2O+$ $0.0060806*La_2O_3-0.0009011*Li_2O-$
$\quad 0.001967*Na_2O+$ $0.0093799*Nb_2O_5+0.0060396*Nd_2O_3-$
$\quad 0.0061024*P_2O_5+$ $0.0040356*PbO-0.0032812*SiO_2+0.0030562*TeO_2+$ $0.0034148*TiO_2+0.004267*WO_3+0.0034424*Y_2O_3+$ $0.0071109*Yb_2O_3+0.00096907*ZnO+$
$\quad 0.0026412*ZrO_2$ and where the density parameter $P_d$ is calculated according to formula (VII):

$P_d=-0.018843*Al_2O_3-0.020477*B_2O_3+$
$\quad 0.021988*BaO+$ $0.074733*Bi_2O_3-0.00243*CaO+0.100258*Er_2O_3+$
$\quad 0.07427*Gd_2O_3-0.018568*K_2O+$
$\quad 0.06037*La_2O_3-0.0089*Li_2O-$ $0.00909*Na_2O+0.00625*Nb_2O_5+0.068993*Nd_2O_3-$
$\quad 0.038868*P_2O_5+0.04853*PbO-0.018196*SiO_2+$
$\quad 0.013124*TeO_2-$ $0.00529*TiO_2+0.044564*WO_3+0.022887*Y_2O_3+$
$\quad 0.097857*Yb_2O_3+0.0077*ZnO+$
$\quad 0.012501*ZrO_2+4.16819 \tag{VII}$ and further wherein the glass has a transmittance index $T_i$ of 0.532 or greater, where the transmittance index $T_i$ is calculated according to formula (III):

$$T_i = \frac{(La_2O_3 + Gd_2O_3 + ZrO_2)}{(La_2O_3 + Gd_2O_3 + ZrO_2 + TiO_2 + Nb_2O_5)} \tag{III}$$

where each oxide listed in formula (VI), formula (VII), and formula (III) refers to the amount of the oxide, expressed in mol %, in the glass.

According to a second aspect of the present disclosure, the glass of aspect 1, wherein the glass has a refractive index $n_d$ and a density $d_{RT}$ that satisfy formula (I)(a):

$$n_d-(1.000+0.19*d_{RT})>0.000 \tag{I)(a)}$$

where the refractive index $n_d$ is measured at a wavelength of 587.56 nm and the density $d_{RT}$ is measured in g/cm³ at 25° C.

According to a third aspect of the present disclosure, the glass of aspect 1 or aspect 2, wherein the transmittance index $T_i$ is 0.550 or greater.

According to a fourth aspect of the present disclosure, the glass of any one of aspects 1-3, wherein the glass comprises $SiO_2$ from 0.3 mol % to 30.0 mol %.

According to a fifth aspect of the present disclosure, the glass of any one of aspects 1-4, wherein the glass comprises at least one of: $TiO_2$ from 0.3 mol % to 40.0 mol %; $ZrO_2$ from 0.3 mol % to 10.0 mol %; and $Nb_2O_5$ from 0.3 mol % to 12.0 mol %.

According to a sixth aspect of the present disclosure, the glass of any one of aspects 1-5, wherein the glass comprises at least one of: CaO from 0.0 mol % to 30.0 mol %; BaO from 0.0 mol % to 10.0 mol %; $WO_3$ from 0.0 mol % to 10.0 mol %; $Na_2O$ from 0.0 mol % to 5.0 mol %; $K_2O$ from 0.0 mol % to 5.0 mol %; and SrO from 0.0 mol % to 7.5 mol %.

According to a seventh aspect of the present disclosure, the glass of any one of aspects 1-6, wherein the glass is characterized by an ability to cool, in air, from 1100° C. to 500° C. for 2.5 minutes without crystallizing.

According to an eighth aspect of the present disclosure, the glass of any one of aspects 1-7, wherein the glass has a refractive index $n_d$ of 1.95 or greater, as measured at a wavelength of 587.56 nm, and a density $d_{RT}$ of 5.3 g/cm³ or less, as measured at 25° C.

According to a ninth aspect of the present disclosure, a glass comprises: $SiO_2$ from 3.0 mol % or greater; $B_2O_3$ from 1.0 mol % or greater, wherein a sum of ($SiO_2+B_2O_3$) is 48.0 mol % or less; a total content of divalent metal oxides (RO) of 8.5 mol % or greater; and at least one oxide selected from $Nb_2O_5$, $TiO_2$, $ZrO_2$, $Y_2O_3$, $Li_2O$, $Ta_2O_5$, $Al_2O_3$, BaO, $Bi_2O_3$, CaO, $Er_2O_3$, $Gd_2O_3$, $K_2O$, $Na_2O$, $Nd_2O_3$, $P_2O_5$, PbO, $TeO_2$, $WO_3$, $Y_2O_3$, $Yb_2O_3$, and ZnO, subject to the proviso that: $Gd_2O_3$ is from 0.0 mol % to 27.0 mol %; CaO is from 0.0 mol % to 32.0 mol %; $Li_2O$ is from 0.0 mol % to 7.0 mol %; MgO is from 0.0 mol % to 5.0 mol %; $Y_2O_3$ is from 0.0 mol % to 1.5 mol %; $Ta_2O_5$ is from 0.0 mol % to 0.5 mol %; BaO is from 0.0 mol % to 14.0 mol %; CdO is from 0.0 mol % to 10.0 mol %; $Bi_2O_3$ is from 0.0 mol % to 20.0 mol %; PbO is from 0.0 mol % to 1.0 mol %; $HfO_2$ is from 0.0 mol % to 1.0 mol %; $TeO_2$ is from 0.0 mol % to 5.0 mol %; $Nb_2O_5$ is from 0.0 mol % to 25.0 mol %; $TiO_2$ is from 0.0 mol % to 18.0 mol %; ZnO is from 0.0 mol % to 2.0 mol %; fluorine is from 0.0 atomic % to 1.0 atomic %; a sum of ($SiO_2+B_2O_3+$ Alk$_2$O+ MgO+ CaO+ SrO+ BaO+ ZnO) is 69.0 mol % or less, where Alk$_2$O is a total content of alkali metal oxides; and a sum of ($RE_mO_n+ TiO_2+Nb_2O_5+ ZrO_2+ Bi_2O_3+WO_3$) is 25.0 mol % or greater, where $RE_mO_n$ is a total content of rare earth metal oxides, and further wherein the glass has a refractive index parameter $P_n$ and a transmittance index $T_i$ that satisfy formula (XI)(a):

$$P_n-(2.055-0.36*T_i)>0.000 \tag{XI)(a)}$$

where the refractive index parameter $P_n$ is calculated according to formula (VI):

$P_n=1.81706-0.0035654*Al_2O_3-0.0038101*B_2O_3+$ $0.00081216*BaO+0.010373*Bi_2O_3+$
$\quad 0.00013728*CaO+$ $0.0073116*Er_2O_3+0.0055226*Gd_2O_3-$
$\quad 0.003343*K_2O+$ $0.0060806*La_2O_3-0.0009011*Li_2O-$
$\quad 0.001967*Na_2O+ \tag{VI}$ $0.0093799*Nb_2O_5+0.0060396*Nd_2O_3-$
$\quad 0.0061024*P_2O_5+$ $0.0040356*PbO-0.0032812*SiO_2+0.0030562*TeO_2+$ 0.0034148*TiO$_2$+0.004267*WO$_3$+0.0034424*Y$_2$O$_3$+

0.0071109*Yb$_2$O$_3$+0.00096907*ZnO+
0.0026412*ZrO$_2$ (VI)

and where the transmittance index T$_i$ is calculated according to formula (III):

$$T_i = \frac{(La_2O_3 + Gd_2O_3 + ZrO_2)}{(La_2O_3 + Gd_2O_3 + ZrO_2 + TiO_2 + Nb_2O_5)} \quad (III)$$

and each oxide listed in formula (VI) and formula (III) refers to the amount of the oxide, expressed in mol %, in the glass.

According to a tenth aspect of the present disclosure, the glass of aspect 9, wherein the glass has a refractive index n$_d$, as measured at a wavelength of 587.56 nm, and further wherein the glass satisfies formula (II)(a):

$$n_d-(2.055-0.36*T) \geq 0.000 \quad (II)(a).$$

According to an eleventh aspect of the present disclosure, the glass of aspect 9, wherein the glass has a refractive index n$_d$ and a density d$_{RT}$ that satisfy formula (I)(a):

$$n_d-(1.000+0.19*d_{RT}) > 0.000 \quad (I)(a)$$

where the refractive index n$_d$ is measured at a wavelength of 587.56 nm and the density d$_{RT}$ is measured in g/cm$^3$ at 25° C.

According to a twelfth aspect of the present disclosure, the glass of any one of aspects 9-11, wherein the glass comprises: SiO$_2$ from 3.0 mol % to 45.0 mol %; and B$_2$O$_3$ from 1.0 mol % to 45.0 mol %.

According to a thirteenth aspect of the present disclosure, the glass of any one of aspects 9-12, wherein the glass comprises at least one of: Nb$_2$O$_5$ from 0.0 mol % to 22.0 mol %; La$_2$O$_3$ from 0.3 mol % to 30.0 mol %; Gd$_2$O$_3$ from 0.0 mol % to 15.0 mol %; and Bi$_2$O$_3$ from 0.0 mol % to 10.0 mol %.

According to a fourteenth aspect of the present disclosure, the glass of any one of aspects 9-13, wherein the glass comprises a sum of (Na$_2$O+K$_2$O) of from 0.0 mol % to 10.0 mol %.

According to a fifteenth aspect of the present disclosure, the glass of any one of aspects 9-14, wherein the glass comprises at least one of: TiO$_2$ from 0.3 mol % to 18.0 mol %; ZrO$_2$ from 0.3 mol % to 10.0 mol %; Nb$_2$O$_5$ from 0.3 mol % to 15.0 mol %; WO$_3$ from 0.0 mol % to 10.0 mol %; Na$_2$O from 0.0 mol % to 5.0 mol %; K$_2$O from 0.0 mol % to 5.0 mol %; SrO from 0.0 mol % to 7.5 mol %; and Li$_2$O from 0.0 mol % to 4.0 mol %.

According to a sixteenth aspect of the present disclosure, the glass of any one of aspects 9-15, wherein the glass is characterized by an ability to cool, in air, from 1100° C. to 500° C. for 2.5 minutes without crystallizing.

According to a seventeenth aspect of the present disclosure, the glass of any one of aspects 9-16, wherein the glass has a refractive index n$_d$ of 1.95 or greater, as measured at a wavelength of 587.56 nm, and a density d$_{RT}$ of 5.3 g/cm$^3$ or less, as measured at 25° C.

According to an eighteenth aspect of the present disclosure, a glass comprises: TiO$_2$ from 1.0 mol % to 40.0 mol %; B$_2$O$_3$ from 1.0 mol % to 29.0 mol %; SiO$_2$ from 0.0 mol % to 32.0 mol %, wherein a sum of (SiO$_2$+B$_2$O$_3$) is 45.0 mol % or less; and at least one oxide selected from Nb$_2$O$_5$, ZrO$_2$, La$_2$O$_3$, Y$_2$O$_3$, Li$_2$O, Al$_2$O$_3$, BaO, Bi$_2$O$_3$, CaO, Er$_2$O$_3$, Gd$_2$O$_3$, Na$_2$O, Nd$_2$O$_3$, P$_2$O$_5$, PbO, WO$_3$, Y$_2$O$_3$, Yb$_2$O$_3$, and ZnO, subject to the proviso that: La$_2$O$_3$ is from 0.0 mol % to 30.0 mol %; ZrO$_2$ is from 0.0 mol % to 7.8 mol %; Nb$_2$O$_5$ is from 0.0 mol % to 7.0 mol %; CaO is from 0.0 mol % to 15.0 mol %; BaO is from 0.0 mol % to 15.0 mol %; Li$_2$O is from 0.0 mol % to 3.5 mol %; GeO$_2$ is from 0.0 mol % to 10.0 mol %; Al$_2$O$_3$ is from 0.0 mol % to 10.0 mol %; fluorine is from 0.0 atomic % to 1.0 atomic %; a sum of (Y$_2$O$_3$+ZnO) is from 0.0 mol % to 2.0 mol %; a total content of divalent metal oxides (RO) is from 0.0 mol % to 40.0 mol %; and a total content of monovalent metal oxides (R$_2$O) is from 0.0 mol % to 15.0 mol %, and further wherein the glass has a transmittance index T$_i$ of from 0.25 to 0.75 and wherein the glass has a refraction parameter P$_{ref}$ and a transmittance index T$_i$ that satisfy formula (XII):

$$P_{ref}-(0.262-0.115*T_i) > 0.000 \quad (XII)$$

where the refraction parameter P$_{ref}$ is calculated according to formula (VIII):

P$_{ref}$=0.201656+0.00018225*B$_2$O$_3$−0.0010873*BaO−

0.0024853*Bi$_2$O$_3$−0.0030326*Er$_2$O$_3$−
0.0018856*Gd$_2$O$_3$−

0.0017563*La$_2$O$_3$−0.0002505*Na$_2$O+
0.0017526*Nb$_2$O$_5$−

0.0025472*Nd$_2$O$_3$−0.0016439*PbO+
0.000050096*SiO$_2$+

0.0011794*TiO$_2$−0.00072112*WO$_3$−
0.00079167*Y$_2$O$_3$−

0.0031015*Yb$_2$O$_3$−0.00034209*ZnO (VIII)

and where the transmittance index T$_i$ is calculated according to formula (III):

$$T_i = \frac{(La_2O_3 + Gd_2O_3 + ZrO_2)}{(La_2O_3 + Gd_2O_3 + ZrO_2 + TiO_2 + Nb_2O_5)} \quad (III)$$

and each oxide listed in formula (VIII) and formula (III) refers to the amount of the oxide, expressed in mol %, in the glass.

According to a nineteenth aspect of the present disclosure, the glass of aspect 18, wherein the glass has a refractive index n$_d$, as measured at a wavelength of 587.56 nm, and a density d$_{RT}$, as measured at 25° C. (in in g/cm$^3$), and wherein the glass further satisfies formula (V):

$$[(n_d-1)/d_{RT}]-(0.262-0.115*T_i) > 0.000 \quad (V).$$

According to a twentieth aspect of the present disclosure, the glass of aspect 18 or aspect 19, wherein the glass has a transmittance index T$_i$ of 0.485 or greater.

According to a twenty-first aspect of the present disclosure, the glass of any one of aspects 18-20, wherein the glass has a refractive index n$_d$, as measured at a wavelength of 587.56 nm, and wherein the glass further satisfies formula (IV):

$$n_d-(2.000-0.36*T_i) \geq 0.000 \quad (IV).$$

According to a twenty-second aspect of the present disclosure, the glass of any one of aspects 18-21, wherein the glass comprises SiO$_2$ from 0.3 mol % to 30.0 mol %.

According to a twenty-third aspect of the present disclosure, the glass of any one of aspects 18-22, wherein the glass comprises at least one of: La$_2$O$_3$ from 0.3 mol % to 30.0 mol %; ZrO$_2$ from 0.3 mol % to 7.8 mol %; and Nb$_2$O$_5$ from 0.3 mol % to 7.0 mol %.

According to a twenty-fourth aspect of the present disclosure, the glass of any one of aspects 18-23, wherein the glass comprises at least one of: BaO from 0.0 mol % to 10.0 mol %; WO$_3$ from 0.0 mol % to 10.0 mol %; Na$_2$O from 0.0 mol % to 5.0 mol %; K$_2$O from 0.0 mol % to 5.0 mol %; SrO from 0.0 mol % to 7.5 mol %; and Y$_2$O$_3$ from 0.0 mol % to 3.0 mol %.

According to a twenty-fifth aspect of the present disclosure, the glass of any one of aspects 18-24, wherein the glass is characterized by an ability to cool, in air, from 1100° C. to 500° C. for 2.5 minutes without crystallizing.

According to a twenty-sixth aspect of the present disclosure, the glass of any one of aspects 18-25, wherein the glass has a refractive index $n_d$ of 1.95 or greater, as measured at a wavelength of 587.56 nm, and a measured density $d_{RT}$ of 5.3 g/cm$^3$ or less, as measured at 25° C.

Many variations and modifications may be made to the above-described embodiments of the disclosure without departing substantially from the spirit and various principles of the disclosure. All such modifications and variations are intended to be included herein within the scope of this disclosure and protected by the following claims.

To the extent not already described, the different features of the various aspects of the present disclosure may be used in combination with each other as desired. That a particular feature is not explicitly illustrated or described with respect to each aspect of the present disclosure is not meant to be construed that it cannot be, but it is done for the sake of brevity and conciseness of the description. Thus, the various features of the different aspects may be mixed and matched as desired to form new aspects, whether or not the new aspects are expressly disclosed.

What is claimed is:

1. A glass, comprising:
   B$_2$O$_3$ from 9.0 mol % to 33.0 mol %;
   La$_2$O$_3$ from 15.0 mol % to 50.0 mol %;
   SiO$_2$ at greater than 0.0 mol %, wherein a ratio of SiO$_2$ (expressed in mol %) to a sum (expressed in mol %) of SiO$_2$ and B$_2$O$_3$ (SiO$_2$/(SiO$_2$+B$_2$O$_3$)) is from 0.05 to 0.95; and
   at least one oxide selected from Nb$_2$O$_5$, TiO$_2$, ZrO$_2$, Li$_2$O, Ta$_2$O$_5$, Al$_2$O$_3$, BaO, Bi$_2$O$_3$, CaO, Er$_2$O$_3$, Gd$_2$O$_3$, K$_2$O, Na$_2$O, Nd$_2$O$_3$, P$_2$O$_5$, PbO, TeO$_2$, WO$_3$, Y$_2$O$_3$, Yb$_2$O$_3$, and ZnO, subject to the proviso that:
      Nb$_2$O$_5$ is from 0.0 mol % to 12.0 mol %;
      TiO$_2$ is from 0.0 mol % to 40.0 mol %;
      ZrO$_2$ is from 0.0 mol % to 13.5 mol %;
      Y$_2$O$_3$ is from 0.0 mol % to 3.0 mol %;
      ZnO is from 0.0 mol % to 0.8 mol %;
      Li$_2$O is from 0.0 mol % to 0.5 mol %; and
      Ta$_2$O$_5$ is from 0.0 mol % to 1.5 mol %, and
      wherein the glass has a refractive index parameter P$_n$ and a density parameter P$_d$ that satisfy formula (IX):

$$P_n-(1.000+0.19*P_d)>0.000 \quad \text{(IX)}$$

where the refractive index parameter P$_n$ is calculated according to formula (VI):

$P_n$=1.81706−0.0035654*Al$_2$O$_3$−0.0038101*B$_2$O$_3$+

0.00081216*BaO+0.010373*Bi$_2$O$_{3+0.00013728}$*CaO+

0.0073116*Er$_2$O$_3$+0.0055226*Gd$_2$O$_3$−0.003343*K$_2$O+

0.00608069*La$_2$O$_3$−0.0009011*Li$_2$O−0.001967*Na$_2$O+

0.0093799*Nb$_2$O$_5$+0.0060396*Nd$_2$O$_3$−0.0061024*P$_2$O$_5$+

0.0040356*PbO−0.0032812*SiO$_2$+0.0030562*TeO$_2$+

0.0034148*TiO$_2$+0.004267*WO$_3$+0.0034424*Y$_2$O$_3$+

0.0071109*Yb$_2$O$_3$+0.00096907*ZnO+0.0026412*ZrO$_2$     (VI)

and
where the density parameter P$_d$ is calculated according to formula (VII):

$P_d$=−0.018843*Al$_2$O$_3$−0.020477*B$_2$O$_3$+0.021988*BaO+

0.074733*Bi$_2$O$_3$−0.00243*CaO+0.100258*Er$_2$O$_3$+

0.07427*Gd$_2$O$_3$−0.018568*K$_2$O+0.06037*La$_2$O$_3$−
0.0089*Li$_2$O−0.00909*Na$_2$O+0.00625*Nb$_2$O$_5$+
0.068993*Nd$_2$O$_3$−0.038868*P$_2$O$_5$+
0.04853*PbO−0.018196*SiO$_2$+

0.013124*TeO$_{2-0.00529}$*TiO$_2$+0.044564*WO$_3$+

0.022887*Y$_2$O$_3$+0.097857*Yb$_2$O$_3$+0.0077*ZnO+

0.012501*ZrO$_2$+4.16819     (VII)

and
further wherein the glass has a transmittance index T$_i$ of 0.532 or greater, where the transmittance index T$_i$ is calculated according to formula (III):

$$T_i = \frac{(La_2O_3 + Gd_2O_3 + ZrO_2)}{(La_2O_3 + Gd_2O_3 + ZrO_2 + TiO_2 + Nb_2O_5)} \quad \text{(III)}$$

where each oxide listed in formula (VI), formula (VII), and formula (III) refers to the amount of the oxide, expressed in mol %, in the glass;
and
further wherein none of the ranges is modified by the term "about".

2. The glass of claim 1, wherein the glass comprises B$_2$O$_3$ from 9.0 mol % to 30.0 mol %.

3. The glass of claim 1, wherein the glass comprises at least one of:
   CaO from 0.0 mol % to 30.0 mol %;
   BaO from 0.0 mol % to 10.0 mol %;
   WO$_3$ from 0.0 mol % to 10.0 mol %;
   Na$_2$O from 0.0 mol % to 5.0 mol %;
   K$_2$O from 0.0 mol % to 5.0 mol %; and
   SrO from 0.0 mol % to 7.5 mol %.

4. The glass of claim 1, wherein the glass has a refractive index $n_d$ and a density $d_{RT}$ that satisfy formula (I)(a):

$$n_d-(1.000+0.19*d_{RT})>0.000 \quad \text{(I)(a)}$$

where the refractive index $n_d$ is measured at a wavelength of 587.56 nm and the density $d_{RT}$ is measured in g/cm$^3$ at 25° C.

5. The glass of claim 1, wherein the transmittance index T$_i$ is 0.550 or greater.

6. The glass of claim 1, wherein the glass is characterized by an ability to cool, in air, from 1100° C. to 500° C. for 2.5 minutes without crystallizing.

7. The glass of claim 1, wherein the glass has a refractive index $n_d$ of 1.95 or greater, as measured at a wavelength of 587.56 nm, and a density $d_{RT}$ of 5.3 g/cm$^3$ or less, as measured at 25° C.

\* \* \* \* \*

UNITED STATES PATENT AND TRADEMARK OFFICE
CERTIFICATE OF CORRECTION

| | | |
|---|---|---|
| PATENT NO. | : 11,976,004 B2 | Page 1 of 1 |
| APPLICATION NO. | : 17/400444 | |
| DATED | : May 7, 2024 | |
| INVENTOR(S) | : Paulo Jorge Gaspar Marques et al. | |

It is certified that error appears in the above-identified patent and that said Letters Patent is hereby corrected as shown below:

In the Claims

Claim 1: First Column: Line 62 Reads as: "$0.00081216 * BaO + 0.010373 * Bi_2O_{3\ +\ 0.00013728} * CaO +$"
Should read as: "$0.00081216 * BaO + 0.010373 * Bi_2O_3 + 0.00013728 * CaO +$"

Claim 1: Second Column: Line 24 Reads as: "$0.013124 * TeO_2 -_{0.00529} * TiO_2 + 0.044564 * WO_3+$"
Should read as: "$0.013124 * TeO_2 - 0.00529 * TiO_2 + 0.044564 * WO_3+$"

Signed and Sealed this
Thirty-first Day of December, 2024

Derrick Brent
*Acting Director of the United States Patent and Trademark Office*